United States Patent
Oishi et al.

(10) Patent No.: US 6,816,340 B2
(45) Date of Patent: Nov. 9, 2004

(54) DISK CARTRIDGE

(75) Inventors: Kengo Oishi, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 212 days.

(21) Appl. No.: 10/095,459

(22) Filed: Mar. 13, 2002

(65) Prior Publication Data

US 2002/0131207 A1 Sep. 19, 2002

(30) Foreign Application Priority Data

Mar. 14, 2001 (JP) .......................................... 2001-72942

(51) Int. Cl.[7] .............................................. G11B 23/03
(52) U.S. Cl. ...................................... 360/133; 720/744
(58) Field of Search .......................... 36/291; 360/133; 720/738, 744

(56) References Cited

U.S. PATENT DOCUMENTS

| | | | | | |
|---|---|---|---|---|---|
| 5,226,035 | A | * | 7/1993 | Kato et al. | 369/291 |
| 5,283,121 | A | * | 2/1994 | Bordner | 428/381 |
| 5,306,753 | A | * | 4/1994 | Montagna | 524/247 |
| 5,308,708 | A | * | 5/1994 | Takeda et al. | 428/610 |
| 5,527,606 | A | * | 6/1996 | Kikuchi | 428/324 |
| 5,620,547 | A | * | 4/1997 | Kikuchi | 156/226 |
| 5,835,318 | A | * | 11/1998 | Kikuchi | 360/133 |
| 5,925,039 | A | * | 7/1999 | Landingham | 606/41 |

FOREIGN PATENT DOCUMENTS

| | | | | |
|---|---|---|---|---|
| EP | 459743 | A2 * | 12/1991 | G11B/23/03 |
| EP | 524824 | A2 * | 1/1993 | G11B/23/03 |
| JP | 01286190 | A * | 11/1989 | G11B/23/03 |
| JP | 03073479 | A * | 3/1991 | G11B/23/03 |
| JP | 08221936 | A * | 8/1996 | G11B/23/033 |
| JP | 09139044 | A * | 5/1997 | G11B/23/033 |
| JP | 10106215 | A * | 4/1998 | G11B/23/03 |
| JP | 10233074 | A * | 9/1998 | G11B/23/033 |
| JP | 11-312353 | | 11/1999 | |
| JP | 2000-30394 | | 1/2000 | |
| JP | 2000-30395 | | 1/2000 | |
| JP | 2000-30396 | | 1/2000 | |
| JP | 2000-30397 | | 1/2000 | |
| JP | 2000-30398 | | 1/2000 | |
| JP | 2000-30399 | | 1/2000 | |
| JP | 2000-90626 | | 3/2000 | |
| JP | 2000-90627 | | 3/2000 | |
| JP | 2000-90628 | | 3/2000 | |
| WO | WO 9835349 | A1 * | 8/1998 | G11B/23/03 |

* cited by examiner

Primary Examiner—William Klimowicz
(74) Attorney, Agent, or Firm—Sughrue Mion, PLLC

(57) ABSTRACT

A shutter for a disk cartridge, which has good slidability, is light-weight, and in which warping in a plate thickness direction is suppressed, is provided. Also provided is a disk cartridge in which an opening can be opened and closed at an appropriate driving force. A shutter main body and a shutter face plate which are applied to the disk cartridge open and close an opening, which is for access to a disk medium of the disk cartridge, while sliding along a bottom surface plate portion. The shutter main body and the shutter face plate have two-layer structures formed from a resin layer and a metal layer. Slidability is improved, and the shutter is made light-weight. A joining surface of a metal plate which forms the metal layer is subjected to an electrochemical surface treatment such that affinity thereof with resin is improved. The metal plate and the resin layer are joined strongly, and warping of the resin layer is suppressed.

12 Claims, 43 Drawing Sheets

DISK CARTRIDGE

BACKGROUND OF THE INVENTION

1. Field of the Invention

The present invention relates to a disk cartridge which rotatably accommodates a disc-shaped disk medium used as a recording/playback medium of an information processing device or the like, and which is equipped with a shutter for opening and closing an opening provided at the disk cartridge.

Further, the present invention relates to a disk cartridge which rotatably accommodates a disc-shaped disk medium used as a recording/playback medium of an information processing device or the like, and which prevents entry of dust or the like.

2. Description of the Related Art

A disc-shaped disk medium, such as an optical disk, a magneto-optical disk, or the like, is used, for example, as a portable recording/playback medium for a computer. When recording or playback of the disk medium is carried out, laser light is illuminated onto the recording surface while the disk medium is rotated in a state of being loaded in a drive device. In this way, recording of information is carried out by pit formation or phase changes due to decomposition of the dye layers of the recording surface, or by magnetization or the like, or recorded information is played back on the basis of differences in the reflectivity or the polarizing angle of the laser light.

Further, in such disk media, shortening of the wavelength of the laser light which is illuminated onto the recording surface has been proposed in order to increase the recording capacity. When recording or playback of information is carried out by using this short-wavelength laser light (e.g., a violet color laser), in order to suppress the attenuation of the laser light due to a cover layer which protects the recording surface of the disk medium, the cover layer must be made thin. By making the cover layer thin in this way, the diameter of the laser light at the surface of the cover layer (the surface which is exposed to the exterior) decreases, and it is not possible to ignore the effects of dust and the like adhering to the surface of the cover layer.

Thus, disk cartridges, which accommodate a disk medium in a case and prevent adhesion of dust or the like onto the disk medium, are employed. Such a disk cartridge is formed to include an opening and a shutter member. The opening is for exposing to the exterior a center hole portion provided at the central portion of the disk medium, and a portion of the recording surface (the cover layer). The shutter member opens and closes this opening.

In this way, in the disk cartridge, by closing the opening by the shutter member when the disk medium is not in use, entry of dust or the like into the disk cartridge (i.e., adhesion of dust or the like onto the disk medium) is prevented. At the time when the disk medium is used, by opening the opening as the disk cartridge is loaded into the drive device, the center hole portion can be held by a rotation spindle shaft, and the laser head can approach the recording surface (laser light can be illuminated).

However, in the above-described disk cartridge, a space for accommodating the shutter member when the opening is in the aforementioned open state must be ensured, and a problem arises in that it is difficult to make the disk cartridge more compact.

Thus, to aim for compactness, disk cartridges in which the shutter member is divided in two have been disclosed. (One example is Japanese Patent Application Laid-Open (JP-A) No. 2000-30394.) Hereinafter, the disk cartridge disclosed in this publication will be described on the basis of FIG. 44.

In FIG. 44, a disk cartridge 400 is illustrated in an exploded perspective view. As shown in this figure, the disk cartridge 400 is structured such that a disc-shaped disk medium 406 is rotatably accommodated within a case which is formed by joining a top shell 402 and a bottom shell 404 which are respectively formed of a resin material.

A tubular wall 404A, which serves as an inner wall and at whose inner side the disk medium 406 is accommodated, and an opening 408, which is cut-out from the front portion of the tubular wall 404A to the substantially central portion of the bottom shell 404, are provided at the bottom shell 404.

The opening 408 is formed by an opening 408A and an opening 408B communicating with one another. The opening 408A is for insertion (approach) of a laser head along the radial direction of the disk medium 406. The opening 408B corresponds to a center hole portion 406A of the disk medium 406, and is for insertion of a rotation spindle shaft. The opening 408 is for accessing the disk medium 406.

The disk cartridge 400 is provided with a first shutter member 410 and a second shutter member 412 for opening and closing the opening 408. The first shutter member 410 is formed to include a shutter main body 414 and a shutter guide portion 416. The shutter main body 414 is formed in a substantially trapezoidal shape, and mainly opens and closes the opening 408A. The shutter guide portion 416 stands erect at the front end of the shutter main body 414, is formed in a circular-arc shape corresponding to the tubular wall 404A, is guided by the tubular wall 404A, and opens and closes the front portion cut-out portion of the tubular wall 404A (i.e., the rising portion of the opening 408A).

Further, a thin-plate-shaped connecting portion 418, which is deformable in the direction of the plate thickness thereof, is connected to one end portion of the shutter guide portion 416. A block-shaped operation portion 418A is provided at the distal end of the connecting portion 418. The shutter guide portion 416 and the connecting portion 418 are connected together by being molded integrally, or by, after being manufactured as separate members, being fixed together by adhesion, welding, pressure-connecting, or the like. The tensile force (operational force) applied to the connecting portion 418 is transferred to the shutter guide portion 416 such that the shutter guide portion 416 rotates.

The second shutter member 412 is formed in an elongated trapezoidal shape, and rotates around a rotation shaft 412C provided at an end portion thereof so as to mainly open and close the opening 408B. A pin 412D serving as a spring catch is provided erect in a vicinity of the rotation shaft 412C of the second shutter member 412. The rotation shaft 412C and the pin 412D are inserted, from the under side, through a shaft hole 404B and a guide hole 404C, respectively, of the bottom shell 404, and are positioned at the outer side of the tubular wall 404A in the bottom shell 404.

In this state, the rotation shaft 412C is inserted through an annular portion of a torsion spring 419, and a short rod portion of the torsion spring 419 catches on the pin 412D. Due to a long rod portion of the torsion spring 419 abutting on an appropriate position of the bottom shell 404, the second shutter member 412 is urged in a direction of closing the opening 408B. The disk cartridge 400 is provided with a cover member 420. The first and second shutter members 410, 412 are movably accommodated between the cover member 420 and the bottom shell 404 (the case). An opening 422, which is for access to the disk medium 406 and which corresponds to the opening 408, is formed in the cover member 420.

At the disk cartridge 400, when the disk medium 406 is not in use, respective end surfaces 414A, 412A of the shutter main body 414 of the first shutter member 410 and the second shutter member 412 abut one another so as to close the openings 408, 422. Specifically, the first shutter member 410 mainly closes the opening 408A, and the second shutter member 412 mainly closes the opening 408B. Further, in this state, the shutter guide portion 416 of the first shutter member 410 closes the rising portion of the opening 408A (the cut-out portion of the tubular wall 404A front portion). On the other hand, when the disk medium 406 is to be used, the disk cartridge 400 is loaded into a drive device. The end surfaces 414A, 412A of the first and second shutter members 410, 412 are moved in directions of separating from one another, and open the openings 408, 422.

Specifically, when, accompanying the loading of the disk cartridge 400 into the drive device, the operation portion 418A, which is fixed to the distal end of the connecting portion 418 of the first shutter member 410, is moved in the direction of arrow P along a guide groove 424 of the case side surface (i.e., when the connecting portion 418 is pulled), while the shutter guide portion 416 is guided along the outer peripheral surface of the tubular wall 404A, the shutter main body 414 of the first shutter member 410 rotates in the direction of arrow Q around the axial center of the tubular wall 404A (i.e., the disk medium 406).

Accompanying this rotation, the first shutter member 410, at a convex portion 414B thereof which is positioned along the end surface 414A thereof, pushes an engaging portion 412B, which is positioned along the end surface 412A of the second shutter member 412. The second shutter member 412 is rotated in the direction of arrow R around the rotation shaft 412C. Namely, the first shutter member 410 and the second shutter member 412, while operating interlockingly, rotate in different directions so as to open the openings 408, 422. In this state, a window portion 416A provided at the shutter guide portion 416 is positioned at the front portion of the tubular wall 404A and opens the cut-out portion of the tubular wall 404A (the opening 408A).

At this time, the shutter main body 414 of the first shutter member 410 and the second shutter member 412 slide along a concave portion for sliding (not illustrated) which is formed in the bottom surface of the bottom shell 404. Further, the shutter guide portion 416 of the first shutter member 410 slides along the tubular wall 404A. Moreover, because the first shutter member 410 and the second shutter member 412 to rotate in different directions, the convex portion 414B and the engaging portion 412B, which make the first shutter member 410 and the second shutter member 412 operate interlockingly, are slid along each other.

In the disk cartridge 400, the convex portion 414B of the first shutter member 410 (the shutter main body 414), which pushes the engaging portion 412B of the second shutter member 412 while rotating around the axial center of the tubular wall 404A (the disk medium 406), is provided so as to be separated from the axial center of the tubular wall 404A, which is the center of rotation thereof, in order to make the second shutter member 412 rotate to a position of opening the opening 408B (in order to ensure the pushing stroke) by pushing which accompanies a predetermined amount of rotation of the first shutter member 410.

On the other hand, at the time when the openings 408, 422 which have been opened are to be closed again, either the operation portion 418A is pushed in the direction opposite to the direction of arrow P by a drive device, or the first shutter member 410 is pushed, at the convex portion 414B thereof, by the engaging portion 412B of the second shutter member 412 due to the urging force of the torsion spring 419. The first and second shutter members 410, 412 respectively rotate in directions of closing the opening 408 and the like (in directions opposite to the directions of arrow Q and arrow R), and the openings 408, 422 are closed.

In this way, the first shutter member 410 and the second shutter member 412 are accommodated in an accommodating space which substantially corresponds to the projected surface area of the disc-shaped disk medium 406, and the disk cartridge 400 can be made more compact. Further, the disk cartridge 400 can be made thinner because the first shutter member 410 and the second shutter member 412 are disposed in the same plane and close the openings 408, 422 by the respective end surfaces thereof abutting one another as was described above.

In assembling the disk cartridge 400, in the state in which the opening 408 of the bottom shell 404 is closed by the shutter members 410, 412, the disk medium 406 is accommodated (set) at the inner side of the tubular wall 404A of the bottom shell 404, and the top portion thereof is covered by the top shell 402. Next, after respective parts such as a locking means (not shown) and the like are assembled, the bottom portion of the bottom shell 404 (the case) is covered by the cover member 420.

However, there are the following problems with the above-described conventional disk cartridge 400.

First, at the first shutter member 410, the convex portion 414B, which is disposed at a position which is set apart from the axial center of the tubular wall 404A as described above, is provided (the position thereof is ensured) by a simple structure. Thus, the widthwise dimension (the dimension W shown in FIG. 44) of the shutter main body 414 is wider (by the amount required for providing the convex portion 414B) than a dimension which is sufficient for closing the opening 408A. The convex portion 414B, which corresponds to the end surface 414A, is provided at this portion where the width has been made greater.

Thus, problems arise in that the weight of the first shutter member 410 increases and the surface area for sliding along the bottom shell 404 (the case) increases and the sliding resistance increases, by an amount corresponding to the amount by which the shutter main body 414 has been made wider.

Further, the second shutter member 412 is an elongated structure in which the rotation shaft 412C, which is provided at one end portion of the second shutter member 412, and the opening 408B (the central portion of the case), which the second shutter member 412 mainly opens and closes, are set apart from one another. Problems arise in that the weight of the second shutter member 412 is large, the surface area for sliding along the bottom shell 404 (the case) at the time of opening and closing the opening 408 is large, and the sliding resistance also is great.

When the sliding resistance between, on the one hand, the first shutter member 410 and the second shutter member 412, and, on the other hand, the bottom shell 404 (the case) is great, and/or the respective weights of the shutter members 410, 412 are large, the driving force for opening and closing the opening 408 is large.

When the driving force for opening and closing the opening 408 is large, not only is smooth operation of the first shutter member 410 and the second shutter member 412 impeded, but also, it is necessary to improve the strength of the respective portions of the first shutter member 410 (including the connecting portion 418 and the operation portion 418A), which results in higher costs.

Moreover, when the driving force for opening and closing the opening 408 is large, it is a cause of deformation, such as buckling or the like, occurring at the thin-plate-shaped connecting portion 418 in the structure of pushing the operation portion 418A in the direction opposite to the direction of arrow P at the time of closing the opening 408. In the structure utilizing the urging force of the torsion spring 419 which urges the second shutter member 412 at the time of closing the opening 408, the urging force of the torsion spring 419 must be made stronger (the spring constant must be increased).

When the urging force of the torsion spring 419 is made stronger (i.e., when the spring constant is increased), handling of the torsion spring 419 is complicated, and assemblability is poor. In particular, at the disk cartridge 400, the urging force of the torsion spring 419 is applied to the pin 412D in a vicinity of the rotation shaft 412C of the second shutter member 412. Thus, the rotation moment, in the direction of closing the opening 408, of the second shutter member 412 due to this urging force is small, and the spring constant must be increased even more. Thus, this problem (of the assemblability and the like being poor) becomes marked, and the torsion spring 419 itself must be made larger. Either the disk cartridge 400 is made larger on the whole, or the regions of operation of the shutter members 410, 412 are made smaller (i.e., the opening 408 is made smaller and large-sized laser heads or the like cannot be handled).

Further, when the weight of the second shutter member 412 is large, in a case in which, for example, the disk cartridge 400 is dropped by accident, an extremely large load is applied to the rotation shaft 412C which may cause deformation or breakage of the rotation shaft 412C.

In particular, when the second shutter member 412 is made of a metal material in consideration of ensuring the flatness of the second shutter member 412 or preventing deformation due to temperature, the above-described problems relating to weight and sliding resistance become marked.

Here, forming at least one of the first shutter member 410 (the shutter main body 414) and the second shutter member 412 from a resin material in order to improve the slidability and lower the weight, has been contemplated. However, the surface areas of the shutter members 410, 412 are large. Therefore, at the thicknesses required of the shutter members 410, 412 in order to make the disk cartridge 400 more thin (i.e., values approaching minimum thicknesses which can be obtained by ordinary injection molding), there are cases in which warping which is not of an allowable extent (i.e., which impedes the operations of opening and closing the opening) arises at the shutter members 410, 412 due to residual stress at the time of molding. This problem becomes marked in particular in cases in which there are portions of non-uniform thickness at the shutter members 410, 412 (e.g., in cases in which the convex portion 414B and the pin 412D are molded integrally or in cases in which ribs or the like are provided).

Thus, in order to correct (prevent or suppress) warping of the shutter members 410, 412, insert molding which utilizes thin metal plates has been contemplated. However, because it is difficult to join metal and resin, it is necessary to form an embedded structure in which holes or concave portions are provided in the metal plate. However, when such an embedded structure is employed, the thickness of the resin layer is not uniform, and the residual stress is great. Thus, the resin layer may peel off in portions from the metal plate or cracks may arise, which causes poor operations for opening and closing the opening 408 and a deterioration in yield at the time of production.

Second, in order for the second shutter member 412 to also close a portion of the opening 408A for insertion of a laser head in the state in which the second shutter member 412 abuts the first shutter member 410, a sharp corner portion 412E is formed at the position of the second shutter member 412 which is furthest away from the rotation shaft 412C.

There is therefore the concern that, accompanying the above-described rotation, the sharp corner portion 412E may slide along the resin-made, lower shell 404 (the case) or the resin-made, cover member 420, and cause abrasion. Further, in the same way as the sharp corner portion 412E, there is also the concern that the other corner portions of the second shutter member 412 will abrade the case or the cover member 420 as they slide therealong.

In particular, the second shutter member 412 is formed so as to be elongated from a corner portion (the portion where the shaft hole 404B for rotatably supporting the rotation shaft 412C is provided) of the bottom shell 404 (the case) to the central portion thereof (the portion where the opening 408B is formed). Thus, it is easy for the second shutter member 412 to warp due to curling of the material or residual stress at the time of molding, and there is a great concern that abrasion will occur due to the aforementioned sliding.

Abrading of the bottom shell 404 or the cover member 420 not only impedes smooth operation of the second shutter member 412, but also is a cause of drop-out of the recording or playback signal when powder is formed due to the abrasion and this abraded powder adheres to the recording surface (the cover surface) of the disk medium 406.

Third, when the first shutter member 410 and the second shutter member 412 are formed of the same type of material, abrasion arises at the region of abutment (pushing) of the convex portion 414B of the first shutter member 410 and the engaging portion 412B of the second shutter member 412 which slide along each other at the time of opening and closing the opening 408. In the same way as with the above-described second problem, if powder formed by this abrasion adheres to the recording surface (the cover surface) of the disk medium 406, it becomes a cause of drop-out of the recording or playback signal.

In particular, if the first shutter member 410 and the second shutter member 412 are both formed of a metal material in order to ensure the flatness thereof, it is easy for metal powder to form due to abrasion.

Moreover, if the first shutter member 410 and the second shutter member 412 are formed of the same type of material, the hardnesses thereof at the region of abutment are of the same extent. This is a cause of noise arising at the time of the operations for opening and closing the opening 408.

Fourth, at the disk cartridge 400, the shutter main body 414 is merely accommodated rotatably between the bottom shell 404 (the case) and the cover member 420, and the shutter guide portion 416 is merely disposed slidably at the tubular wall 404A. In other words, the first shutter member 410 is not held at the bottom shell 404 (the case), and is merely prevented from falling out from the case by the cover member 420. Thus, at the time of assembling the disk cartridge 400 (at the time of assembling the respective parts before mounting the cover member 420), the first shutter member 410 cannot be prevented from falling out from the case.

Thus, at the time of assembling the disk cartridge 400, there is the need for complex and careful work to prevent the first shutter member 410 from falling out of the case, and the problem that the assembly workability is poor arises.

Similarly, at the disk cartridge 400, the rotation shaft 412C, which is provided at one end portion of the second shutter member 412, is merely inserted through the shaft hole 404B of the bottom shell 404 and the annular portion of the torsion spring 419. In other words, the second shutter member 412 is not held at the case, and is prevented from falling out from the case only by the cover member 420. Thus, at the time of assembling the disk cartridge 400 (at the time of assembling the respective parts before mounting the cover member 420), the second shutter member 412 cannot be prevented from falling out from the case.

Thus, at the time of assembling the disk cartridge 400, there is the need for complex and careful work to prevent the second shutter member 412 from falling out of the case, and the problem that the assembly workability is poor arises.

Fifth, in the disk cartridge 400, the rotation shaft 412C, which is fixed to one end portion of the second shutter member 412, is merely formed in a cylindrical shape. Therefore, it is easy for stress to concentrate at the root portion of the rotation shaft 412C (the portion thereof which borders on the flat plate portion of the second shutter member 412).

Thus, as was discussed previously in connection with the above-described first problem, if, for example, the disk cartridge 400 is dropped by accident, an impact force is applied between the shaft hole 404B and the rotation shaft 412C accompanying the relative movement between the second shutter member 412 and the bottom shell 404 (the case) due to the drop impact. This impact force concentrates at the root portion of the rotation shaft 412C, and is thus a cause of breakage of the second shutter member 412.

Further, the (planar portion of the) bottom shell 404 is generally formed as a thin plate. Thus, the aforementioned impact force is also a cause of breakage of the shaft hole 404B (i.e., the bottom shell 404).

SUMMARY OF THE INVENTION

In view of the aforementioned, an object of the present invention is to provide a shutter for a disk cartridge which has good slidability, is light-weight, and in which warping in the plate thickness direction thereof is suppressed.

Another object of the present invention is to provide a disk cartridge in which shutter members can be driven by an appropriate driving force so as to open and close an opening.

Yet another object of the present invention is to provide a disk cartridge which can prevent the occurrence of abrasion due to operation of shutter members.

Still another object of the present invention is to provide a disk cartridge in which assembly work is easy and which is low-cost.

A further object of the present invention is to provide a disk cartridge in which breaking of a rotation shaft of a shutter member can be prevented and reliability can be improved.

In order to achieve the above-described objects, in accordance with one aspect of the present invention, there is provided a shutter built-in in a disk cartridge, the disk cartridge comprising: a medium; a case having an access opening for access to the medium, and housing the medium; and a cover member having an opening which corresponds to the access opening, the cover member being mounted to an outer surface of the case, wherein the shutter being for opening and closing the opening and the access opening, and wherein the shutter is slidably provided between the outer surface of the case and the cover member, and is basically formed from a thin plate having a two layer structure formed from a metal layer and a resin layer. In accordance with another aspect of the present invention, there is provided a disk cartridge comprising: a medium having an axial center; a case having an access opening for access to the medium, and housing the medium; a cover member having an opening which corresponds to the access opening, and mounted to an outer surface of the case; and a shutter provided slidably between the outer surface of the case and the cover member, and for opening and closing the opening and the access opening, wherein the shutter is formed from a first shutter member and a second shutter member, wherein the first shutter member has a pushing portion for pushing and moving the second shutter member, wherein when the first shutter member rotates in one direction around the axial center of the medium, the first shutter member moves in a direction of opening the opening, and at this time, the pushing portion pushes the second shutter member and moves the second shutter member in a direction of opening the opening, and wherein the pushing portion projects by a predetermined dimension in a direction within a plane of movement of the first shutter member, in order to open and close the shutter.

In accordance with yet another aspect of the present invention, there is provided a disk cartridge comprising: a medium; a case having an access opening for access to the medium, and housing the medium; and a shutter for opening and closing the access opening, the shutter having a lightening portion at a region which does not impede a closing operation of the shutter. In accordance with still another aspect of the present invention, there is provided a disk cartridge comprising: a medium; a case having an access opening for access to the medium, and housing the medium; a cover member having an opening which corresponds to the access opening, and mounted to an outer surface of the case; and a shutter slidably provided between the outer surface of the case and the cover member, the shutter being for opening and closing the opening and the access opening, and the shutter having at least one projection for sliding with respect to at least one of the case and the cover member.

In accordance with yet another aspect of the present invention, there is provided a disk cartridge comprising: a medium; a case having an access opening for access to the medium, and housing the medium; and a shutter including a first shutter member and a second shutter member and being for opening and closing the access opening, and closing and opening operations of the shutter correspond to movements of the first and second shutter members in directions of relatively approaching one another and in directions of relatively moving away from one another, and the first shutter member has a pushing piece for the movements, and the second shutter member has a pushed piece for the movements, and the pushing piece and the pushed piece are formed from respectively different materials.

In accordance with another aspect of the present invention, there is provided a disk cartridge comprising: a medium; a case having an access opening for access to the medium, and housing the medium; and a shutter including a first shutter member and a second shutter member and being for opening and closing the access opening, and closing and opening operations of the shutter correspond to movements of the first and second shutter members in directions of relatively approaching one another and in directions of relatively moving away from one another, and the first shutter member has a pushing portion for the movements, and the second shutter member has a pushed portion for the movements, and the pushing portion and the pushed portion are formed from a resin material having abrasion resistance and a low coefficient of friction.

In accordance with yet another aspect of the present invention, there is provided a disk cartridge comprising: a medium; a case having an access opening for access to the medium, and housing the medium; and a shutter which opens and closes the access opening, and which has an engaging portion for preventing the shutter from falling out from the case at a time of opening and closing operations of the shutter.

In accordance with still another aspect of the present invention, there is provided a disk cartridge comprising: a medium; a case having an access opening for access to the medium, and housing the medium; and a shutter which opens and closes the access opening, and which has an engaging member which is rotatably connected to the case via a supporting structure formed from a rotation shaft and a shaft hole and which prevents the shutter from falling out from the case.

BRIEF DESCRIPTION OF THE DRAWINGS

FIG. 1A is a perspective view as seen from the front and above at an angle and FIG. 1B is a perspective view as seen from the front and below at an angle.

DESCRIPTION OF THE PREFERRED EMBODIMENTS

Figure 1A:
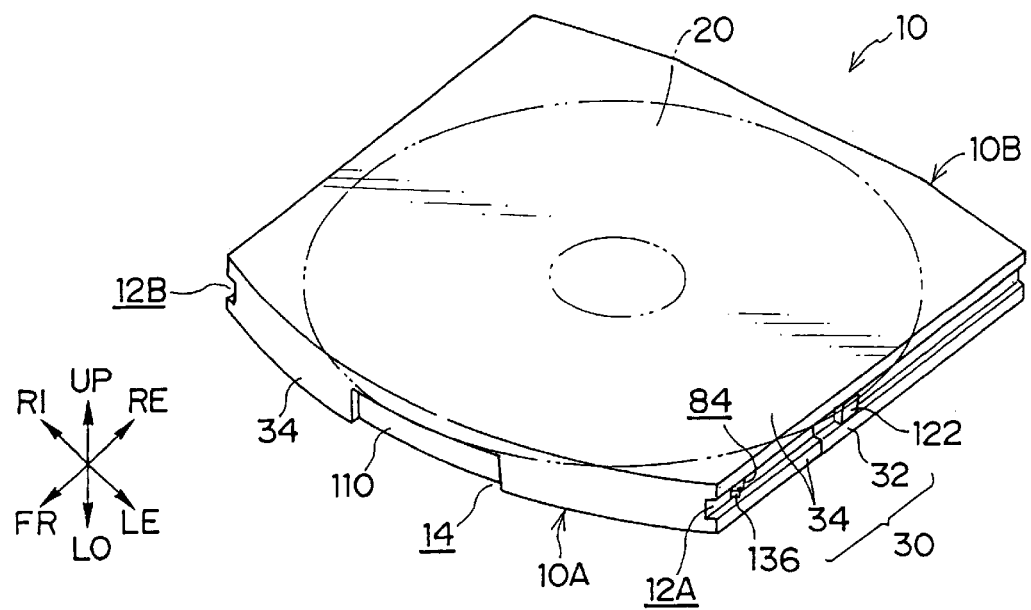
FIGS. 1A and 1B are views showing an exterior of a disk cartridge relating to a first embodiment of the present invention, where

Hereinafter, a disk cartridge 10, to which a shutter for a disk cartridge relating to a first embodiment of the present invention is applied, will be described with reference to FIGS. 1 through 9. First, the overall structure of the disk cartridge 10 will be described. Then, the detailed structures of a shutter main body 112 and a shutter face plate 151, which serve as shutters for a disk cartridge and which are main portions of the present invention, will be described.

Note that, in the drawings, when arrow FR, arrow RE, arrow UP, arrow LO, arrow RI and arrow LE are used, they indicate, respectively, the front direction (the loading direction), the rear direction, the upward direction, the downward direction, the rightward direction, and the leftward direction of the disk cartridge 10 while looking in the direction of loading (inserting) the disk cartridge 10 into a drive device. Hereinafter, when the top, bottom, front, rear, left and right are indicated, they correspond to the directions of the respective arrows. Further, these respective directions are for convenience of explanation, and are of course not intended to limit the directions at the time of using the disk cartridge 10. Accordingly, for example, the disk cartridge 10 may be disposed horizontally or may be disposed vertically at the time of use thereof.

(Structure of Disk Cartridge)

Figure 1B:
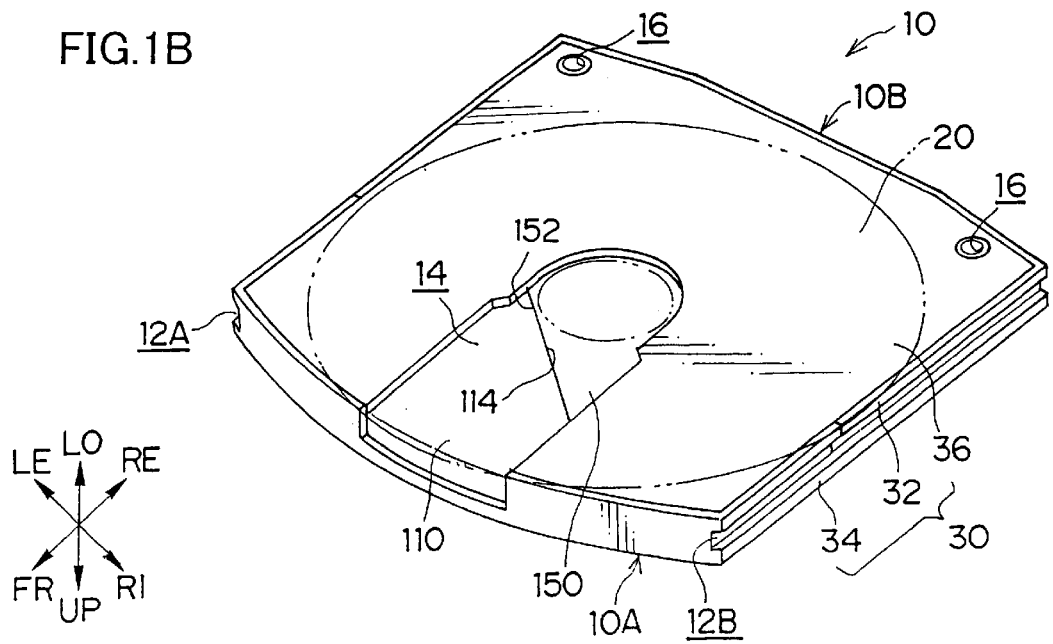

In FIG. 1A, the exterior, when the disk cartridge 10 is viewed from above at an angle, is illustrated in a perspective view. In FIG. 1B, the exterior, when the disk cartridge 10 is viewed from below at an angle, is illustrated in a perspective view.

As shown in these figures, the disk cartridge 10 is formed on the whole in a flat case shape. A disc-shaped disk medium 20, which serves as an information recording/playback medium and which will be described later, is accommodated within the disk cartridge 10.

The disk cartridge 10 is formed in a polygonal configuration in which a front end portion 10A is curved in a circular-arc shape, and left and right corner portions of a rear end portion 10B are cut-out due to required functions thereof. Further, the front-back dimension of the disk cartridge 10 is slightly larger than the left-right dimension thereof. For these reasons, the disk cartridge 10 is structured such that the loading direction into a drive device (not shown) can be easily recognized from the external appearance thereof, and loading into the drive device from an incorrect direction is not permitted.

A first guide groove 12A and a second guide groove 12B are provided at the left and right side surfaces of the disk cartridge 10, respectively, and are for guiding at the time of loading the disk cartridge 10 into a drive device. A lock releasing lever 136 and a shutter engaging portion 122, which will be described later, project at the first guide groove 12A.

An opening 14 is provided from the central portion of the bottom surface of the disk cartridge 10 to the left-right direction central portion of the front wall portion of the front end portion 10A. The opening 14 is for access to the disk medium 20 when the disk medium 20 is used. Namely, when the disk medium 20 is used, a rotation spindle shaft and a recording/playback head (e.g., a laser head) of the drive device are inserted and made to approach from the opening 14. When the disk medium 20 is not being used, the opening 14 is closed by a first shutter member 110 and a second shutter member 150, which will be described later and which are accommodated within the disk cartridge 10, such that entry of dust and the like into the disk cartridge 10 is prohibited.

Two holes 16 for position regulation are formed in a vicinity of the rear end portion 10B of the bottom surface of the disk cartridge 10. The holes 16 for position regulation are for regulating (detecting) the position of the disk cartridge 10 within the drive device.

The disk cartridge 10 is loaded into the drive device in the forward direction (the direction of arrow FR) while being guided into the drive device at the first guide groove 12A and the second guide groove 12B. The opening 14 is opened, and the disk cartridge 10 is set, by the holes 16 for position regulation, in a position-detected and positioned state in the drive device. In this state, within the drive device, recording of information onto the disk medium 20 or playback of information recorded on the disk medium 20 is carried out.

Figure 2:
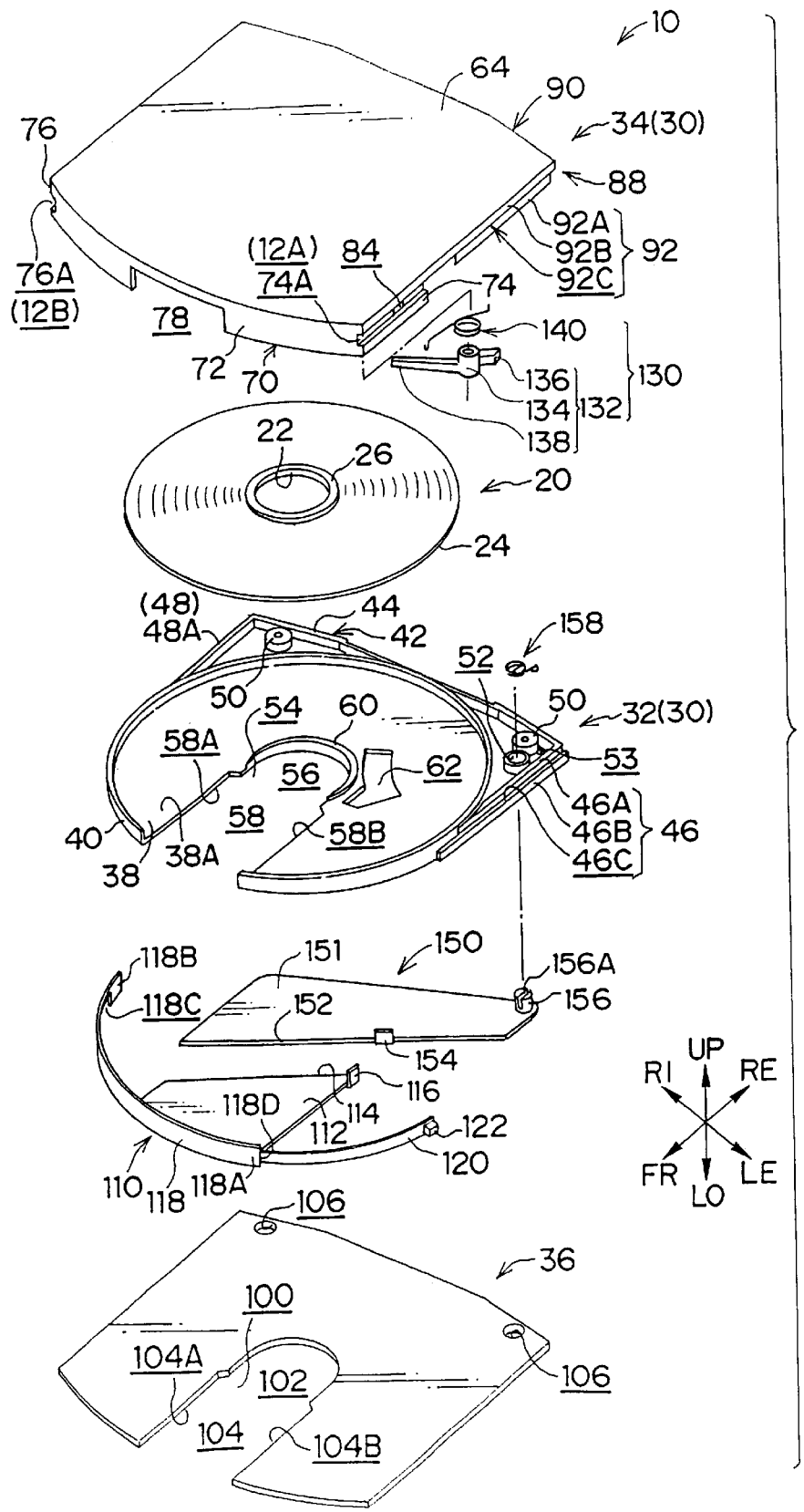
FIG. 2 is an exploded perspective view, as seen from above, of the disk cartridge relating to the first embodiment of the present invention.
Figure 3:
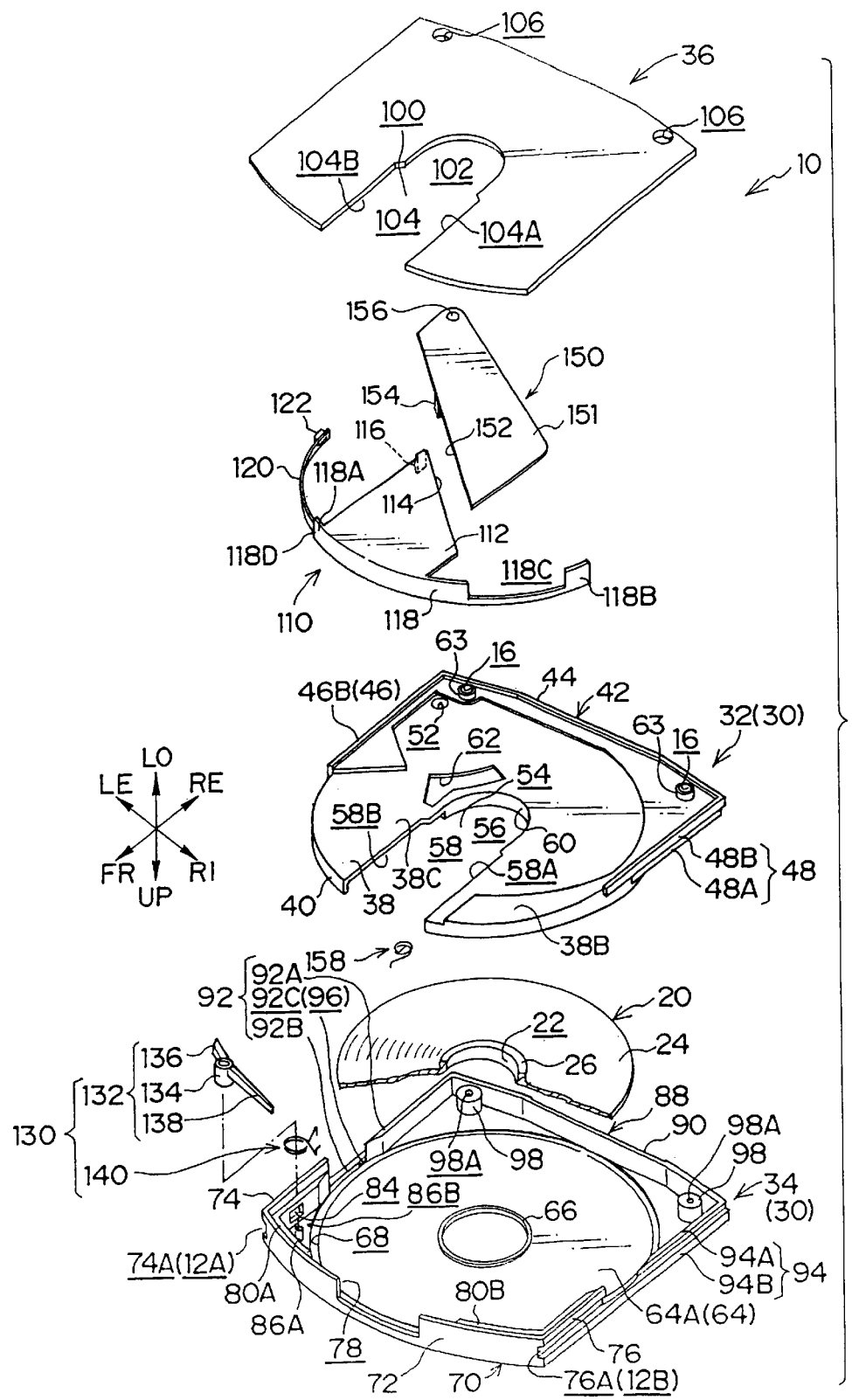
FIG. 3 is an exploded perspective view, as seen from below, of the disk cartridge relating to the first embodiment of the present invention.

Next, to describe the detailed structure of the disk cartridge 10, as shown in the exploded perspective views of FIGS. 2 and 3, the disk cartridge 10 is provided with the disk medium 20.

The disk medium 20 is formed in a disc shape having a center hole 22 in the central portion thereof. The recording surface, which is formed on a bottom surface 24 of the disk medium 20, is covered and protected by a cover layer (both the recording surface and the cover layer are not shown in the figures). An annular center core portion 26 is mounted by adhesion or the like to the center hole 22 of the disk medium 20.

The center core portion 26 is engaged and held or is sucked and held by the distal end portion of the rotation spindle shaft of the drive device. Further, the disk medium 20 may be formed so as to not have the center core portion 26. In this case, the disk medium 20 is, at the inner edge of the center hole 22, engaged with and held by the distal end portion of the rotation spindle shaft.

The disk medium 20 is rotatably accommodated within a case 30. The case 30 is formed by the joining of a base plate portion 32 which serves as a bottom shell and a top surface plate portion 34 which serves as a top shell. The lower portion of the case 30 (the base plate portion 32) is covered by a bottom surface plate portion 36 which serves as a cover member. The first shutter member 110 and the second shutter member 150, which will be described hereinafter, are accommodated between the case 30 and the bottom surface plate portion 36.

The base plate portion 32 is provided with a base bottom portion 38 which is formed by a thin plate, and whose front portion is formed in a semicircular shape, and whose rear portion is formed in a substantially rectangular shape which circumscribes the remaining semicircular portion. A tubular wall 40, which is coaxial with and has the same diameter as the front semicircular portion, stands upright, directed upwardly, at the base bottom portion 38. The inner diameter of this tubular wall 40 is slightly larger than the outer diameter of the disk medium 20.

A peripheral wall 42, which is substantially U-shaped in plan view, is formed at the outer periphery of the rear portion of the base bottom portion 38, so as to enclose substantially the rear half of the tubular wall 40. A rear wall 44 of the peripheral wall 42 is formed in a bent line configuration in which the left and right corner portions are folded over as seen in plan view. The rear wall 44 corresponds to the rear end portion 10B of the disk cartridge 10. The height of the rear wall 44 from a top surface 38A of the base bottom portion 38 is at a lower level than the tubular wall 40, and the rear wall 44 projects further downward than a bottom surface 38B of the base bottom portion 38 (see FIG. 3).

A left wall 46 of the peripheral wall 42 is formed by a left inner wall 46A and a left outer wall 46B. The outer surface of the left inner wall 46A is formed along a line which is tangent to the tubular wall 40 and parallel to the front-back direction. The front end surface of the left inner wall 46A contacts the outer peripheral surface of the tubular wall 40 along this outer peripheral surface. The left outer wall 46B is provided at the outer side (the left side) of the left inner wall 46A and extends slightly further forward than the front-back direction central portion of the tubular wall 40. The left inner wall 46A stands upright only at the top surface 38A side of the base bottom portion 38, and is at the same heightwise level as the rear wall 44. The left outer wall 46B is, at the top surface 38A side, at a lower level than the left inner wall 46A, and at the bottom surface 38B side, is at the same heightwise level as the rear wall 44. A thin groove 46C, which opens upwardly, is formed between, on the one hand, the left outer wall 46B, and on the other hand, the left inner wall 46A and the tubular wall 40. A right wall 48 of the peripheral wall 42 has a similar structure as that of the left wall 46, but no thin groove corresponding to the thin groove 46C is formed at the right wall 48 side.

In this way, at the top surface 38A side of the base bottom portion 38, the peripheral wall 42 forms a substantial U shape, as seen in plan view, in which the rear wall 44 and the left inner wall 46A and a right inner wall 48A are at the same heightwise level, and is a region of abutment with a peripheral wall 88 (which will be described later) of the top surface plate portion 34. At the bottom surface 38B side of the base bottom portion 38, the peripheral wall 42 forms a substantial U shape, as seen in plan view, in which the rear wall 44 and the left outer wall 46B and a right outer wall 48B are at the same heightwise level, and is a region of fitting together with the bottom surface plate portion 36. The outer surface (left side surface) of the left inner wall 46A is the bottom surface lower portion of the rear portion of the first guide groove 12A of the disk cartridge 10. The top end surface of the left outer wall 46B is the bottom side wall surface of the rear portion of the first guide groove 12A. The outer surface (right side surface) of the right inner wall 48A is the bottom surface lower portion of the rear portion of the second guide groove 12B of the disk cartridge 10. The top end surface of the right outer wall 48B is the lower side wall surface of the rear portion of the second guide groove 12B.

A tubular projection 50 stands upright at each of the rear end corner portions of the top surface 38A of the base bottom portion 38, between the tubular wall 40 and the peripheral wall 42. The tubular projection 50 is at the same heightwise level as the rear wall 44 of the peripheral wall 42. Although not shown, a through-hole and a conical screw receiving portion, which corresponds to the head portion of a screw for fixing, are formed at the interior of the tubular projection 50.

A shutter shaft hole 52 serving as a shaft hole is provided in the vicinity of the left side tubular projection 50, and is for rotatably supporting the second shutter member 150 which will be described later. A spring holding portion 53 is provided in a vicinity of the shutter shaft hole 52, and is for holding one end of a torsion spring 158 which will be described later.

An opening 54, which forms the opening 14 of the disk cartridge 10, is formed in the base plate portion 32. The opening 54 is formed by a circular hub hole 56 and a substantially rectangular window portion 58 for a recording/playback head being connected together. The hub hole 56 has a larger diameter than the outer diameter of the center core portion 26 of the disk medium 20. The window portion 58 for a recording/playback head is formed by cutting out the base bottom portion 38 symmetrically to the left and right along the radial direction of the semicircular portion of the base bottom portion 38 until the outer peripheral front end portion thereof, and cutting out the tubular wall 40 thereat as well.

The widthwise dimension in the left-right direction of the window portion 58 for a recording/playback head is formed to be wide at both the left and right so as to be greater than the diameter of the hub hole 56, except in a vicinity of the portion of connection with the hub hole 56. By providing such right and left widened portions 58A, 58B, a large-sized recording/playback head can be inserted (can be made to approach the disk medium 20).

A rib 60 is provided erect at the top surface 38A side around the hub hole 56. The rib 60 is for preventing contact between the bottom surface 24 of the disk medium 20 and the top surface 38A of the base bottom portion 38.

A shutter guiding hole 62 is provided in a vicinity of the hub hole 56 of the base bottom portion 38. The shutter guiding hole 62 is formed in a configuration in which the front corner portion of a circular-arc-shaped hole, which is enclosed by two circular arcs which are coaxial with the shutter shaft hole 52 and two straight lines which pass through a vicinity of the axial center of the shutter shaft hole 52, extends toward the front.

As shown in FIG. 3, a concave portion 38C is formed in the bottom surface 38B of the base plate portion 32 (the base bottom portion 38), and is for forming an operation and accommodation space for the shutter main body 112 of the first shutter member 110 and the second shutter member 150 which will be described later. Namely, at the bottom surface 38B side of the base plate portion 32, the bottom end surface of the peripheral wall 42 projects downwardly, with the bottom surface 38B of the base bottom portion 38 as a reference, and the concave portion 38C is recessed upwardly.

In this way, by fitting the bottom surface plate portion 36 together with the peripheral wall 42 in a state in which the bottom surface plate portion 36 abuts the bottom surface 38B, a flat space is formed between the bottom surface plate portion 36 and the concave portion 38C. Further, at positions of the bottom surface 38B of the base bottom portion 38 which positions correspond to the tubular projections 50, tubular projections 63, which communicate coaxially with the interiors of the tubular projections 50, stand erect, directed downwardly, such that screws or tools can be inserted therein. The outer peripheries of the tubular projections 63 are used for positioning the bottom surface plate portion 36. The interiors of the tubular projections 63 are the holes 16 for position regulation of the disk cartridge 10.

The disk medium 20 is accommodated at the inner side of the tubular wall 40 of the above-described base plate portion 32. The disk medium 20 is placed on the rib 60 in a state in which the center core portion 26 of the disk medium 20 is inserted into the hub hole 56. Contact of the disk medium 20 with the top surface 38A of the base bottom portion 38 and the tubular wall 40 is prevented. In this state, the top of the base plate portion 32 is covered by the top surface plate portion 34.

The top surface plate portion 34 is provided with a flat plate portion 64 which corresponds to the outer shape of the disk cartridge 10 as seen in plan view. Namely, the flat plate portion 64 is formed in a polygonal shape whose rectangular, plate-shaped front end portion is curved in a circular-arc shape and whose left and right corner portions of the rear end portion are cut-out. The front-back dimension of the flat plate portion 64 is slightly greater than the left-right dimension thereof.

An annular projection 66, which corresponds to the rib 60 of the base plate portion 32, is provided at the central portion of a bottom surface 64A of the flat plate portion 64. The annular projection 66 is for preventing the disk medium 20 from contacting the bottom surface 64A.

An annular groove 68, which corresponds to the tubular wall 40 of the base plate portion 32, is formed in the bottom surface 64A of the flat plate portion 64. The annular groove 68 is formed on the whole such that the tubular wall 40 can be inserted therein. The outer diameter of the front portion of the annular groove 68 is slightly greater (the width is wider) than the length between the left outer wall 46B and the right outer wall 48B of the base plate portion 32. As well as the annular wall 40, a circular-arc-shaped guide wall portion 118 of the first shutter member 110 which will be described later can be inserted into the annular groove 68.

At the outer periphery of the front portion of the flat plate portion 64, an outer wall 70, which is formed in a substantial U shape as seen in plan view, stands erect, directed downwardly, so as to surround the front half of the annular groove 68. The outer wall 70 is of a height which corresponds to the entire thickness of the disk cartridge 10, and is formed by a front wall 72, a left wall 74, and a right wall 76.

The front wall 72 is curved so as to correspond to the curved configuration of the front end of the flat plate portion 64. A rectangular window portion 78, which is cut out such that the lower side is open, is formed in the left-right direction central portion of the front wall 72. The left-right direction widthwise dimension of the window portion 78 corresponds to the widthwise dimension of the window portion 58 for a recording/playback head of the base plate portion 32. The window portion 78 communicates with the opening 54 (the window portion 58 for a recording/playback head) of the base plate portion 32, and forms a portion of the opening 14 of the disk cartridge 10. The front wall 72 forms the front end portion 10A of the disk cartridge 10.

The left wall 74 and the right wall 76 extend rearward from the left and right end portions of the front wall 72, respectively. The positions, of the left wall 74 and the right wall 76, which correspond to the front end portions of the left outer wall 46B and the right outer wall 48B of the base plate portion 32, are the rear end portions. Namely, in the assembled state, the respective bottom portions of the rear end surfaces of the left wall 74 and the right wall 76 of the top surface plate portion 34, and the respective front end surfaces of the left outer wall 46B and the right outer wall 48B of the base plate portion 32, abut one another.

Inner walls 80A 80B, which are formed along the inner surfaces of the left and right corner portions of the outer wall 70, are provided at the inner side of the outer wall 70. The bottom end surfaces of the inner walls 80A, 80B are positioned slightly above the bottom end surface of the outer wall 70 (are recessed toward the inner side of the disk cartridge 10), and form surfaces for abutment with the top surface of the bottom surface plate portion 36 which is fit together with the outer wall 70.

A lateral groove 74A is formed in the outer surface of the left wall 74 of the outer wall 70 along the front-back direction thereof. The bottom portion of the lateral groove 74A reaches the inner wall 80A. The lateral groove 74A forms the front portion of the first guide groove 12A of the disk cartridge 10. Further, a lock releasing lever hole 84, which communicates the bottom portion of the lateral groove 74A and the inner side of the inner wall 80A, is provided in the inner wall 80A. A shaft hole 86A for rotatably supporting a lock lever 132 which will be described later, and a holding hole 86B for holding one end of a torsion spring 140, are provided in the bottom surface 64A of the flat plate portion 64 in the vicinity of the lock releasing lever hole 84.

The right wall 76 of the outer wall 70 is formed similarly to the left wall 74, and forms the front portion of the second guide groove 12B. A lateral groove 76A, whose bottom portion reaches the inner wall 80B, is formed in the right wall 76. Note that a lock releasing lever hole, a supporting shaft, and a holding hole are not provided at the right wall 76 (inner wall 80B) side.

A peripheral wall 88, which corresponds to the peripheral wall 42 of the base plate portion 32, stands erect, directed downward, at the outer periphery of the flat plate portion 64, further toward the rear than the outer wall 70. Namely, the peripheral wall 88 has a rear wall 90, a left wall 92, and a right wall 94, which correspond respectively to the rear wall 44, the left wall 46, and the right wall 48 of the base plate portion 32.

The rear wall 90 abuts the rear wall 44 of the base plate portion 32, and forms the rear end portion 10B of the disk cartridge 10.

Further, a left inner wall 92A of the left wall 92 abuts the left inner wall 46A of the base plate portion 32, and a left outer wall 92B and a thin groove 92C of the left wall 92 oppose the left outer wall 46B and the thin groove 46C of the base plate portion 32, respectively. The left wall 92 forms the rear portion left side wall of the disk cartridge 10 and the rear portion of the first guide groove 12A. The thin grooves 46C, 92C which oppose one another form a shutter guiding groove 96 into which a shutter pull-out portion 120 of the first shutter member 110 which will be described later is inserted. The shutter guiding groove 96 (the thin groove 92C) communicates with the annular groove 68 in a vicinity of the front end portion of the left inner wall 92A. Namely, in a vicinity of the front end portion of the shutter guiding groove 96, the shutter guiding groove 96 is formed by the thin groove 46C of the base plate portion 32 and a portion of the annular groove 68 in a vicinity of the outer side wall opposing one another.

In the same way as the left wall 92, a right inner wall 94A of the right wall 94 abuts the right inner wall 48A of the base plate portion 32, and a right outer wall 94B opposes the right outer wall 48B of the base plate portion 32. The right wall 94 forms the rear portion right side wall of the disk cartridge 10 and the rear portion of the second guide groove 12B.

Further, positioning convex portions 98 are provided at positions corresponding to the tubular projections 50 of the case plate portion 32, between the peripheral wall 88 and the annular groove 68. The positioning convex portions 98 are at the same heightwise level as the rear wall 90 of the peripheral wall 88, and the bottom end surfaces thereof abut the top end surfaces of the tubular projections 50 of the base plate portion 32. A screw hole 98A is provided in the central portion of the positioning convex portion 98. A screw, whose head portion engages with the conical portion within the tubular projection 50 of the base plate portion 32, is screwed into the screw hole 98A, and the position of the hole 16 for position regulation (the tubular projection 63) with respect to the top surface plate portion 34 is determined.

Further, due to the aforementioned screwing, the top surface plate portion 34 is connected to and held at (joined to) the base plate portion 32 in a state in which the top surface plate portion 34 covers the top side (upper portion) of the base plate portion 32. The case 30 which rotatably houses the disk medium 20 is thereby formed. In this state, the tubular wall 40 of the base plate portion 32 is inserted into the annular groove 68 of the top surface plate portion 34, and the peripheral wall 42 of the base plate portion 32 abuts a portion corresponding to the peripheral wall 88 of the top surface plate portion 34.

On the other hand, the bottom surface plate portion 36 is disposed beneath the base plate portion 32. The bottom surface plate portion 36 is formed such that the external configuration thereof is a flat shape which is substantially the same shape as that of the flat plate portion 64 of the top surface plate portion 34. Due to the outer periphery of the bottom surface plate portion 36 being slightly smaller than that of the flat plate portion 64, the bottom surface plate portion 36 can fit together with the inner peripheral surfaces of the outer wall 70 of the top surface plate portion 34 and the peripheral wall 42 (the rear wall 44, the left outer wall 46B, the right outer wall 48B) of the base plate portion 32.

An opening 100, which is of substantially the same configuration as the opening 54 of the base plate portion 32, is formed in the bottom surface plate portion 36 at a position corresponding to the opening 54. Namely, the opening 100 is formed by a hub hole 102 which corresponds to the hub hole 56, and a window portion 104 for a recording/playback head and right and left widened portions 104A, 104B which correspond to the window portion 58 for a recording/playback head. The opening 100 communicates with the opening 54 and forms the opening 14 of the disk cartridge 10.

Through holes 106, which correspond to the outer diameters of the tubular projections 63 of the base plate portion 32, are provided in the bottom surface plate portion 36 at positions corresponding to the tubular projections 63.

In the state in which the tubular projections 63 of the base plate portion 32 are inserted through the through holes 106 and the top surface of the bottom surface plate portion 36 is abutted by the bottom surface 38B of the base plate portion 32 (the portion other than the concave portion 38C) and the respective bottom end surfaces of the inner walls 80A, 80B of the top surface plate portion 34, the bottom surface plate portion 36 is fit with and held by the peripheral wall 42 (the rear wall 44, the left outer wall 46B, the right outer wall 48B) of the base plate portion 32 and the inner peripheral surface of the outer wall 70 of the top surface plate portion 34.

In this way, the lower side (the region beneath) the case 30, which accommodates the disk medium 20, is covered by the bottom surface plate portion 36. The front end portion 10A, the rear end portion 10B, the first guide groove 12A, the second guide groove 12B, and the two holes 16 for position regulation of the disk cartridge 10 are provided, as described above, at the case 30 whose bottom is covered. In addition, the opening 14 of the disk cartridge 10, at which the opening 54 of the base plate portion 32 and the window portion 78 of the top surface plate portion 34 and the opening 100 of the bottom surface plate portion 36 communicate, is formed in the case 30.

A shutter mechanism is provided at the disk cartridge 10. The shutter mechanism is provided at the case 30, and closes or opens the opening 14. When the respective structural elements of the shutter mechanism are described hereinafter by using the front-back and left-right directions, explanation is basically based on the directions in the state in which the opening 14 is closed.

The shutter mechanism is equipped with the first shutter member 110. The first shutter member 110 is provided with the shutter main body 112 which mainly closes the window portion 58 for a recording/playback head of the base plate portion 32. The shutter main body 112 is formed by a thin, flat plate which is a substantially trapezoidal shape as seen in plan view (i.e., a shape in which the front end portion of a rectangle, whose front-back dimension is substantially equal to the radius of the tubular wall 40 of the base plate portion 32 and whose transverse dimension is greater than the transverse dimension of the window portion 58 for a recording/playback head, is formed in a circular-arc shape corresponding to the tubular wall 40, and the rear right corner portion of the rectangle is cut-out). The thickness of the shutter main body 112 is smaller than the height of the base plate portion 32 from the bottom surface 38B (the top surface of the bottom surface plate portion 36) to the concave portion 38C.

The end surface (see FIGS. 2 and 4) of the slanted side portion which is the rear end of the shutter main body 112 is an abutting portion 114 with the second shutter member 150 which will be described later. A pushing piece 116 which serves as a pushing portion, stands erect, directed upwardly, at the rear left corner portion of the shutter main body 112. The pushing piece 116 is for pushing the second shutter member 150 which will be described later. The shutter main body 112 is a two-layer structure formed by a resin layer and a metal layer. The detailed structure thereof will be described later.

The first shutter member 110 is provided with the circular-arc-shaped guide wall portion 118 which serves as a circular-arc-shaped guide portion. As seen in plan view, the inner peripheral surface of the circular-arc-shaped guide wall portion 118 is formed to curve in a circular-arc shape corresponding the outer peripheral surface of the tubular wall 40 of the base plate portion 32. The circular-arc-shaped guide wall portion 118 stands erect, directed upwardly, from the front end portion of the shutter main body 112. The height of the circular-arc-shaped guide wall portion 118 is determined such that the heightwise level of the top end portion thereof in the assembled state corresponds to the top end surface of the tubular wall 40 (see FIG. 8A). In this way, the circular-arc-shaped guide wall portion 118 can slide along the outer peripheral surface of the tubular wall 40 of the base plate portion 32, and can close a portion of the window portion 58 for a recording/playback head of the base plate portion 32 (the portion where the front portion of the tubular wall 40 is cut-out and which communicates with the window portion 78 of the top surface plate portion 34).

At the circular-arc-shaped guide wall portion 118, a jutting-out portion 118A, which juts out toward the left of the shutter main body 112, is short, and a jutting-out portion 118B, which juts out toward the right, is long. A window portion 118C, whose bottom is open, is provided in the jutting-out portion 118B which juts out toward the right. The window portion 118C corresponds to the window portion 78 of the top surface plate portion 34. The dimensions of the respective portions are determined such that, in the state in which the opening 14 is open due to the shutter mechanism, this window portion 118C is positioned at the front portion of the case 30 (at the rear of the window portion 78).

The shutter pull-out portion 120, which serves as a connecting portion, is connected to a vicinity of the inner surface of the distal end portion of the jutting-out portion 118A which juts out to the left of the circular-arc-shaped guide wall portion 118. The shutter pull-out portion 120 is formed in a plate shape which is sufficiently thinner than the circular-arc-shaped guide wall portion 118. The shutter engaging portion 122, which serves as an operation portion and which is formed in the shape of a small block, is mounted to the distal end portion of the shutter pull-out portion 120.

Figure 8A:
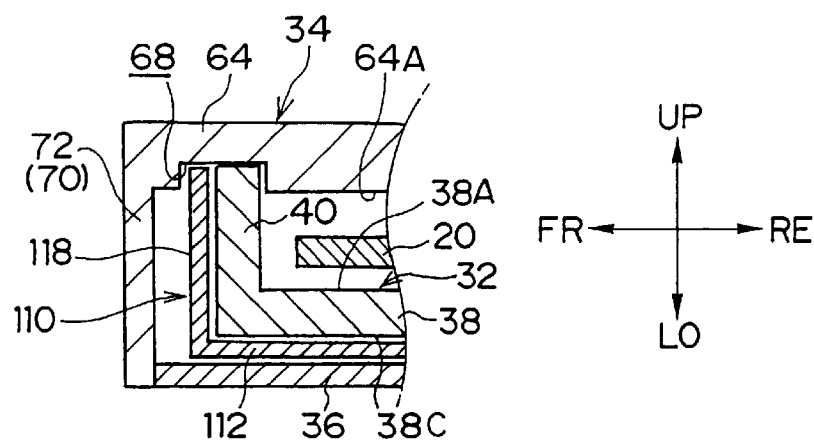
FIG. 8A is a cross-sectional view taken along line 8A—8A of FIG. 4.
Figure 8B:
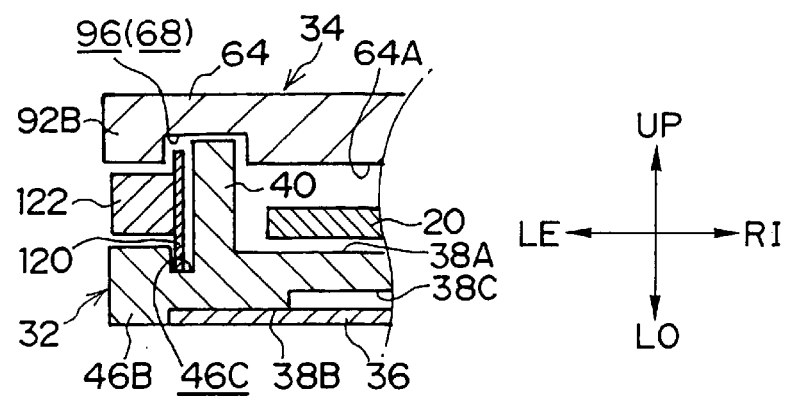
FIG. 8B is a cross-sectional view taken along line 8B—8B of FIG. 4.

As shown in FIG. 8B, the transverse dimensions, in the vertical direction, of the shutter pull-out portion 120 and the shutter engaging portion 122 correspond to the vertical dimension of the shutter guiding groove 96 and the vertical dimension of the first guide groove 12A, respectively.

Figure 4:
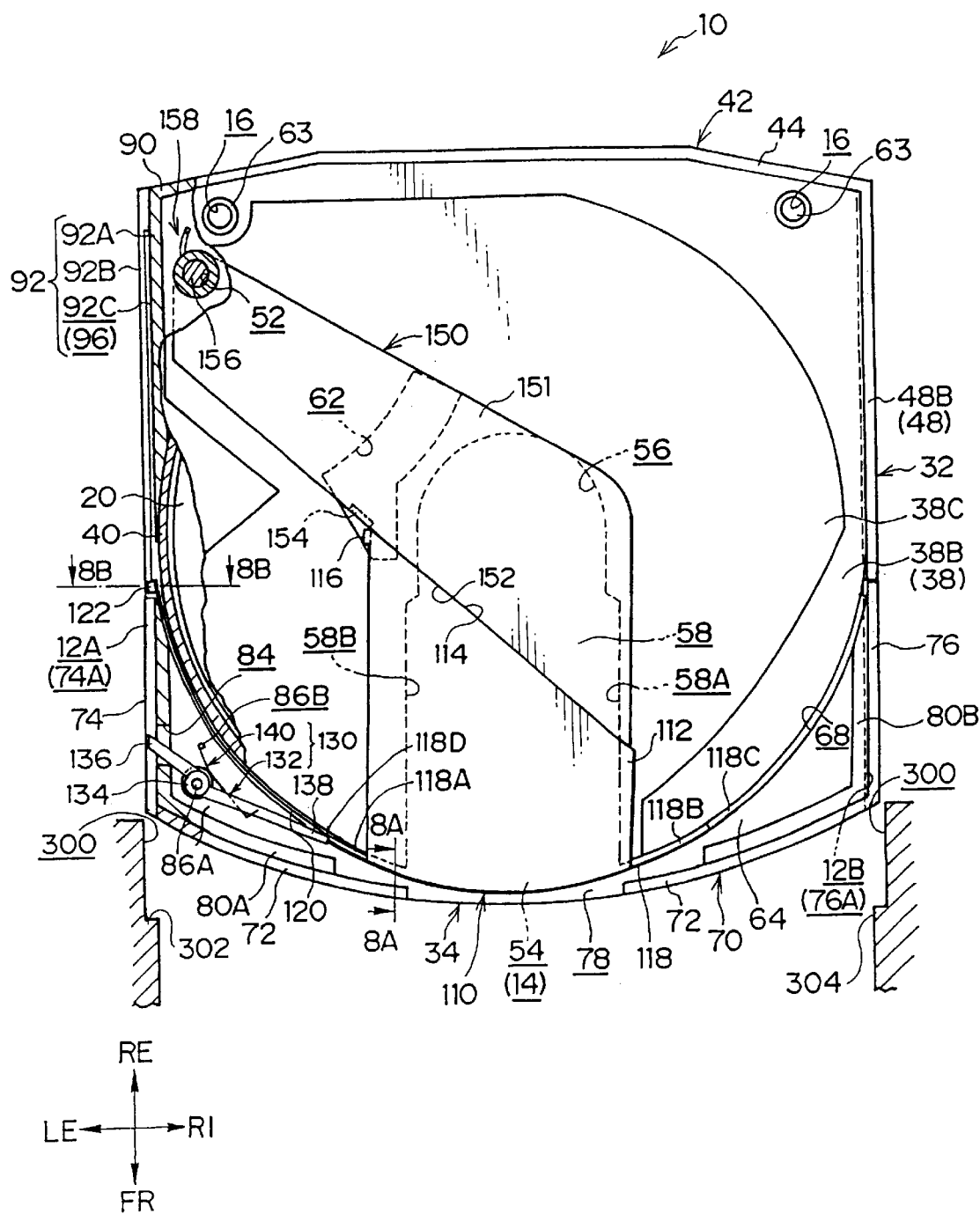
FIG. 4 is a bottom view, in which a bottom surface plate portion is removed and portion is cut-out, showing the entire structure, in a state in which an opening is closed, of the disk cartridge relating to the first embodiment of the present invention.

A portion of the left end portion of the jutting-out portion 118A of the circular-arc-shaped guide wall portion 118, which portion is further toward the outer surface side than the position of connection with the shutter pull-out portion 120, is a lock engaging portion 118D which can engage with a lock claw 138 of a locking means 130 which will be described later. At the first shutter member 110, as shown in FIG. 4 (which is a bottom view in which the bottom surface plate portion 36 has been removed) and in FIG. 8A, in a state in which the circular-arc-shaped guide wall portion 118 is, together with the tubular wall 40 of the base plate portion 32, inserted into the annular groove 68 of the top surface plate portion 34 and is disposed slidably along the outer peripheral portion of the tubular wall 40, the shutter main body 112 is disposed between the concave portion 38C of the base plate portion 32 and the top surface of the bottom surface plate portion 36, and usually closes a portion of the opening 14 (mainly, the window portion 58 for a recording/playback head).

In this state, the pushing piece 116 of the shutter main body 112 is inserted into the shutter guiding hole 62 of the base plate portion 32, and is positioned at the front portion thereof. Further, in this state, as shown in FIG. 8B as well, the distal end portion of the shutter pull-out portion 120 is positioned at the front end portion of the shutter guiding groove 96 which communicates with the annular groove 68 of the top surface plate portion 34, and the shutter engaging portion 122 is positioned at the substantially central portion within the first guide groove 12A (at the rear of the left wall 74 of the top surface plate portion 34) and is exposed to the exterior.

In this way, by moving the shutter engaging portion 122 rearward from the exterior, the circular-arc-shaped guide wall portion 118, which is connected thereto via the shutter pull-out portion 120, is slid along the outer peripheral surface of the tubular wall 40, and the shutter main body 112 is rotated around the axial center of the tubular wall 40 (see FIGS. 4 through 7). Namely, the shutter pull-out portion 120 converts the linear direction moving force, which is applied due to the shutter engaging portion 122 being moved rearward, into peripheral direction moving force (rotating force of the circular-arc-shaped guide wall portion 118 along the tubular wall 40). Further, the shutter mechanism is provided with the locking means 130 for regulating the rotation of the first shutter member 110. The locking means 130 is provided with the lock lever 132 which is substantially V-shaped in plan view. The lock lever 132 is formed by a tubular shaft 134, the lock releasing lever 136, and the lock claw 138. The tubular shaft 134 is provided at the central portion of the lock lever 132, and is supported so as to be freely rotatable in the shaft hole 86A of the top surface plate portion 34. The lock releasing lever 136 is provided at one end portion of the lock lever 132, and projects from the lock releasing lever hole 84 into the first guide groove 12A (the lateral groove 74A). The lock claw 138 is provided at the other end portion of the lock lever 132 and can engage with the lock engaging portion 118D of the first shutter member 110.

One end portion of the torsion spring 140 is anchored on the lock lever 132, and the other end portion of the torsion spring 140 is inserted and held in the holding hole 86B of the top surface plate portion 34. In this way, the lock claw 138 is urged by the torsion spring 140 in the direction of engaging with the lock engaging portion 118D of the first shutter member 110, and the lock lever 132 usually prevents rotation in the direction of opening the opening 14 (maintains the closed state of the opening 14).

On the other hand, when the lock releasing lever 136 is pushed rearward, the lock lever 132 rotates around the tubular shaft 134 against the urging force of the torsion spring 140, and the engaged state of the lock claw 138 and the lock engaging portion 118D of the first shutter member 110 is cancelled.

The shutter mechanism is provided with the second shutter member 150 which serves as a shutter member. The second shutter member 150 has the shutter face plate 151 which is shaped as a thin plate and which mainly opens and closes the hub hole 56 of the base plate portion 32.

As seen in plan view, the shutter face plate 151 is formed as a substantial trapezoid (a trapezoid in which parallel segments, which are parallel to the front-back direction and which are positioned at the left and right, are offset and the space between these parallel segments is long). The thickness of the shutter face plate 151 is the same as that of the shutter main body 112 of the first shutter member 110. The end surface of the inclined portion which is the front end of the shutter face plate 151 is an abutting portion 152 which abuts with the abutting portion 114 of the first shutter member 110. The front right corner portion of the shutter face plate 151, which corner portion is disposed between the abutting portion 152 which is an inclined portion and the right side portion (a front-back direction end portion) is formed to be an acute angle, and opens and closes the hub hole 56 as well as a portion (the right rear portion) of the window portion 58 for a recording/playback head.

A pushed piece 154 stands erect, directed upwardly, at a position of the abutting portion 152 which position corresponds to the pushing piece 116 of the shutter main body 112. The pushed piece 154 has a widthwise dimension which can always maintain a state in which the pushed piece 154 slidably abuts the pushing piece 116, within the range of rotation of the shutter main body 112 (the range of movement of the pushing piece 116 which is regulated by the shutter guiding hole 62). The shutter face plate 151 has a two-layer structure formed by a resin layer and a metal layer, and the detailed structure thereof will be described later.

The second shutter member 150 is provided with a rotation shaft 156 which stands erect, directed upwardly, at the rear left end portion of the shutter face plate 151. The rotation shaft 156 corresponds to the shutter shaft hole 52 of the base plate portion 32. A slit 156A serving as a spring engaging portion is formed at the top end portion of the rotation shaft 156.

The shutter face plate 151 of the second shutter member 150 is disposed between the concave portion 38C of the base plate portion 32 and the top surface of the bottom surface plate portion 36, in a state in which the rotation shaft 156 is inserted through the shutter shaft hole 52 of the base plate portion 32 and the pushed piece 154 is inserted in the shutter guiding hole 62. In this state, one end portion of the torsion spring 158, which serves as an urging means, is anchored in the slit 156A of the rotation shaft 156, and the other end portion of the torsion spring 158 is anchored on the spring holding portion 53 of the base plate portion 32. The second shutter member 150 is thereby usually urged in a direction of abutting the first shutter member 110 (a direction of closing the opening 14).

In this way, the abutting portion 152 of the second shutter member 150 usually is in a state of abutting the abutting portion 114 of the first shutter member 110, and in this state, the second shutter member 150 mainly closes the hub hole 56 of the base plate portion 32.

Namely, as shown in FIG. 1B, the first shutter member 110 and the second shutter member 150 usually close the opening 14 of the disk cartridge 10, with the abutting portions 114, 152 abutting each other.

In this state, the pushing piece 116 of the first shutter member 110 engages on the inner edge of the front portion of the shutter guiding hole 62 of the base plate portion 32, and the correct state of abutment of the abutting portions 114, 152 (i.e., a state of abutment without a gap) is maintained.

(Detailed Structures of Shutter Main Body and Shutter Face Plate)

Figure 9:
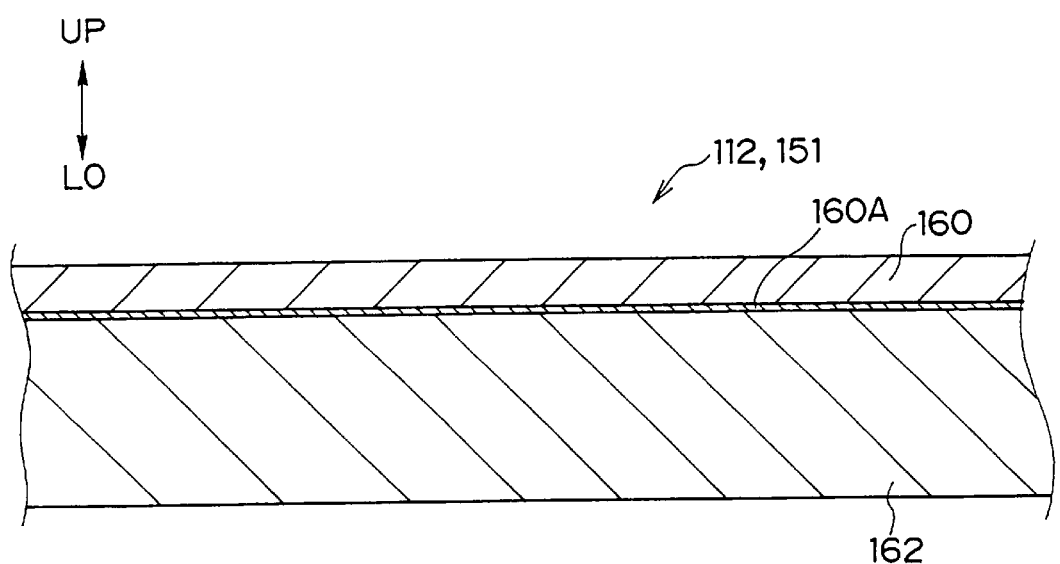
FIG. 9 is a perspective view showing a variant example of a second shutter member which forms the disk cartridge relating to the first embodiment of the present invention.

As shown in a cross-sectional view in FIG. 9, the shutter main body 112 of the first shutter member 110 and the shutter face plate 151 of the second shutter member 150 each have a two-layer structure formed by metal and resin.

Each of the shutter main body 112 and the shutter face plate 151 is provided with a flat-plate-shaped metal plate 160 formed from stainless steel. The thickness of the metal plate 160 is substantially 0.1 mm. Note that, at the shutter main body 112, the metal plate 160 may be formed integrally with the circular-arc-shaped guide wall portion 118.

A resin layer 162, which is made integral with the metal plate 160 by insert molding, is provided at the bottom surface of the metal plate 160. The thickness of the resin layer 162 is substantially 0.4 mm.

The bottom surface of the metal plate 160 before insert molding is roughened to Ra 0.2 or more. Further, the bottom surface of the metal plate 160 is subjected to an electrochemical surface treatment.

The electrochemical surface treatment is carried out as follows. With the metal plate 160 immersed in an electrodeposition solution (e.g., a solution whose solvent is an organic solvent such as a triazinethiol aqueous solution), for example, a current of 0.1 mA/dm2 to 10 A/dm2 is made to flow for 0.1 seconds to 10 minutes at 0 to 80° C. at 20 V or less between an anode, which is the metal plate 160, and a cathode, which is a platinum plate, a titanium plate, a carbon plate, or the like.

In this way, a treated layer 160A, which has strong affinity to resin, is formed at the bottom surface of the resin plate 160.

The metal plate 160 which has been subjected to the above-described treatment is insert molded as mentioned above. A resin material, which is subjected to high temperature and high pressure in a metal mold, is strongly bonded (joined) to the metal plate 160 by a chemical reaction. In this way, the shutter main body 112 and the shutter face plate 151, which are each a two-layer structure in which the resin layer 162 is joined to (integral with) the bottom surface of the metal plate 160, are formed.

The resin material is appropriately selected, in accordance with the properties of the case 30 (the base plate portion 32) and the bottom surface plate portion 36, from among POM, PPS, PBT, PA, and PC which have good slidability. Further, molybdenum in a powder form, which serves as a solid lubricant, is mixed into the resin material in an amount of 0.1% by mass or more, and a portion of the molybdenum is exposed (deposited) on the surface of the resin layer 162 after the insert molding. Note that the upper limit of the amount of molybdenum to be mixed in is preferably 10% by mass in light of costs.

Moreover, self-lubricating particulates of molybdenum disulfide or the like are dispersed in a matrix at the top surface of the metal plate 160.

At the time of opening and closing the opening 14, the shutter main body 112 and the shutter face plate 151 usually rotate while sliding along the top surface of the bottom surface plate portion 36.

Next, operation of the present first embodiment will be described.

At the disk cartridge 10 having the above-described structure, at the time when the disk medium 20 is not being used, the opening 14 is closed by the first shutter member 110 and the second shutter member 150. Namely, as shown in FIG. 4, the abutting portion 114 of the first shutter member 110 and the abutting portion 152 of the second shutter member 150 abut one another. The first shutter member 110 mainly closes the window portion 58 for a recording/playback head of the base plate portion 32, and the second shutter member 150 mainly closes the hub hole 56 of the base plate portion 32.

At this time, due to the lock claw 138 of the locking means 130 engaging with the lock engaging portion 118D of the circular-arc-shaped guide wall portion 118, rotation of the first shutter member 110 in the direction of opening the opening 14 is regulated, and the aforementioned closed state is maintained. The second shutter member 150 is urged in the direction of abutting the first shutter member 110 by the torsion spring 158, and the aforementioned closed state is maintained. In this way, entry of dust into the disk cartridge 10 when the disk medium 20 is not in use, i.e., adhesion of dust onto the bottom surface 24 of the disk medium 20, is prevented.

When the disk medium 20 is to be used (when information is to be recorded onto the disk medium 20 or information recorded on the disk medium 20 is to be played back), the disk cartridge 10 is loaded into the drive device. When the disk cartridge 10 is loaded into the drive device, the disk cartridge 10 is inserted into an insertion opening 300 (see FIGS. 4 through 7) of the drive device, with the front end portion 10A of the disk cartridge 10 leading. Accompanying this insertion, guiding convex portions 302, 304 of the drive device are inserted into the first guide groove 12A and the second guide groove 12B of the disk cartridge 10. The guiding convex portion 302, which is inserted into the first guide groove 12A, moves relatively toward the rear of the first guide groove 12A as the disk cartridge 10 is inserted further, and abuts the lock releasing lever 136 positioned within the first guide groove 12A, and pushes the lock releasing lever 136 rearward.

Figure 5:
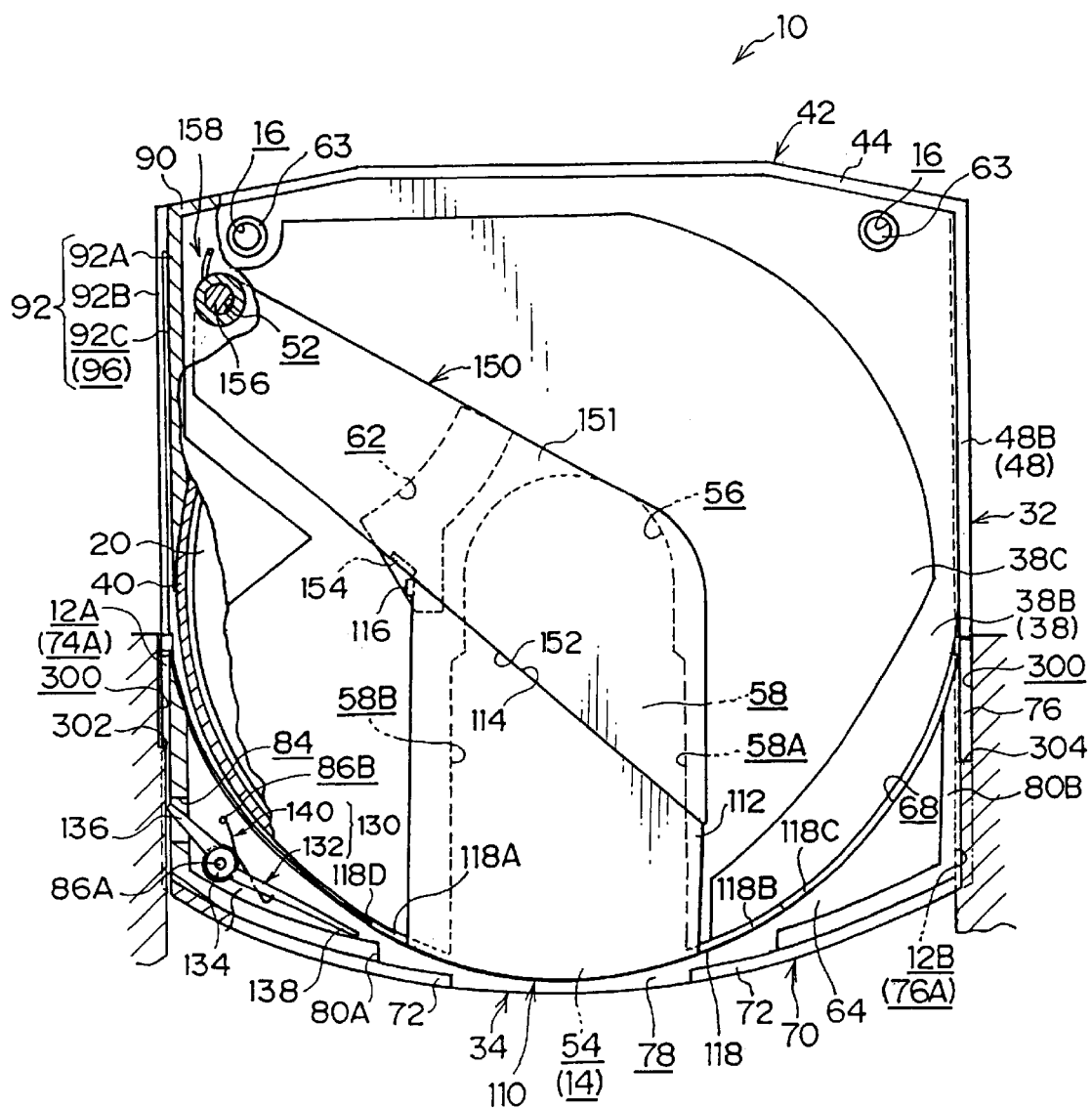
FIG. 5 is a view, corresponding to FIG. 4, showing a lock released state of the disk cartridge relating to the first embodiment of the present invention.
Figure 5:
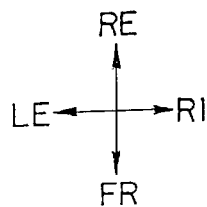

When the lock releasing lever 136 is pushed rearward, as shown in FIG. 5, the lock lever 132 rotates around the tubular shaft 134 (the shaft hole 86A). The lock releasing lever 136 is withdrawn to within the lock releasing lever hole 84, and the engaged state of the lock claw 138 and the lock engaging portion 118D of the circular-arc-shaped guide wall portion 118 is cancelled. In this way, the locked state of the first shutter member 110 is cancelled, and the first shutter member 110 rotates freely.

Figure 6:
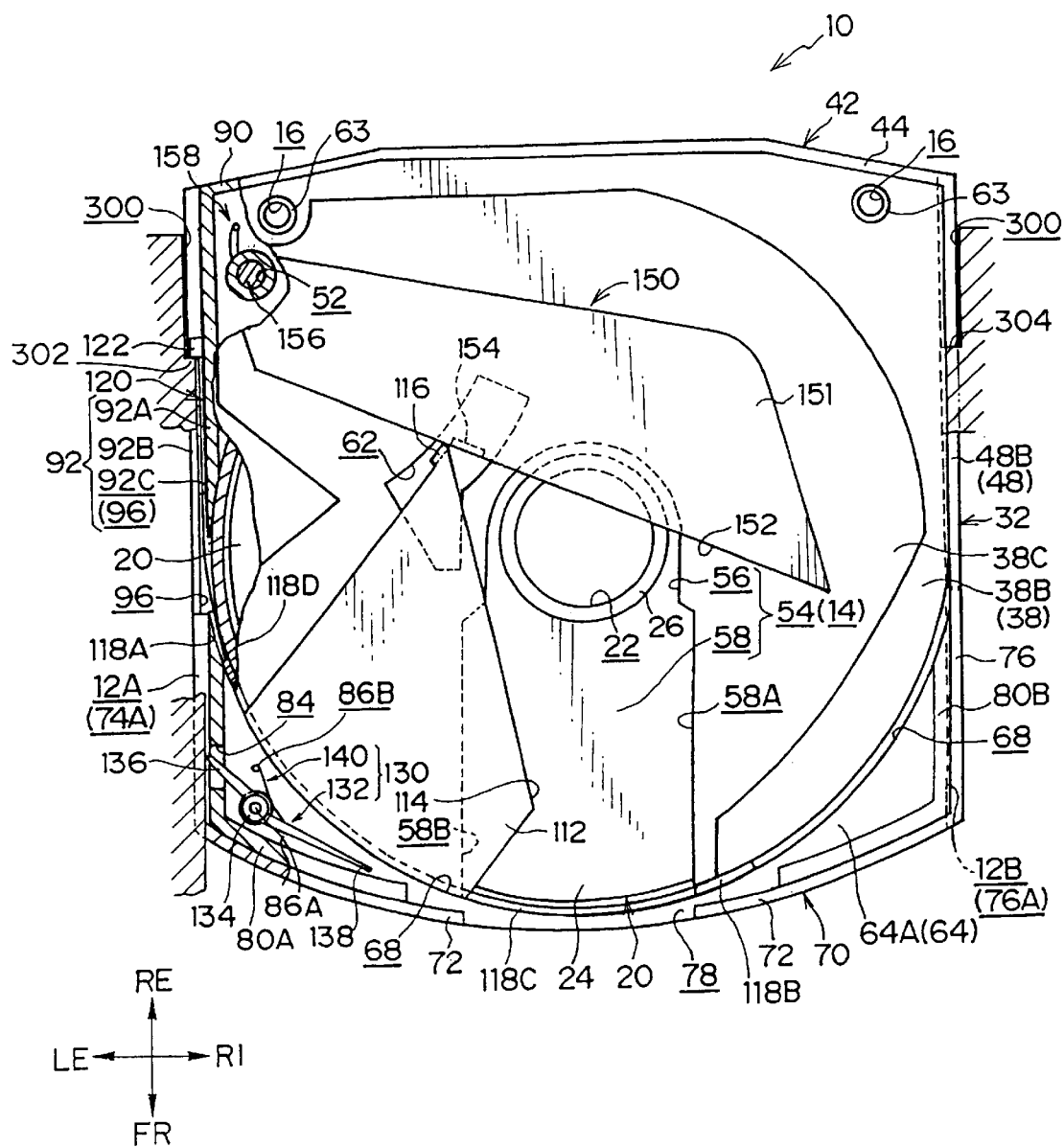
FIG. 6 is a view, corresponding to FIG. 4, showing a process of opening the opening of the disk cartridge relating to the first embodiment of the present invention.

When the guiding convex portion 302 of the drive device moves relatively further rearward within the first guide groove 12A, while this guiding convex portion 302 maintains the above-described lock released state, the guiding convex portion 302 engages with the shutter engaging portion 122 positioned within the first guide groove 12A, and pushes the shutter engaging portion 122 rearward. When the shutter engaging portion 122 is pushed rearward, as shown in FIG. 6, the first shutter member 110, whose locked state has been cancelled, rotates.

Namely, as the shutter engaging portion 122 moves rearward, the shutter pull-out portion 120 moves rearward in the shutter guiding groove 96 which extends in a tangential direction of the tubular wall 40. The circular-arc-shaped guide wall portion 118 thereby rotates while sliding along the outer peripheral surface of the tubular wall 40. As the circular-arc-shaped guide wall portion 118 rotates, the shutter main body 112, which is integral therewith, rotates along the tubular wall 40 (around the axial center of the tubular wall 40).

Further, as the first shutter member 110 rotates, the pushing piece 116 of the shutter main body 112 moves substantially rearward within the shutter guiding hole 62 (the pushing piece 116, which is provided so as to be set apart from the axial center of the tubular wall 40, rotates around the axial center of the tubular wall 40). When the pushing piece 116 moves substantially rearward, the pushed piece 154 of the second shutter member 150, which is disposed so as to abut the pushing piece 116, is pushed substantially rearward while sliding along the pushing piece 116, and moves along the circular-arc-shaped portion of the shutter guiding hole 62. As the pushed piece 154 moves, the second shutter member 150 rotates around the rotation shaft 156 in a direction of moving away from the first shutter member 110 against the urging force of the torsion spring 158.

Figure 7:
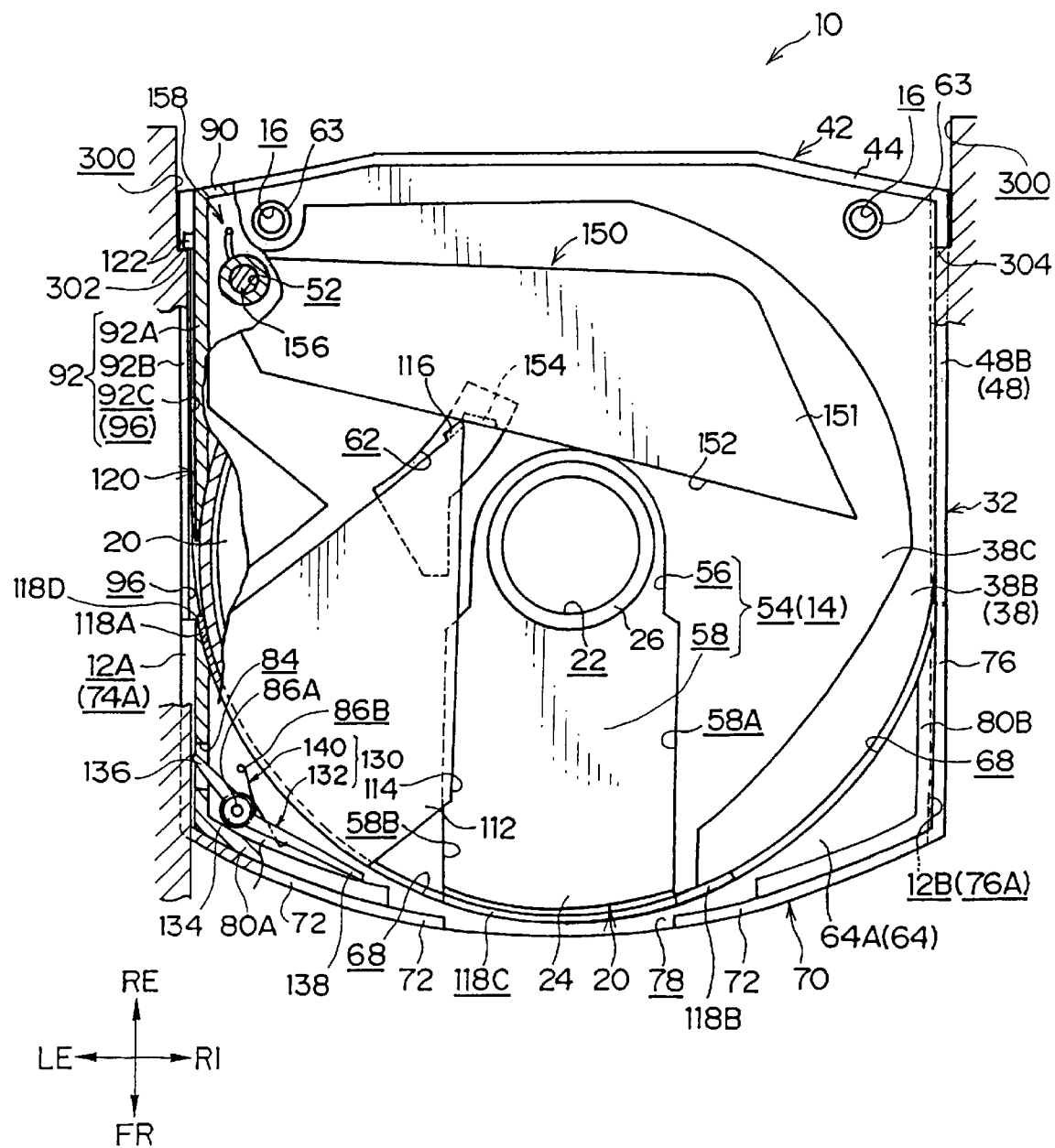
FIG. 7 is a view, corresponding to FIG. 4, showing an open state of the opening of the disk cartridge relating to the first embodiment of the present invention.

When the guiding convex portion 302 of the drive device moves relatively and further rearward within the first guide groove 12A while engaging with the shutter engaging portion 122 (while pushing the shutter engaging portion 122 rearward), as shown in FIG. 7, the first shutter member 110 (the shutter main body 112 and the circular-arc-shaped guide wall portion 118) and the second shutter member 150 rotate further, and the window portions 58, 104 for a recording/playback head and the hub holes 56, 102 are opened. In this state, the window portion 118C of the circular-arc-shaped guide wall portion 118 is positioned at the front portion of the disk cartridge 10, and the window portion 58 for a recording/playback head is open also to the front through the window portion 78 of the top surface plate portion 34. Namely, the opening 14 of the disk cartridge 10 is opened.

As described above, due to the first shutter member 110 and the second shutter member 150 moving (rotating) in respectively different directions while the abutting portions 114, 152 thereof move away from each other, the large opening 14 of the disk cartridge 10 can be opened while the area over which the shutters move is small.

Further, when the disk cartridge 10 is inserted to a predetermined position of the drive device, the positioning mechanism of the drive device is inserted into the holes 16 for position regulation, and the disk cartridge 10 is accurately positioned. In this way, the disk cartridge 10 cannot be inserted any further, and closing of the opening 14 due to the urging force of the torsion spring 158 and movement in the direction of discharging the disk cartridge 10 (movement toward the insertion opening 300 side) are prevented.

In this state, the rotation spindle shaft is inserted from a portion corresponding to the hub hole 56 of the opening 14 whose closed state has been canceled. At the distal end portion of the rotation spindle shaft, the rotation spindle shaft holds the center core portion 26 of the disk medium 20 by engagement or suction or the like, and rotates the disk medium 20 around the axial center. Further, a recording/playback head is inserted from a portion corresponding to the window portion 58 for a recording/playback head of the opening 14. Information is recorded onto the recording surface of the disk medium 20, or information recorded on the recording surface is played back.

On the other hand, when the disk cartridge 10 is to be discharged from the drive device, the positioning mechanism is removed from the holes 16 for position regulation, and movement in the discharging direction (movement toward the insertion opening 300 side) becomes possible. In this state, due to the urging force of the torsion spring 158 or discharging direction pushing force applied by the drive device, the disk cartridge 10 is moved with the rear end portion 10B thereof leading. Accompanying this movement, while the guiding convex portion 302 of the drive device is engaged with the shutter engaging portion 122, the pressing force via this guiding convex portion 302 is no longer applied, and the first shutter member 110 is set in a state in which rotation is possible.

In this state, while the disk cartridge 10 moves in the discharging direction as described above, the opening 14 is closed. Namely, due to the urging force of the torsion spring 158, the second shutter member 150 rotates in the direction of closing the opening 14 while, at the pushed piece 154, pushing the pushing piece 116 of the first shutter member 110 substantially forward. Further, the first shutter member 110, which is pushed substantially forward at the pushing piece 116, rotates in the direction of closing the opening 14 due to this pushing.

When the first shutter member 110 and the second shutter member 150 respectively rotate and return to their initial positions, the opening 14 is closed. The pushing piece 116 of the first shutter member 110 which has returned to its initial position engages with the inner edge of the front portion of the shutter guiding hole 62. Further rotation, due to the urging force of the torsion spring 158, of the first shutter member 110 and the second shutter member 150, which abuts the pushing piece 116 at the pushed piece 154, is prevented.

Rotation of the first shutter member 110 and the second shutter member 150 past their initial positions may be prevented by the pushed piece 154 of the second shutter member 150 being made to engage the peripheral edge portion of the shutter guiding hole 62 at the initial position. Or, rotation may be prevented by the distal end portion of the jutting-out portion 118B of the circular-arc-shaped guide wall portion 118 of the first shutter member 110 being made to engage the end portion of the widened portion of the annular groove 68 at the initial position. Or, the first shutter member 110 may return to its initial position by the shutter engaging portion 112 being pushed by the drive device.

When the disk cartridge 10 is moved further in the discharging direction and the guiding convex portion 302 is moved to a position further forward than the lock releasing lever hole 84 of the first guide groove 12A, due to the urging force of the torsion spring 140, the lock lever 132 rotates. The lock releasing lever 136 projects into the first guide groove 12A, and the lock claw 138 engages with the lock engaging portion 118D of the first shutter member 110. In this way, the disk cartridge 10 returns to the state before loading into the drive device, rotation of the first shutter member 110 is prevented, and the closed state of the opening 14 is maintained.

Here, at the shutter main body 112 and the shutter face plate 151, the affinity to resin of the metal plate 160 is improved due to the electrochemical surface treatment. Thus, the metal plate 160 and the resin layer 162 (the resin material) are joined strongly by the chemical reaction. Thus, the resin layer 162 does not peel off from the metal plate 160, and warping due to the residual stress thereof is corrected by the metal plate 160. Namely, warping of the shutter main body 112 is suppressed or prevented.

In this way, by using a resin material, the shutter main body 112 and the shutter face plate 151 are made to be lighter-weight (the rotation moments thereof are reduced), and the slidability thereof along the bottom surface plate portion 36 is improved.

Further, because the strength of the bonding (joining) of the metal plate 160 and the resin layer 162 is strong, there is no need to employ an embedded structure for use in insert molding as in the conventional art, and the joined-together state of the flat-plate-shaped metal plate 160 and the resin layer 162 can be maintained sound. Thus, the thickness of the resin layer 162 is uniform, the residual stress is reduced, and warping of the shutter main body 112 can be suppressed even more.

In this way, at the shutter main body 112 and the shutter face plate 151 relating to the present first embodiment, the occurrence of warping can be suppressed, the slidability is good, and the shutter main body 112 and the shutter face plate 151 are light-weight.

Because the metal plate 160 is formed from stainless steel and is highly rigid, the aforementioned warping can be corrected even more effectively. Further, because the bottom surface of the metal plate 160 (the surface thereof which is joined together with the resin material) is a rough surface, the strength of the joining (bonding) with the resin layer 162 is improved, which is even more preferable. In particular, because the bottom surface of the metal plate 160 (the surface thereof which is joined together with the resin layer) is a rough surface of Ra 0.2 or more, the effects of the electrochemical surface treatment are enhanced, and the joining strength is improved even more.

The resin layer 162, which forms the surface which slides along the bottom surface plate portion 36, is one of POM, PPS, PBT, PA and PC which are highly rigid, have good fatigue resistance, and are low friction materials. Thus, the slidability is improved, and the first shutter member 110 and the second shutter member 150 operate smoothly. In particular, because molybdenum, which is mixed in with the resin material forming the resin layer 162, precipitates on the sliding surface, the slidability is improved even more.

On the other hand, self-lubricating particulates are dispersed in a matrix in the top surface of the metal plate 160 (the surface at the side opposite the resin layer 162). Thus, the slidability of the top surface of the metal plate 160 also is improved. As a result, for example, also in cases in which the disk cartridge 10 is used in a state in which the bottom surface plate portion 36 is disposed along a vertical plane (i.e., in cases in which the sliding surface of the shutter main body 112 or the like is not limited to the top surface of the bottom surface plate portion 36), the first shutter member 110 and the second shutter member 150 operate smoothly.

Further, even in cases in which the shutter main body 112 and the shutter face plate 151 slide along the convex portion 38C of the base plate portion 32 as well in order to improve the dust-proof quality, the first shutter member 110 and the second shutter member 150 operate smoothly. Namely, the degrees of freedom in designing the disk cartridge 10 and the drive device are increased.

In the above-described first embodiment, the thickness of the metal plate 160 is substantially 0.1 mm, and the thickness of the resin layer 162 is substantially 0.4 mm. However, the present invention is not limited to the same. The thicknesses of the metal plate 160 and the resin layer 162 may of course be appropriately changed in accordance with, for example, the surface area of the opening 14. However, for example, the thickness of the metal plate 160, which forms the shutter main body 112 and the shutter face plate 151 which open and close the opening 14 having a surface area which corresponds to the disk medium 20 having a diameter of substantially 120 mm, preferably has 0.1 mm as the minimum limit thereof in light of the rigidity required in order to prevent warping. Further, the thickness of the resin layer 162 preferably has 0.4 mm as the minimum limit thereof in consideration of the capacity (cost) of the molding machine. Further, in the above-described first embodiment, a preferable structure is used in which the surface roughness of the bottom surface of the metal plate 160 is Ra 0.2 or more. However, the present invention is not limited to the same, and the surface roughness of the bottom surface of the metal plate 160 may be less than Ra 0.2.

In the first embodiment, a preferable structure is used in which the resin layer 162 is provided at the bottom surface plate portion 36 side. However, the present invention is not limited to the same, and the resin layer 162 may be provided at the base plate portion 32 side. This structure is preferable in cases in which, for example, a removal preventing member is provided at the distal end of the rotation shaft 156 of the second shutter member 150 and the shutter face plate 151 slides on the convex portion 38C.

Moreover, in the first embodiment, a preferable structure is used in which the resin material which forms the resin layer 162 is POM or the like. However, the present invention is not limited to the same, and the resin material may be, for example, ABS or PE.

In the above-described first embodiment, a preferable structure is used in which molybdenum in a powder form, which serves as a solid lubricant, is mixed-in, in an amount of 0.1% by mass or more, into the resin material which forms the resin layer 162. However, the present invention is not limited to the same. For example, in place of molybdenum, graphite or molybdenum disulfide, or a sulfide of lead or zinc or tungsten or the like may be mixed in, and the ratio of the amount which is mixed in may be changed appropriately. Further, it is of course possible to not mix in a solid lubricant.

Further, in the first embodiment which was described above, a preferable structure is used in which self-lubricating particulates are dispersed in the top surface of the metal plate 160. However, the present invention is not limited to the same. For example, the top surface of the metal plate 160 may be subjected to chrome plating or nickel plating. Or, it is possible to not subject the top surface of the metal plate 160 to a treatment for improving the slidability. Moreover, the metal plate 160 is not limited to a structure formed from stainless steel, and for example, may be formed from aluminum or iron or the like. Note that, in a case in which the metal plate is formed from a corrosive metal material such as iron or the like, it is preferable to carry out a rustproofing treatment thereon.

In the above-described first embodiment, a preferable structure is used in which the shutter main body 112 of the first shutter member 110 and the shutter face plate 151 of the second shutter member 150 each have a two-layer structure as the shutter for a disk cartridge relating to the present invention. However, the present invention is not limited to the same, and it is possible to make only either one a two-layer structure of a metal layer and a resin layer. Further, this two-layer structure may of course be applied as well to the circular-arc-shaped guide wall portion 118 of the first shutter member 110. Moreover, the configuration of the shutter main body 112 and the like and the range of opening and closing the opening 14 are not limited to those in the first embodiment. For example, a structure may be used in which a shutter, which is rectangular as seen in plan view, opens and closes the opening 14 while sliding in left and right directions along the outer surface of the case 30 or the like.

(Second Embodiment)

Next, a disk cartridge 170 relating to a second embodiment of the present invention will be described. Parts and portions which are basically the same as those of the above-described first embodiment are denoted by the same reference numerals as in the first embodiment, and description thereof is omitted.

Figure 10:
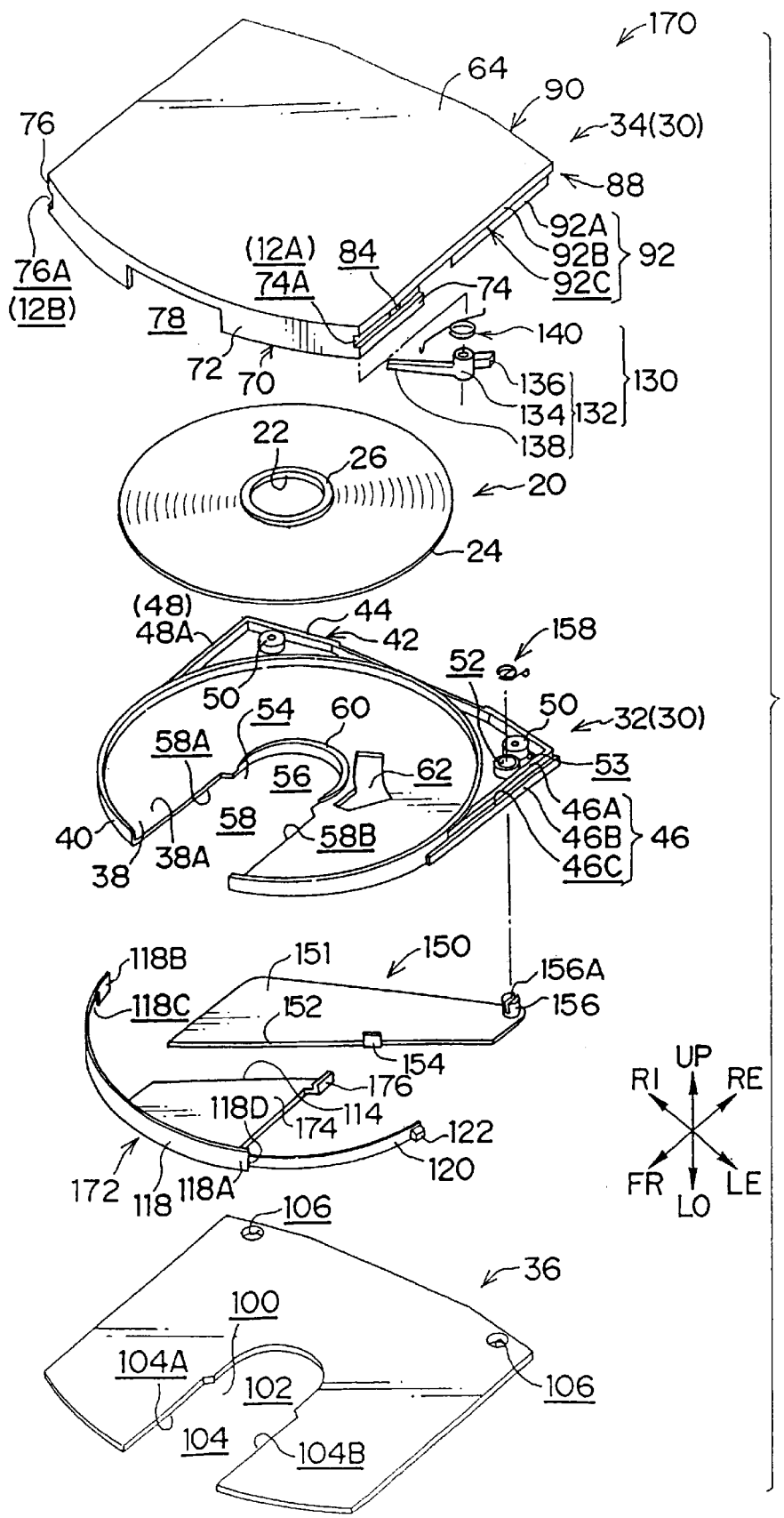
FIG. 10 is an exploded perspective view, as seen from above, of a disk cartridge relating to a second embodiment of the present invention.
Figure 11:
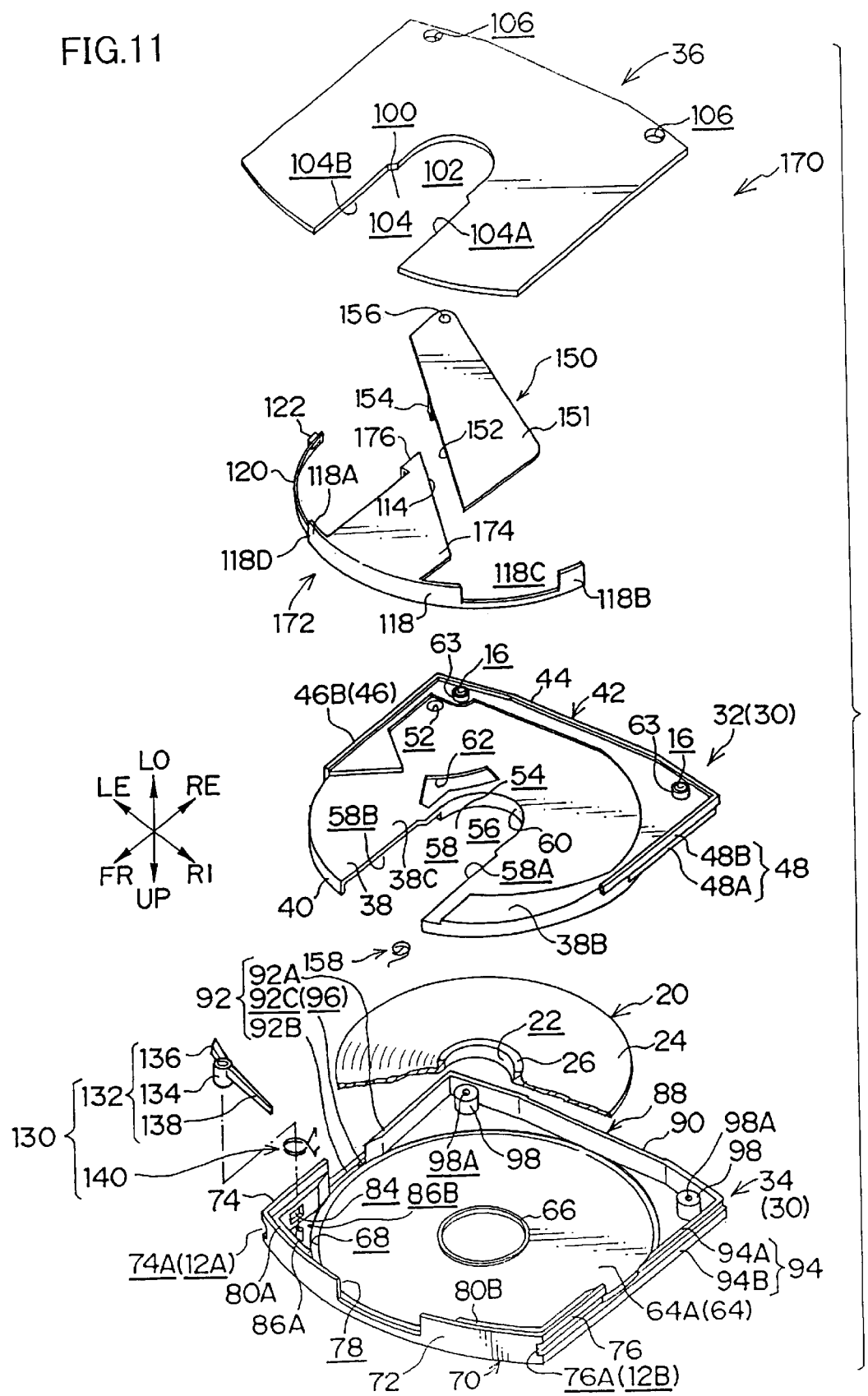
FIG. 11 is an exploded perspective view, as seen from below, of the disk cartridge relating to the second embodiment of the present invention.

As shown in FIGS. 10 and 11, the disk cartridge 170 is provided with a first shutter member 172 in place of the first shutter member 110. The first shutter member 172 is similar to the first shutter member 110 of the first embodiment in that the first shutter member 172 has the circular-arc-shaped guide wall portion 118, the shutter pull-out portion 120, and the shutter engaging portion 122.

However, the first shutter member 172 differs from the first shutter member 110 of the first embodiment in that the first shutter member 172 is provided with a shutter main body 174 and a pushing piece 176 in place of the shutter main body 112 and the pushing piece 116. Note that the materials of the shutter main body 174 and the shutter face plate 151 in the present second embodiment are not limited. The shutter main body 174 and the shutter face plate 151 may be formed by, for example, a resin material, a metal material, a combination thereof (including the above-described two-layer structure), or the like.

Hereinafter, the shutter main body 174 and the pushing piece 176 which form the first shutter member 172 will be described. When the respective front, back, left, right directions of the first shutter member 172 are mentioned in the following description, they basically indicate the front, back, left, right directions of the first shutter member 172 in the state in which the opening 14 is closed.

The shutter main body 174 which forms the first shutter member 172 is formed in a substantially trapezoidal configuration, as seen in plan view, which is substantially the same shape as that of the shutter main body 112. The widthwise dimension, in the left-right direction, of the shutter main body 174 is slightly larger than the widthwise dimension of the opening 14 (the window portion 58 for a recording/playback head). The shutter main body 174 can thereby mainly open and close the portion corresponding to the window portion 58 for a recording/playback head of the opening 14.

The widthwise dimension of the shutter main body 174 is smaller than the corresponding widthwise dimension of the shutter main body 112. The shutter main body 174 is smaller than the shutter main body 112 by an amount corresponding to the surface area of region A shown by the hatching in FIG. 15. Further, the shutter main body 174 has the abutting portion 114 which is exactly the same (has the same length and angles) as that of the shutter main body 112.

Figure 14:
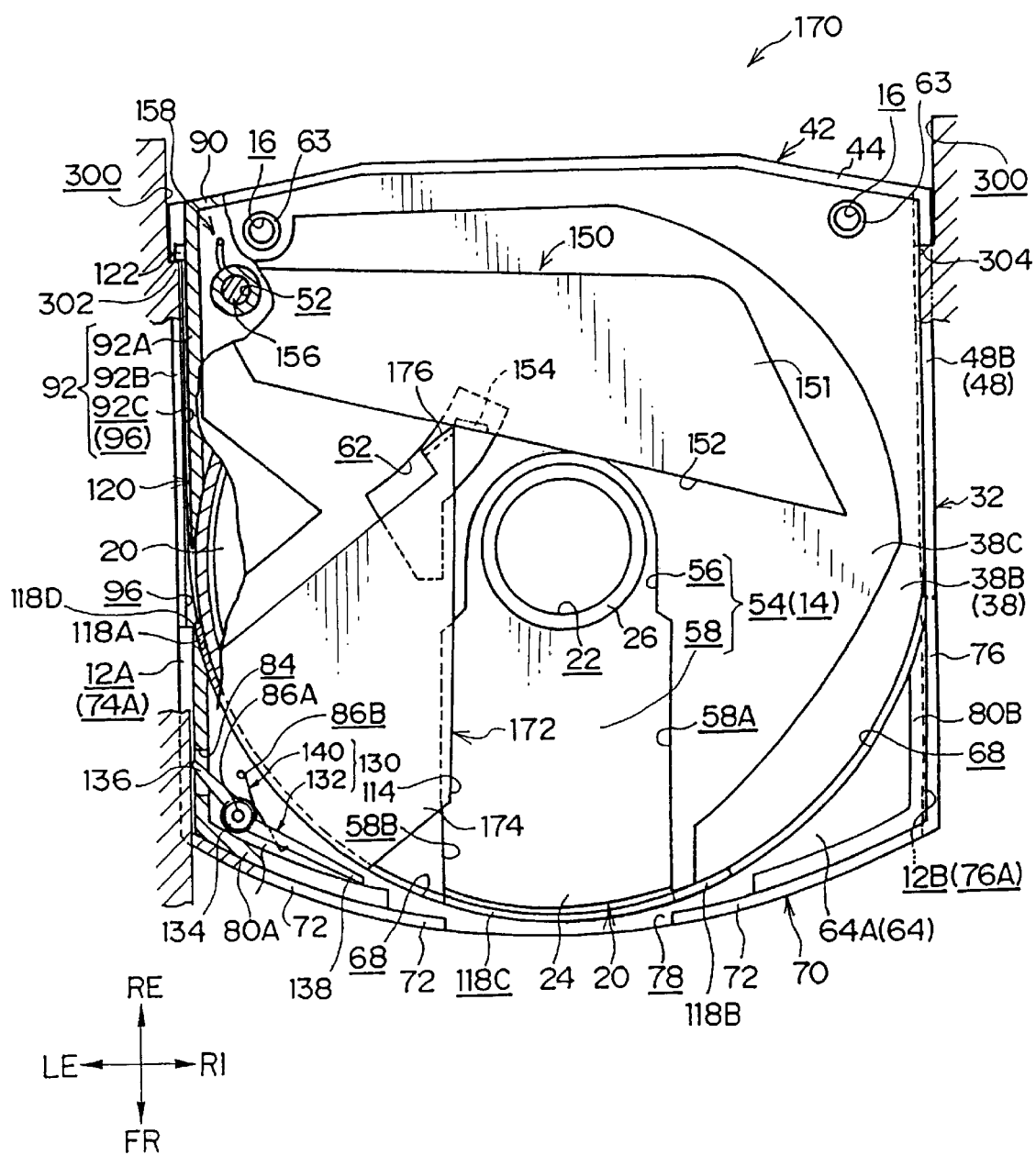
FIG. 14 is a view, corresponding to FIG. 12, showing an open state of the opening of the disk cartridge relating to the second embodiment of the present invention.

The dimensions of the respective portions of the shutter main body 174 are determined such that, when the circular-arc-shaped guide wall portion 118 is guided along the tubular wall 40 and rotates by a predetermined amount (the same amount as the shutter main body 112 as described above, e.g., 50°) around the axial center of the tubular wall 40, the abutting portion 114 moves to a position along the left end portion (along the front-back direction) of the opening 14 and opens the window portion 58 for a recording/playback head (see FIG. 14).

Further, accompanying this rotation, the shutter main body 174 together with the shutter face plate 151 slides along the concave portion 38C of the base plate portion 32 (the case 30) and the top surface of the bottom surface plate portion 36 respectively.

On the other hand, at the pushing piece 176, the left end portion of the portion which extends toward the left (toward the left-right transverse direction outer side of the shutter main body 174) along the abutting portion 114 from the rear left corner portion of the shutter main body 174, is formed so as to be folded over upwardly. Namely, the pushing piece 176 projects further leftward than the left end portion of the shutter main body 174, and is set apart from the axial center of the tubular wall 40 which is the center of rotation thereof.

The distance between the pushing piece 176 and the axial center of the tubular wall 40 is determined such that, in the state in which the shutter main body 174 together with the pushing piece 176 rotates around the axial center of the tubular wall 40 and opens the window portion 58 for a recording/playback head, the second shutter member 150, which is pushed while abutting the pushing piece 176 at the pushed piece 154 thereof, can rotate around the rotation shaft 156 to the position of opening the hub hole 56 (see FIG. 14). Namely, the position of the pushing piece 176 with respect to the axial center of the tubular wall 40 (i.e., the distance therebetween) is the same as the position of the pushing piece 116 with respect to the axial center of the tubular wall 40.

Further, in the same way as the pushing piece 116, the pushing piece 176 is inserted and disposed in the shutter guiding hole 62, and does not slide on the base plate portion 32 (the case 30).

Next, as the operation of the disk cartridge 170 relating to the present second embodiment, the portions which are different from those of the above-described first embodiment will mainly be described.

Figure 12:
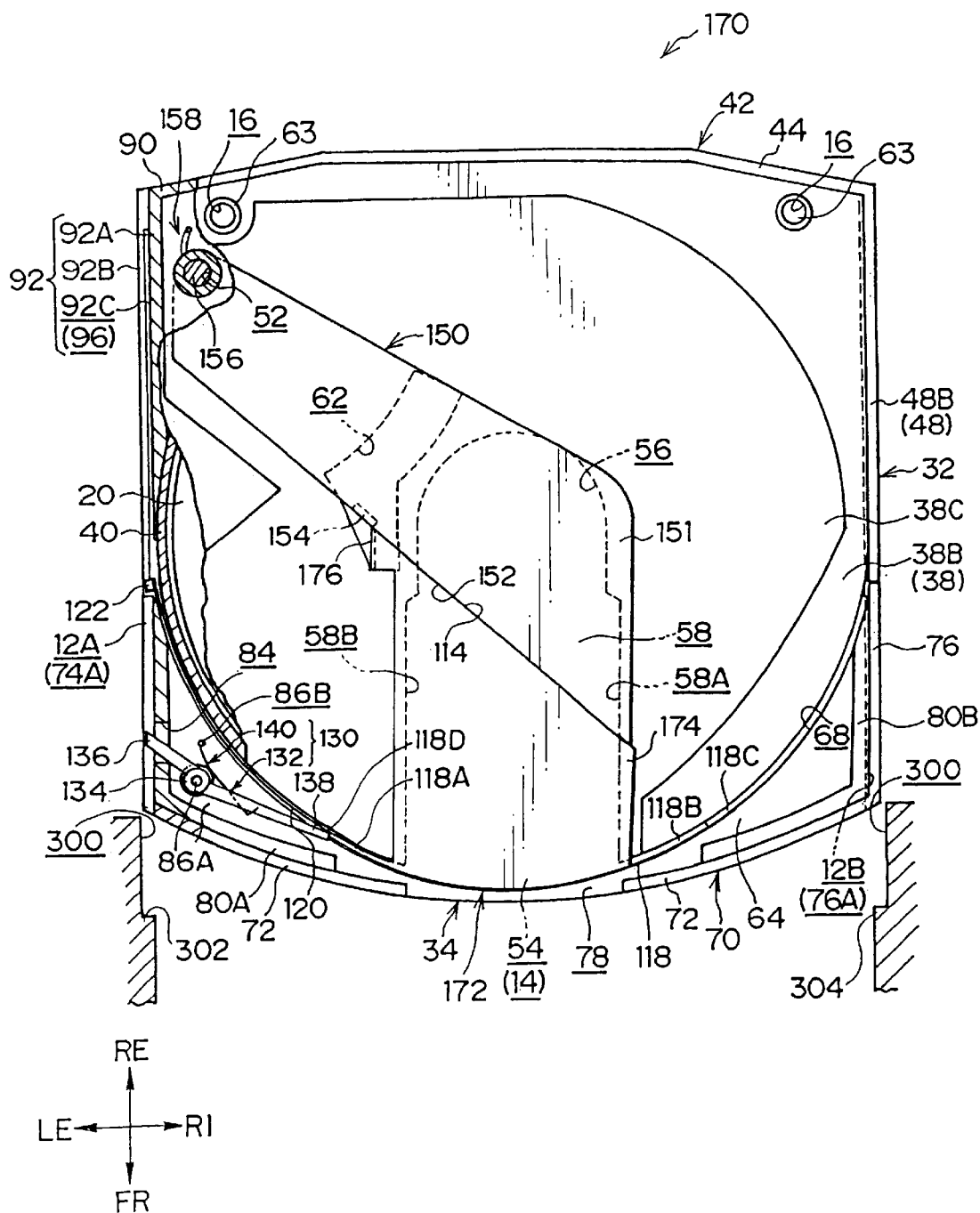
FIG. 12 is a bottom view, in which a bottom surface plate portion is removed and a portion is cut-out, showing the entire structure, in a state in which an opening is closed, of the disk cartridge relating to the second embodiment of the present invention.
Figure 13:
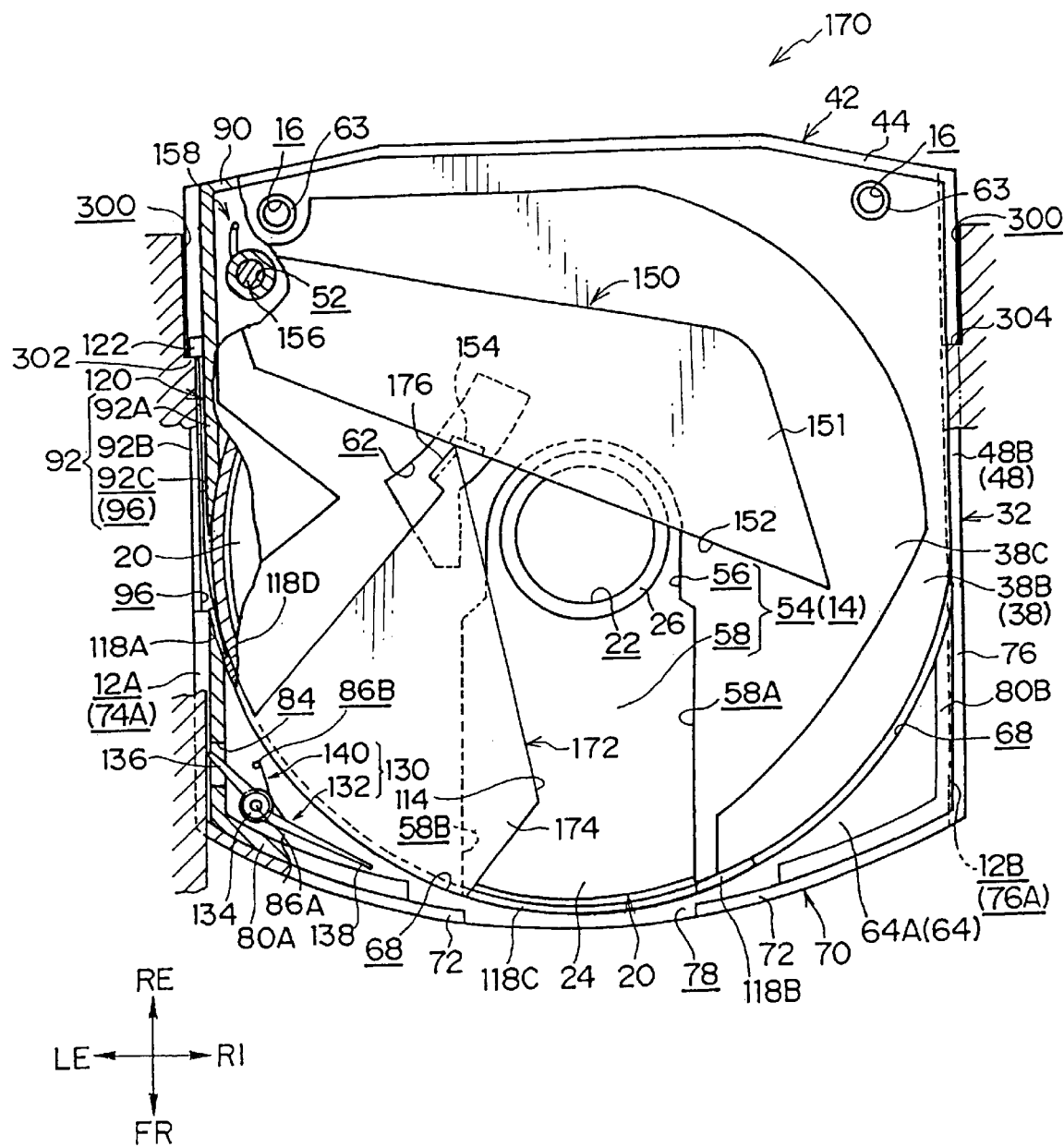
FIG. 13 is a view, corresponding to FIG. 12, showing a process of opening the opening of the disk cartridge relating to the second embodiment of the present invention.

In the disk cartridge 170 having the above-described structure, as shown in FIGS. 12 through 14, the first shutter member 172 and the second shutter member 150 are operated and open and close the opening 14 in the same way as in the disk cartridge 10.

Namely, at the time when the disk medium 20 is not in use, as shown in FIG. 12, the opening 14 is closed by the first shutter member 172, which is locked at the position of closing the opening 14 by the locking means 130, and the second shutter member 150, which is urged in the direction of closing the opening 14 by the torsion spring 158.

On the other hand, when the disk medium 20 is to be used, as shown in FIG. 13, the disk cartridge 170 is inserted into the insertion opening 300 of the drive device. Due to this insertion operation, the shutter engaging portion 122 moves rearward. Thus, while the first shutter member 172 rotates around the axial center of the tubular wall 40, the second shutter member 150 is, at the pushed piece 154 which abuts (slides along) the pushing piece 176, pushed around the rotation shaft 156 in the direction of opening the opening 14. The opening 14 is thereby opened (see FIG. 14).

Further, at the time of closing the opening 14, while the second shutter member 150 pushes the first shutter member 172 due to the urging force of the torsion spring 158, the second shutter member 150 and the first shutter member 172 respectively rotate in directions of closing the opening 14 and return to their initial states. Note that, separately from the second shutter member 150 which is rotated in the direction of closing the opening 14 due to the urging force of the torsion spring 158, the first shutter member 172 is returned to its initial state due to the shutter engaging portion 122 being pushed forward.

Here, the pushing piece 176 projects toward the transverse direction outer side (toward the left) of the shutter main body 174 (the first shutter member 172), and the widthwise dimension of the shutter main body 174 corresponds to the left-right direction widthwise dimension of the opening 14 (the window portion 58 for a recording/playback head). Namely, the shutter main body 174 is not wide enough to include the portion at which the pushing piece 176 is set. Thus, the sliding surface area of the shutter main body 174 on the case 30 (the concave portion 38C) and the top surface of the bottom surface plate portion 36 can be reduced with the pushing piece 176 being set suitably apart from the axial center of the tubular wall 40 (the center of rotation of the shutter main body 174).

Figure 15:
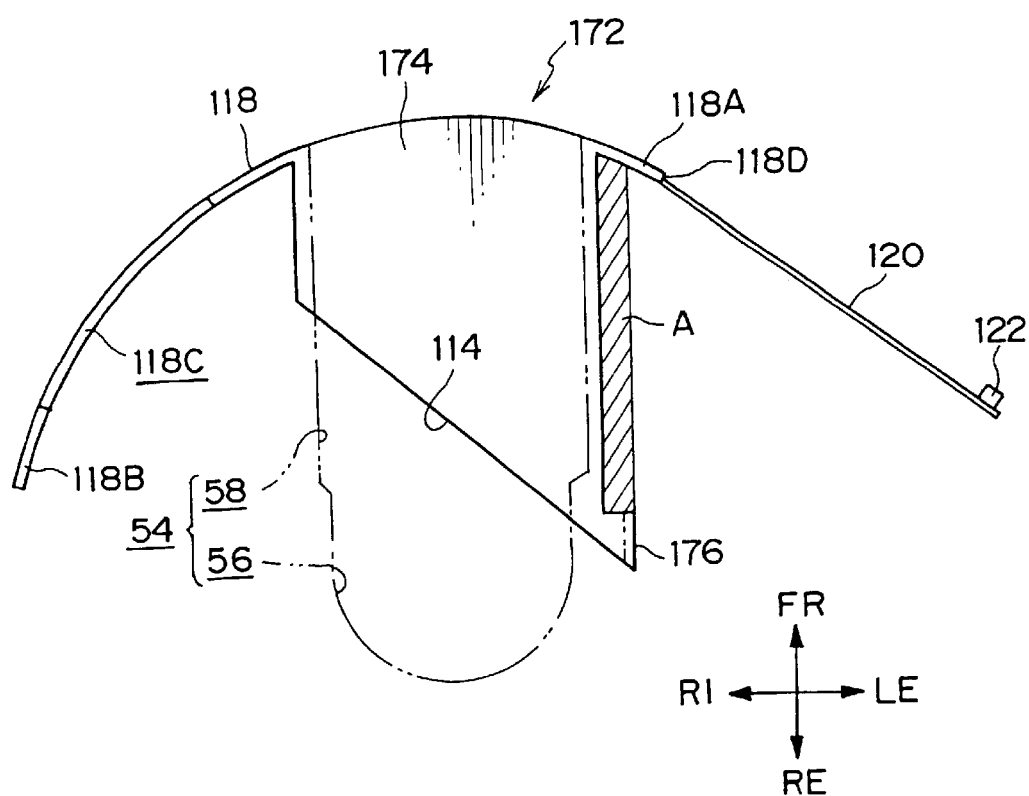
FIG. 15 is a bottom view showing the structure of a first shutter member relating to the second embodiment of the present invention.

Namely, as shown in FIG. 15, the sliding surface area of the first shutter member 172 along the case 30 and the bottom surface plate portion 36 can be reduced by an amount corresponding to the surface area of the region A, as compared with a conventional first shutter member.

Accordingly, as the shutter main body 174 (the first shutter member 172) rotates, the shutter main body 174 pushes the second shutter member 150 (the pushed piece 154) such that the second shutter member 150 can move to the position of opening the hub hole 56 (such that a predetermined pushing stroke can be maintained), and the sliding resistance with respect to the case 30 and the bottom surface plate portion 36 is suppressed such that operation is smooth. In particular, because region A is a region which usually slides on the case 30 and the bottom surface plate portion 36 (i.e., which does not pass by the opening 14) as the opening 14 is opened and closed, there is a great effect of suppressing the sliding resistance.

In this way, at the disk cartridge 170 relating to the present second embodiment, while the amount of movement of the second shutter member 150 due to the pushing of the shutter main body 174 is ensured, the sliding resistance between the shutter main body 174 and the case 30 and the bottom surface plate portion 36 is suppressed. Further, the first shutter member 172 can be made to be lighter-weight by an amount corresponding to the surface area of region A as described above.

In this way, at the disk cartridge 170, the shutter mechanism (the first shutter member 172 in particular) operates smoothly by a moderate driving force and can open and close the opening 14. Thus, in the structure in which the first shutter member 172 is also driven by the urging force of the torsion spring 158 at the time of closing the opening 14, the torsion spring 158 can be made smaller.

In the above-described second embodiment, a preferable structure is used in which the shutter main body 174 slides along both the case 30 (the concave portion 38C) and the top surface of the bottom surface plate portion 36. However, the present invention is not limited to the same. For example, the shutter main body 174 and the shutter face plate 151 may slide along either one of the case 30 (the concave portion 38C) and the top surface of the bottom surface plate portion 36.

In the second embodiment, the pushing piece 176 is formed by bending over an extended portion of the shutter main body 174. However, the present invention is not limited to the same. For example, the pushing piece 176 which is a separate member may be connected to the shutter main body 174. This structure is suitable for cases in which the shutter main body 174 and the pushing piece 176 are formed of different materials.

Moreover, in the above-described second embodiment, a preferable structure is used in which the pushing piece 176 is provided along the abutting portion 114. However, the present invention is not limited to the same. For example, the pushing piece 176 may be provided so as to project toward the rear as seen in plan view, and the pushed piece 154 may be provided at a position which is recessed further than the abutting portion 152. This structure is suitable to, for example, cases in which the pushed piece 154 which is a separate member is fit with and fixed to a fit-together hole which is provided in the second shutter member 150.

In the second embodiment which was described above, the bottom end portion of the pushing piece 176 is provided along the bottom surface of the shutter main body 174 (the surface which slides along the bottom surface plate portion 36). However, the present invention is not limited to the same, and the bottom end portion of the pushing piece 176 may be positioned above the bottom surface of the shutter main body 174 (i.e., there may be a step). In this structure, because the pushing piece 176 does not slide along the bottom surface plate portion 36, the sliding resistance is suppressed even more.

Moreover, in the second embodiment, the pushing piece 176 is disposed in the shutter guiding hole 62 which is provided so as to pass through the base bottom portion 38 of the base plate portion 32 (the case 30). However, the present invention is not limited to the same. For example, the pushing piece 176 may be disposed within a concave portion which is formed in the base plate portion 32 in correspondence with the configuration of the shutter guiding hole 62. Or, the pushing piece 176 may move within a concave portion which is formed in the bottom surface plate portion 36 in correspondence with the configuration of the shutter guiding hole 62, and not slide on the bottom surface plate portion 36.

(Third Embodiment)

Next, a disk cartridge 180 relating to a third embodiment of the present invention will be described. Parts and portions which are basically the same as those of the above-described first embodiment are denoted by the same reference numerals as in the first embodiment, and description thereof is omitted.

Figure 16:
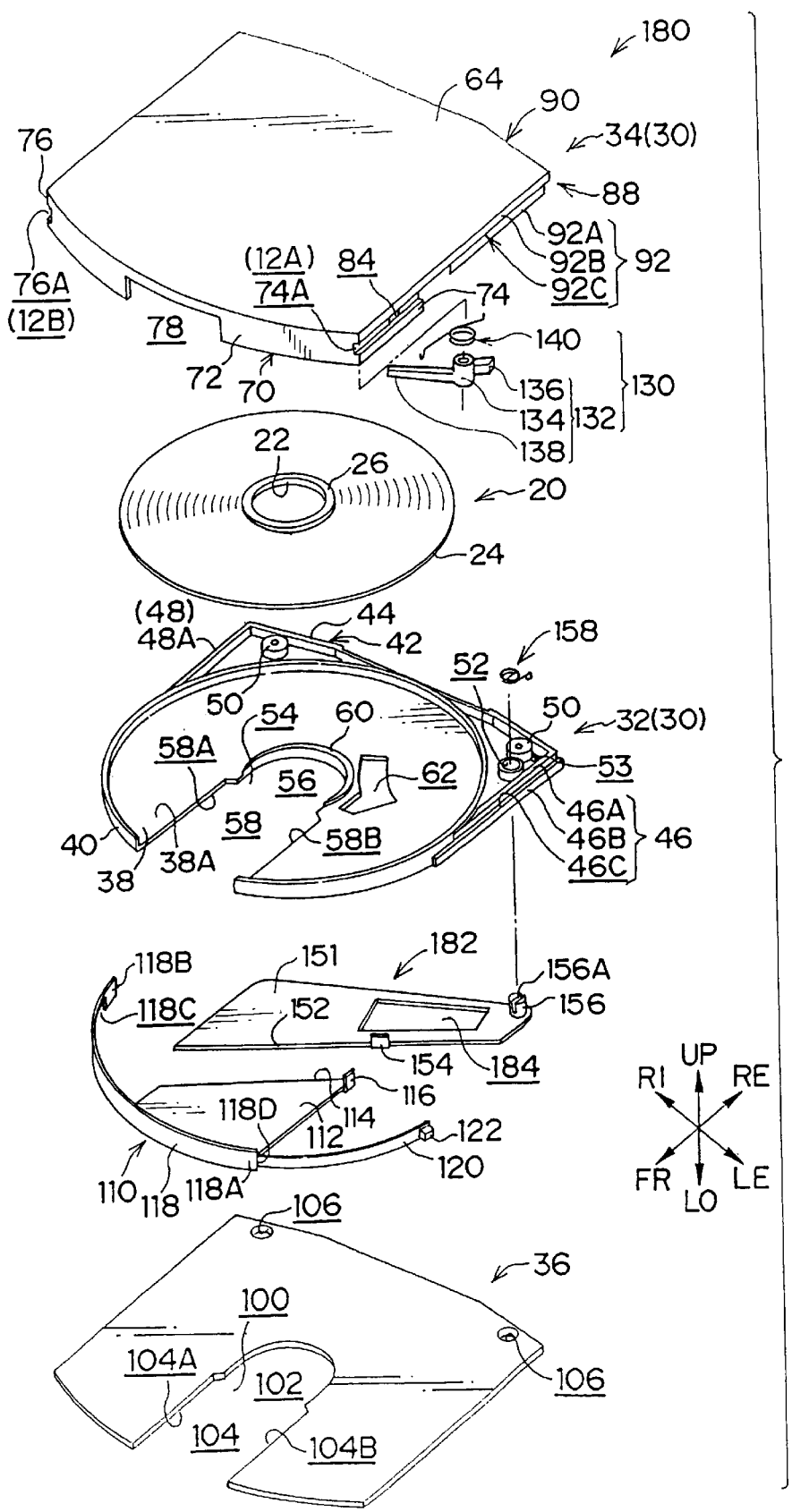
FIG. 16 is an exploded perspective view, as seen from above, of a disk cartridge relating to a third embodiment of the present invention.
Figure 17:
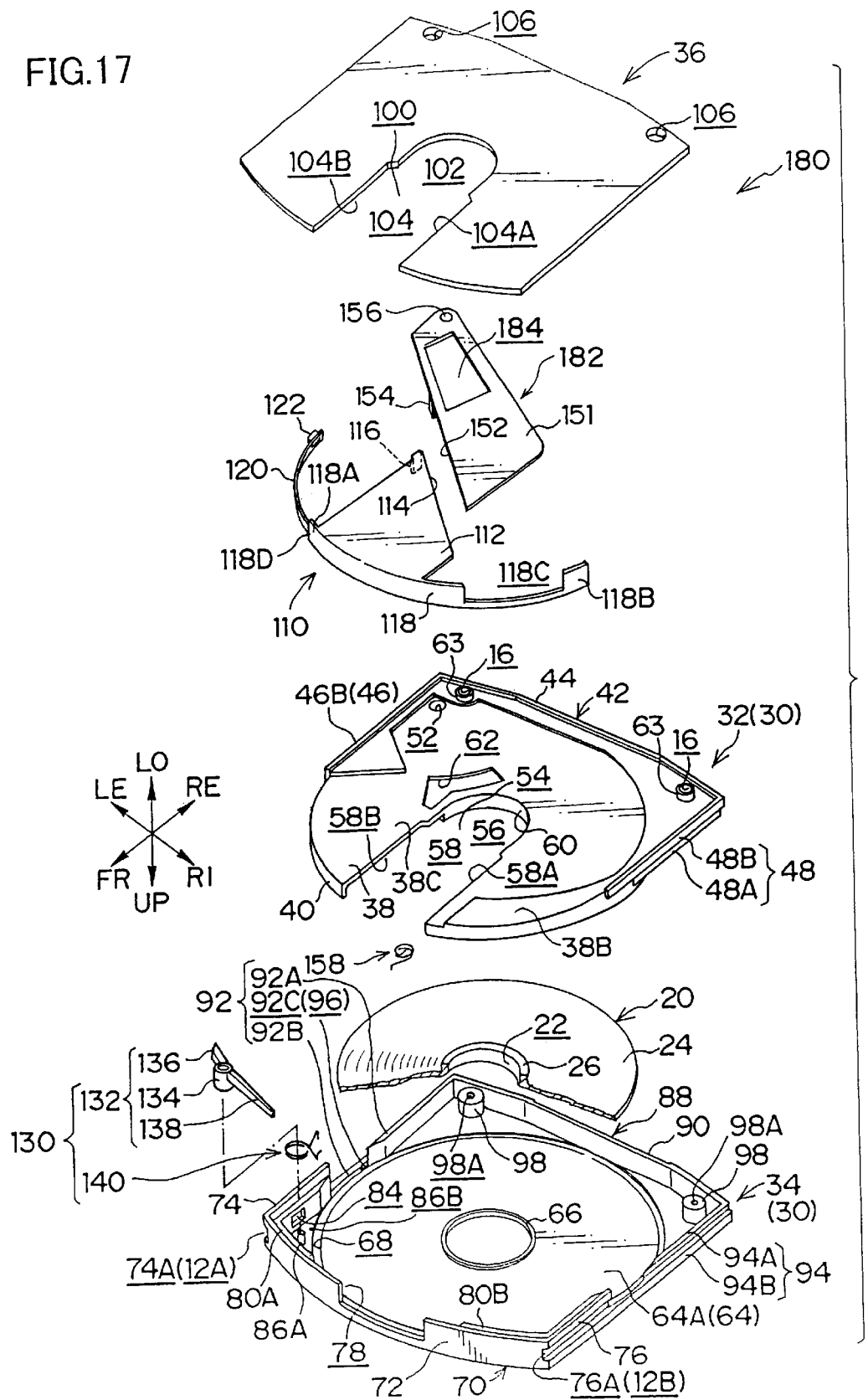
FIG. 17 is an exploded perspective view, as seen from below, of the disk cartridge relating to the third embodiment of the present invention.

As shown in FIGS. 16 and 17, the disk cartridge 180 has a second shutter member 182 instead of the second shutter member 150. The second shutter member 182 is similar to the second shutter member 150 of the first embodiment in that the second shutter member 182 has the shutter face plate 151 (the abutting portion 152), the pushed piece 154, and the rotation shaft 156 (the slit 156A).

However, the second shutter member 182 differs from the second shutter member 150 of the first embodiment in that a through hole portion 184 is formed in the shutter face plate 151 of the second shutter member 182. Note that the materials of the shutter face plate 151 and the shutter main body 112 in the present third embodiment are not limited. The shutter face plate 151 and the shutter main body 112 may be formed by, for example, a resin material, a metal material, a combination thereof (including the above-described two-layer structure), or the like.

Hereinafter, the through hole portion 184 of the shutter face plate 151 which forms the second shutter member 182 will be described.

As mentioned above, the through hole portion 184, which serves as a lightening portion in the present invention, is provided in the shutter face plate 151 of the second shutter member 182.

Figure 18:
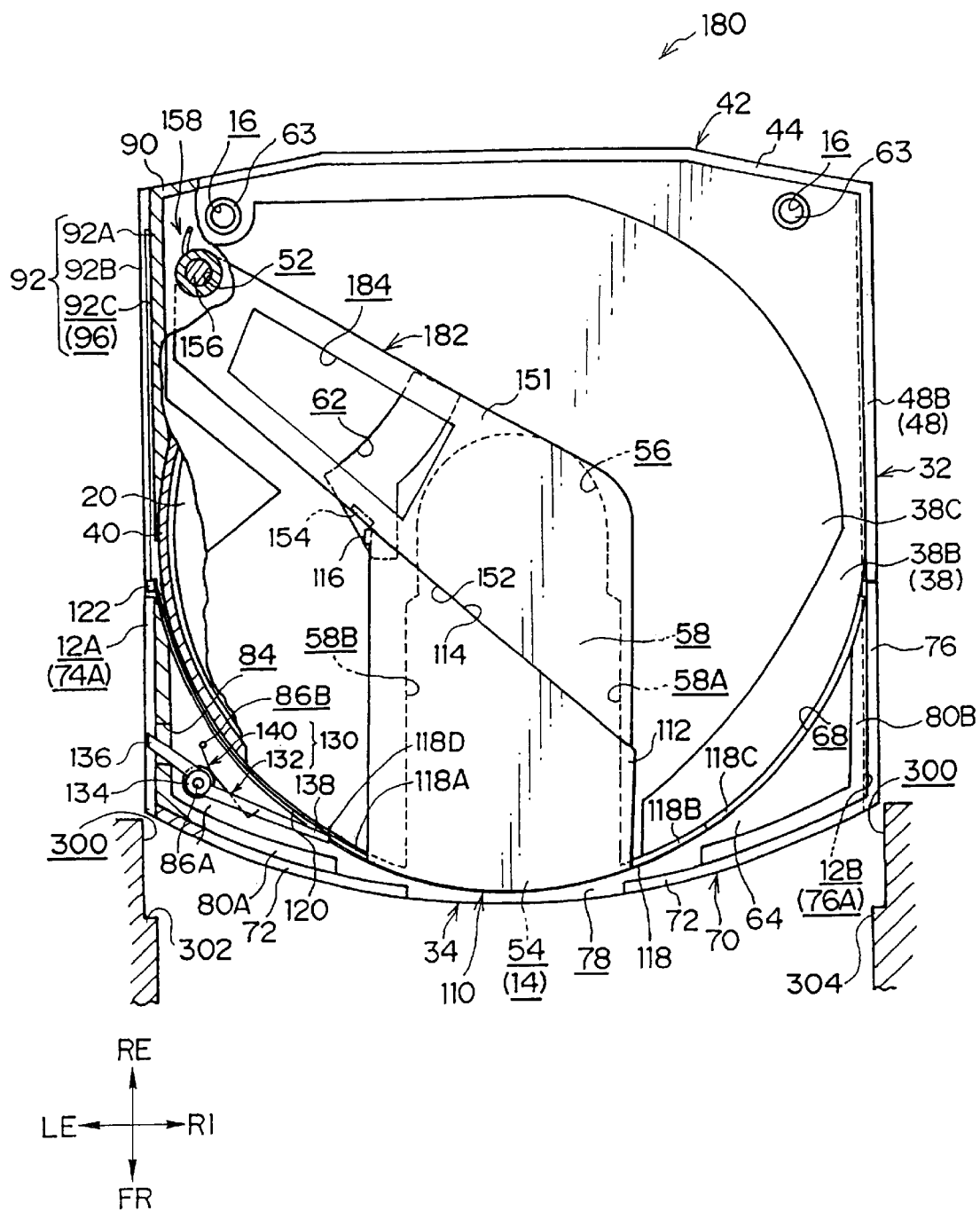
FIG. 18 is a bottom view, in which a bottom surface plate portion is removed and a portion is cut-out, showing the entire structure, in a state in which an opening is closed, of the disk cartridge relating to the third embodiment of the present invention.

The through hole portion 184 is formed in a substantially rectangular shape, and is provided so as to pass through the shutter face plate 151 in the plate thickness direction thereof at the substantially central portion of the shutter face plate 151. As shown in FIG. 18, the through hole portion 184 does not have a portion which opposes the opening 14 (does not communicate with the opening 14 in the thickness direction of the disk cartridge 180) in the state in which the opening 14 (the hub hole 56) is closed.

Namely, the through hole portion 184 is provided between the rotation shaft 156 and the portion of the shutter face plate 151 (the second shutter member 182) which closes the opening 14 at the time when the disk medium 20 is not in use (i.e., is provided at a portion other than the portion which closes the opening 14 at the time when the disk medium 20 is not in use). Note that in the processes of opening and closing the opening 14, the through hole portion 184 may of course pass by the opening 14 (may oppose the opening 14).

As the shutter face plate 151 in which the through hole portion 184 is provided rotates around the rotation shaft 156 at the time of opening and closing the opening 14, the shutter face plate 151 together with the shutter main body 112 slides along the concave portion 38C of the base plate portion 32 (the case 30) and the top surface of the bottom surface plate portion 36 respectively.

Next, as the operation of the disk cartridge 180 relating to the present third embodiment, the portions which are different from those of the above-described first embodiment will mainly be described.

Figure 19:
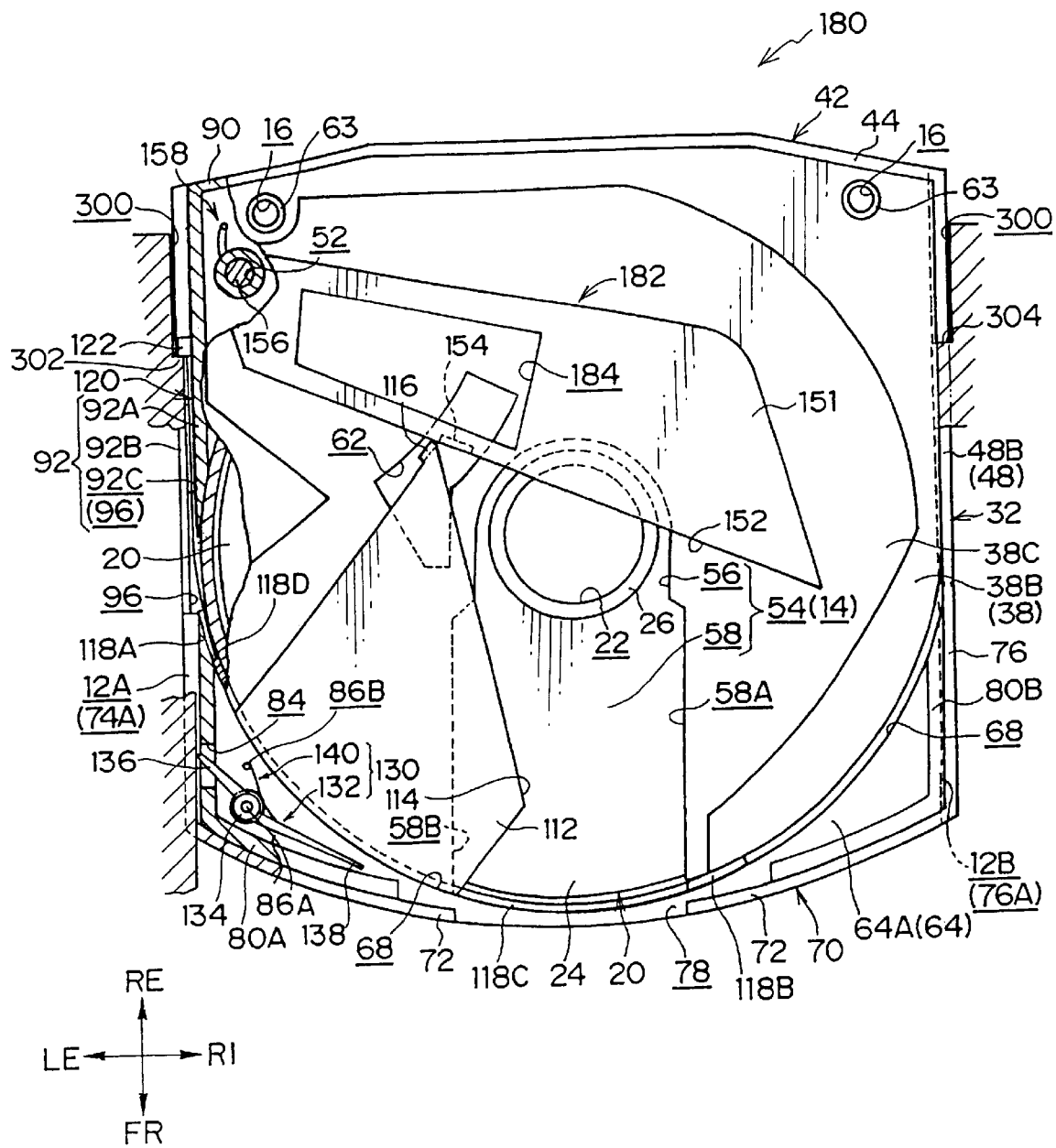
FIG. 19 is a view, corresponding to FIG. 18, showing a process of opening the opening of the disk cartridge relating to the third embodiment of the present invention.
Figure 20:
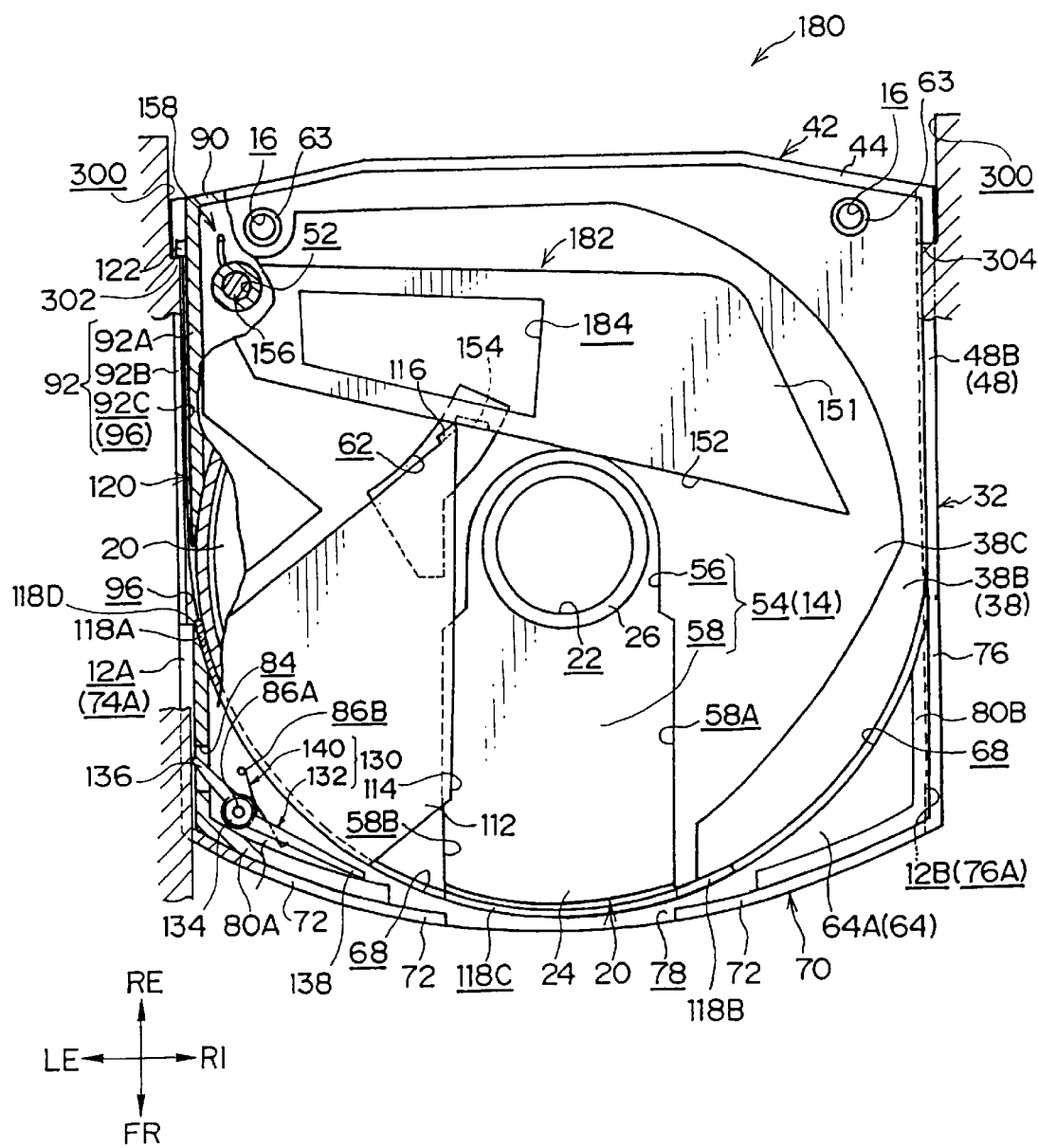
FIG. 20 is a view, corresponding to FIG. 18, showing an open state of the opening of the disk cartridge relating to the third embodiment of the present invention.

At the disk cartridge 180 having the above-described structure, the second shutter member 182 has the same dimensions and configuration as those of the second shutter member 150, except for the point that the through hole portion 184 is provided in the second shutter member 182. Thus, as shown in FIGS. 18 through 20, the opening 14 is opened and closed in the exactly same way as the operations of the disk cartridge 10 shown in FIGS. 4 through 7. Therefore, explanation of these basic operations will be omitted. In the state in which the opening 14 is closed as shown in FIG. 18, the through hole portion 184 of the second shutter member 182 does not communicate with the opening 14. Namely, the through hole portion 184 is covered by the bottom surface plate portion 36. Thus, dust and the like do not enter into the case 30 through the through hole portion 184.

Here, because the through hole portion 184 is provided in the shutter face plate 151 of the second shutter member 182, the shutter face plate 151 is made lighter-weight. In particular, the weight of the elongated shutter face plate 151, which is long between the rotation shaft 156 provided at one end portion and the portion which closes the hub hole 56 which is formed at the other end side, is greatly reduced, which is preferable.

The through hole portion 184 faces both the bottom surface plate portion 36 and the case 30 (the concave portion 38C of the base plate portion 32) along which the shutter face plate 151 slides as the opening 14 is opened and closed. Namely, the through hole portion 184 is provided in the surfaces (at the sliding sides) which oppose the case 30 and the bottom surface plate portion 36. Thus, at the through hole portion 184, the shutter face plate 151 does not slide along the case 30 and the bottom surface plate portion 36. The sliding surface area of the shutter face plate 151 with the case 30 and the bottom surface plate portion 36 is reduced, and the sliding resistance at the time of opening and closing the opening 14 is suppressed. In this way, the driving force for rotating the second shutter member 182 in directions of opening and closing the opening 14 can be made small. Specifically, the operation force of the first shutter member 110 which pushes and rotates the second shutter member 182 at the time of opening the opening 14 (i.e., the pushing force for moving the shutter engaging portion 122 rearward, namely, the force for loading the disk cartridge 180 into the drive device) can be reduced. Further, the urging force of the torsion spring 158 which urges the second shutter member 182 in the direction of closing the opening 14 can be reduced.

In this way, in the disk cartridge relating to the present third embodiment, the shutter member can be made lighter-weight, the sliding resistance can be suppressed, and the opening can be opened and closed by the shutter members being driven by appropriate driving forces.

Further, accompanying the reduction in the urging force of the torsion spring 158, the torsion spring 158 can be made more compact. The range of operation of the first shutter member 110 and the second shutter member 182 (i.e., the open surface area of the opening 14) can be ensured while the disk cartridge 180 can be made compact. Conversely, the open surface area of the opening 14 can be enlarged while an increase in the size of the disk cartridge 180 is avoided. Further, by making the shutter face plate 151 more light-weight, the load applied to the rotation shaft 156 when, for example, the disk cartridge 180 is dropped by accident can be mitigated, and deformation of and damage to the rotation shaft 156 is suppressed or prevented.

Here, because the shutter face plate 151 has the through hole portion 184 which serves as a lightening portion, the structure of the shutter face plate 151 is simple and the machining thereof is easy as compared with a structure in which a concave portion is provided as a lightening portion. Further, the rigidity is maintained high and the flatness is good as compared with a structure in which a cut-out portion is provided as the lightening portion.

Figure 21:
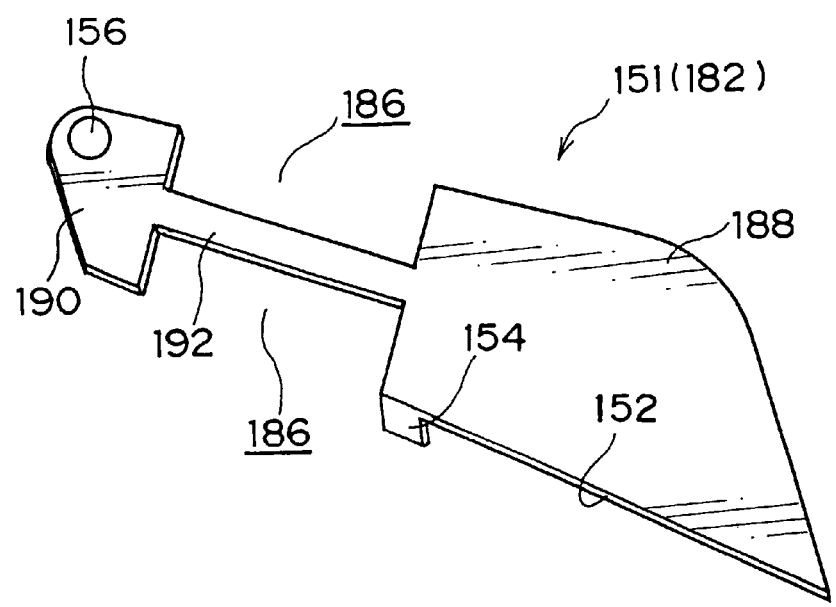
FIG. 21 is a perspective view showing a variant example of a second shutter member which forms the disk cartridge relating to the third embodiment of the present invention.

The above-described third embodiment is a preferable structure in which the shutter face plate 151 has the through hole portion 184 as the lightening portion. However, the present invention is not limited to the same. For example, as shown in FIG. 21, the surface plate portion 151 may be provided with cut-out portions 186 as lightening portions. In this case, an opening closing portion 188 of the shutter face plate 151, a supporting portion 190 which supports the rotation shaft 156, and an arm portion 192 which connects the opening closing portion 188 and the supporting portion 190 are formed. The opening closing portion 188, the supporting portion 190, and the arm portion 192 may be formed as respectively separate parts, and these parts may be assembled together. Namely, the lightening portion of the present invention encompasses lightening portions which are formed by actually machining (cutting-out, hole-punching, grinding, or the like) a flat plate or the like, and lightening portions which are formed integrally by press working or resin molding, and spaces which are obtained as a result of assembling plural parts. Accordingly, for example, the through hole portion 184 in the above-described third embodiment may be a through hole which is obtained as a result of assembling a plurality of parts.

Moreover, as mentioned above, a structure having, for example, a concave portion as the lightening portion may of course be used. In addition, the present invention is not limited to a structure in which the lightening portion is formed at one place. For example, a structure in which a plurality of the through hole portions 184 (either round holes or slits), or a structure in which one or plural through hole portions 184, cut-out portions 186, and concave portions are appropriately combined may be used.

In the above-described third embodiment, the shutter face plate 151 slides along both the case 30 and the bottom surface plate portion 36. However, the present invention is not limited to the same. For example, the shutter face plate 151 and the shutter main body 112 may slide along only either one of the case 30 and the bottom surface plate portion 36. Moreover, a structure is possible in which, for example, the shutter face plate 151 does not slide along either the case 30 or the bottom surface plate portion 36. However, in this case, only the effects due to the lightening of the weight of the shutter face plate 151 are obtained. In these cases as well, it is preferable that the shutter face plate 151 has the through hole portion 184 as the lightening portion, in consideration of lightening the weight, ensuring the rigidity, improving the machining because there is no need to identify the sliding surface at the time of machining, and the like.

(Fourth Embodiment)

Next, a disk cartridge 200 relating to a fourth embodiment of the present invention will be described. Parts and portions which are basically the same as those of the above-described first embodiment are denoted by the same reference numerals as in the first embodiment, and description thereof is omitted.

Figure 22:
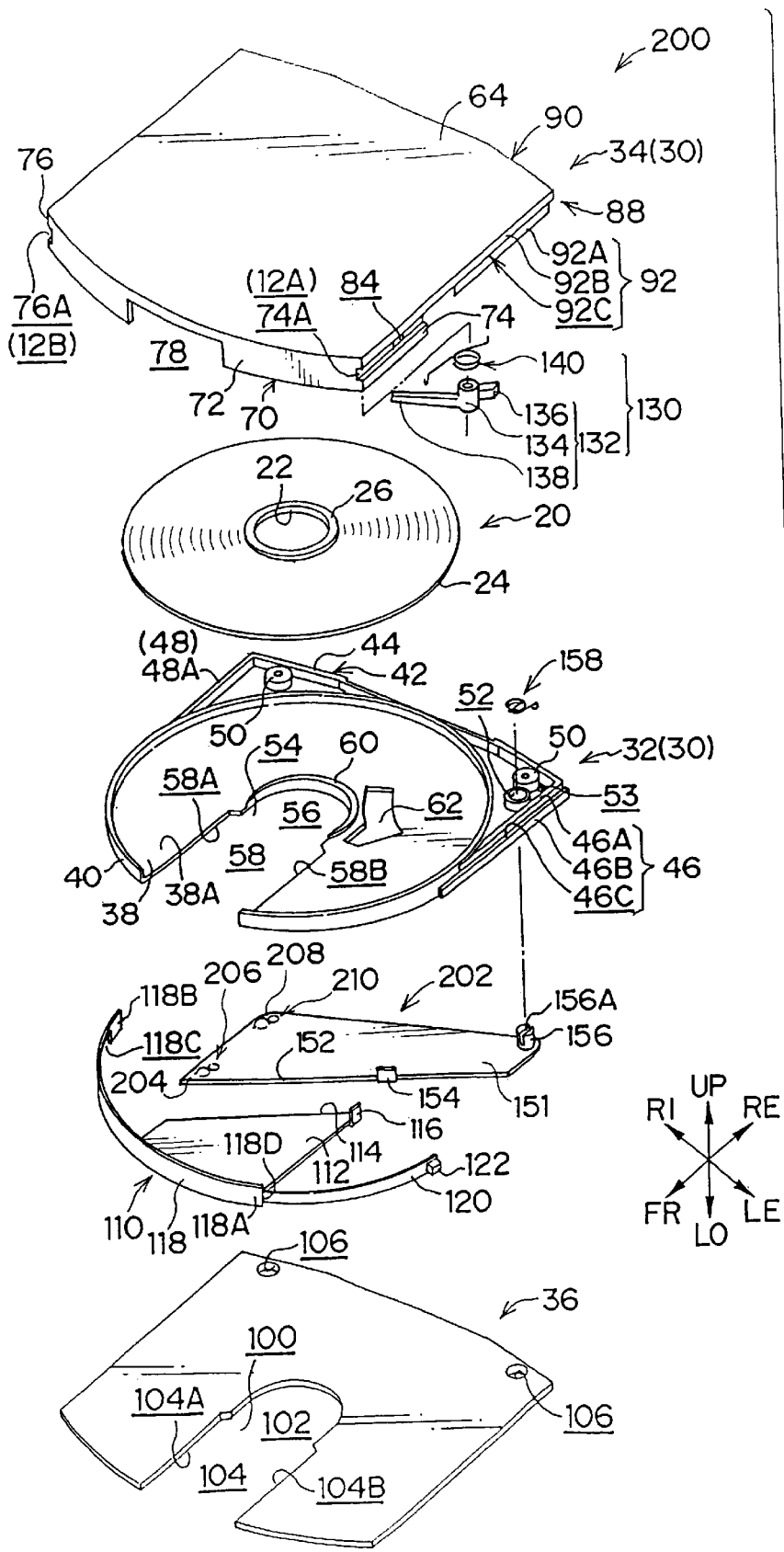
FIG. 22 is an exploded perspective view, as seen from above, of a disk cartridge relating to a fourth embodiment of the present invention.
Figure 23:
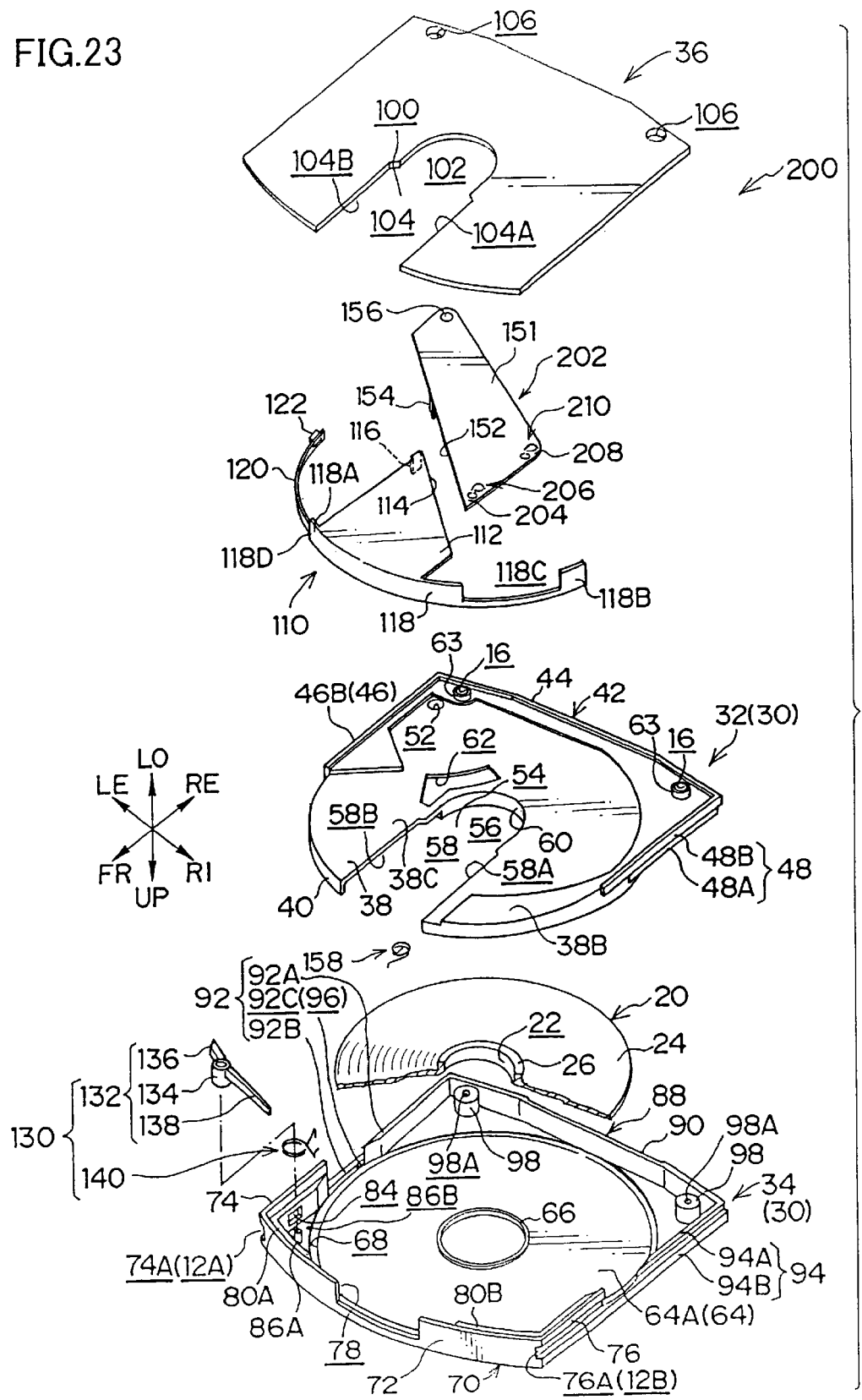
FIG. 23 is an exploded perspective view, as seen from below, of the disk cartridge relating to the fourth embodiment of the present invention.

As shown in FIGS. 22 and 23, the disk cartridge 200 has a second shutter member 202 in place of the second shutter member 150. The second shutter member 202 is similar to the second shutter member 150 of the above-described first embodiment in that the second shutter member 202 has the shutter face plate 151 (the abutting portion 152), the pushed piece 154, and the rotation shaft 156 (the slit 156A).

However, the second shutter member 202 differs from the second shutter member 150 of the first embodiment in that the second shutter member 202 has sliding projections 206, 210 at the shutter face plate 151. Note that the shutter face plate 151 of the present fourth embodiment is formed by, for example, a metal material (a thin plate) such as stainless steel or the like. On the other hand, the material of the shutter main body 112 is not limited, and the shutter main body 112 may be formed by, for example, a resin material, a metal material, a combination thereof (including the above-described two-layer structure), or the like.

Hereinafter, the sliding projections 206, 210 of the shutter face plate 151 forming the second shutter member 202 will be described. When the respective front, back, left, right directions of the second shutter member 202 are mentioned in the following description, they basically indicate the front, back, left, right directions of the second shutter member 202 in the state in which the opening 14 is closed.

The sliding projections 206 are provided at a first corner portion 204 which is an acute-angled front right corner portion disposed between the abutting portion 152 (inclined side portion) of the shutter face plate 151 and the right side portion (the right end portion running along the front-back direction). The sliding projections 206 are formed as a pair of projections which are an upward-facing projection 206A and a downward-facing projection 206B. The upward-facing projection 206A serves as a case side projection and projects toward the case 30 (the base plate portion 32) side in the plate thickness direction of the shutter face plate 151. The downward-facing projection 206B serves as a cover member side projection and projects toward the bottom surface plate portion 36 side.

Further, the sliding projections 210 are provided at a second corner portion 208 which is formed in a circular-arc shape at the rear of the first corner portion 204 of the shutter face plate 151. The sliding projections 210 are formed as a pair of projections which are an upward-facing projection 210A and a downward-facing projection 210B. The upward-facing projection 210A serves as a case side projection and projects toward the case 30 (the base plate portion 32) side in the plate thickness direction of the shutter face plate 151. The downward-facing projection 210B serves as a cover member side projection and projects toward the bottom surface plate portion 36 side.

Figure 27:
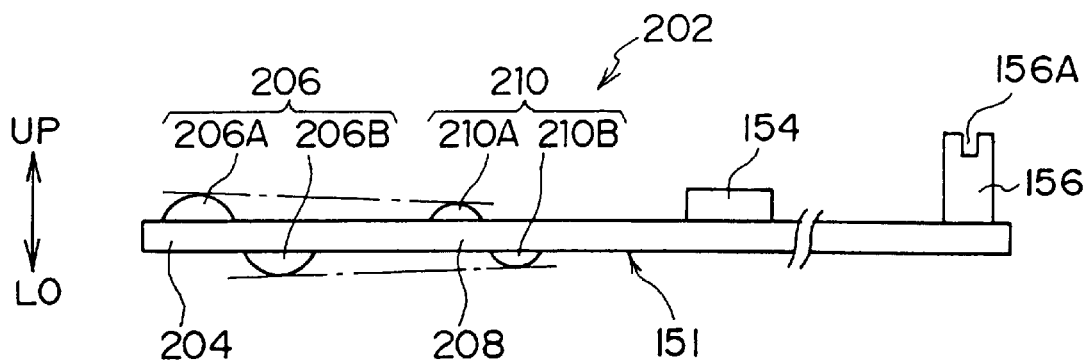
FIG. 27 is a side view of a second shutter member which forms the disk cartridge relating to the fourth embodiment of the present invention.

As shown in FIG. 27, the upward-facing projections 206A, 210A and the downward-facing projections 206B, 210B are respectively formed in spherical shapes by press molding or the like. Further, the projecting height, from the shutter face plate 151, of the sliding projections 210 (the upward-facing projection 210A and the downward-facing projection 210B), whose distance from the rotation shaft 156 is smaller than that of the sliding projections 206 (the upward-facing projection 206A and the downward-facing projection 206B), is smaller than the projecting height of the sliding projections 206.

Figure 28:
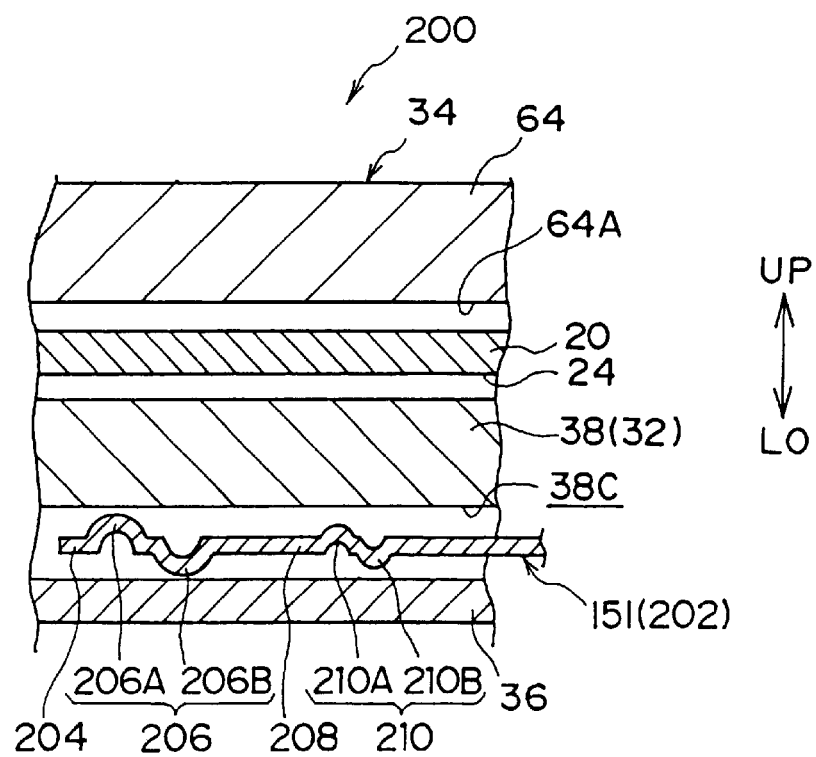
FIG. 28 is a cross-sectional view showing a schematic arrangement of the second shutter member which forms the disk cartridge relating to the fourth embodiment of the present invention.

Namely, as shown in FIG. 28, the sliding projections 206 usually abut (slide along) the case 30 and the bottom surface plate portion 36 at the upward-facing projection 206A and the downward-facing projection 206B. However, there are cases in which, due to warping of the shutter face plate 151 or the inclined state thereof, the sliding projections 210 slide on only one of the case 30 and the bottom surface plate portion 36, and there are cases in which the sliding projections 210 do not abut (slide on) either.

In FIGS. 27 and 28, the sliding projections 206, 210 are drawn large with respect to the plate thickness of the shutter face plate 151 in order to facilitate understanding. However, the projecting heights of the sliding projections 206, 210 are sufficiently small with respect to the plate thickness of the shutter face plate 151. The abutting portion 152 of the shutter face plate 151 abuts the abutting portion 114 of the first shutter member 110 well (such that offset in the plate thickness direction falls within an allowable range).

Figure 24:
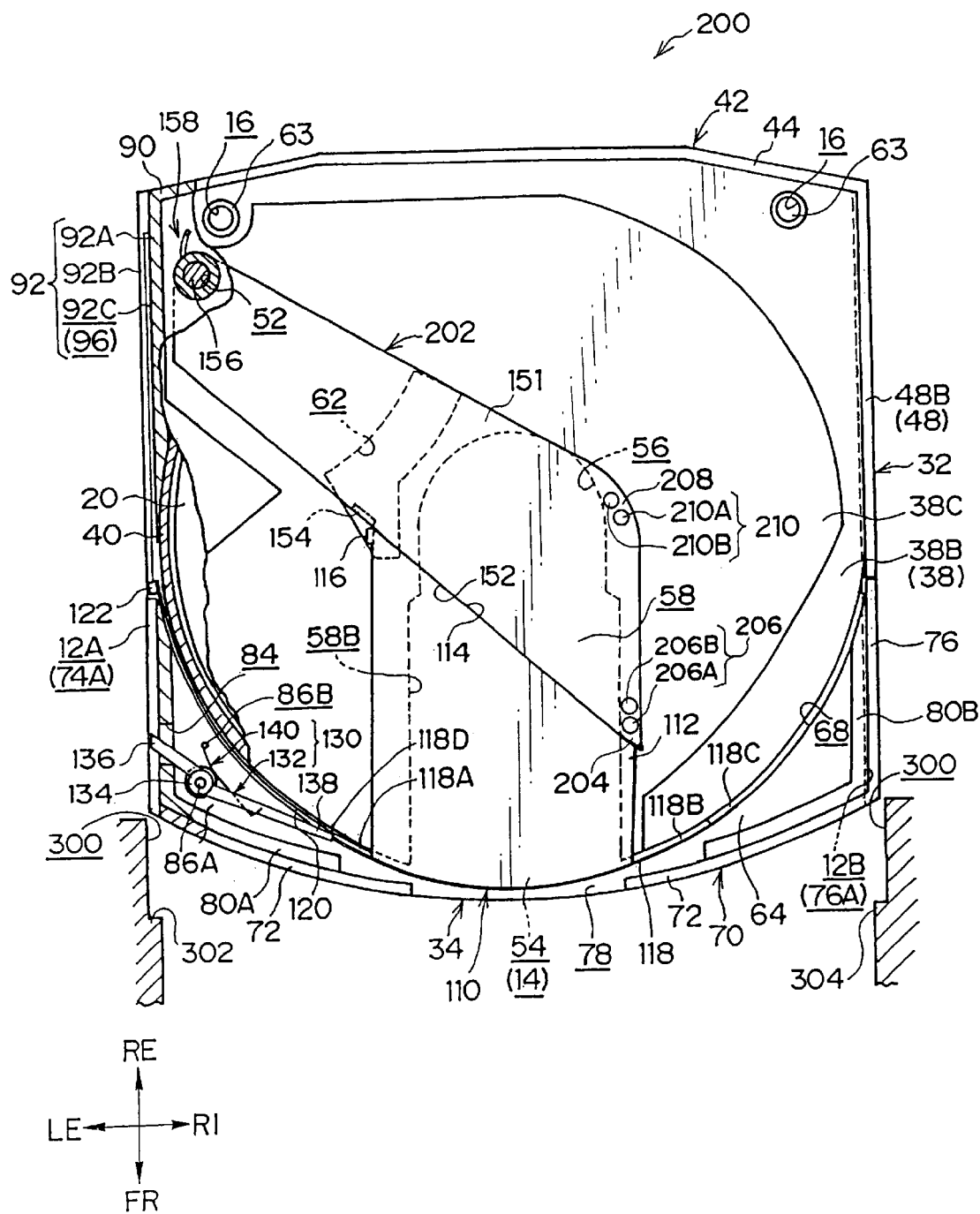
FIG. 24 is a bottom view, in which a bottom surface plate portion is removed and a portion is cut-out, showing the entire structure, in a state in which an opening is closed, of the disk cartridge relating to the fourth embodiment of the present invention.
Figure 25:
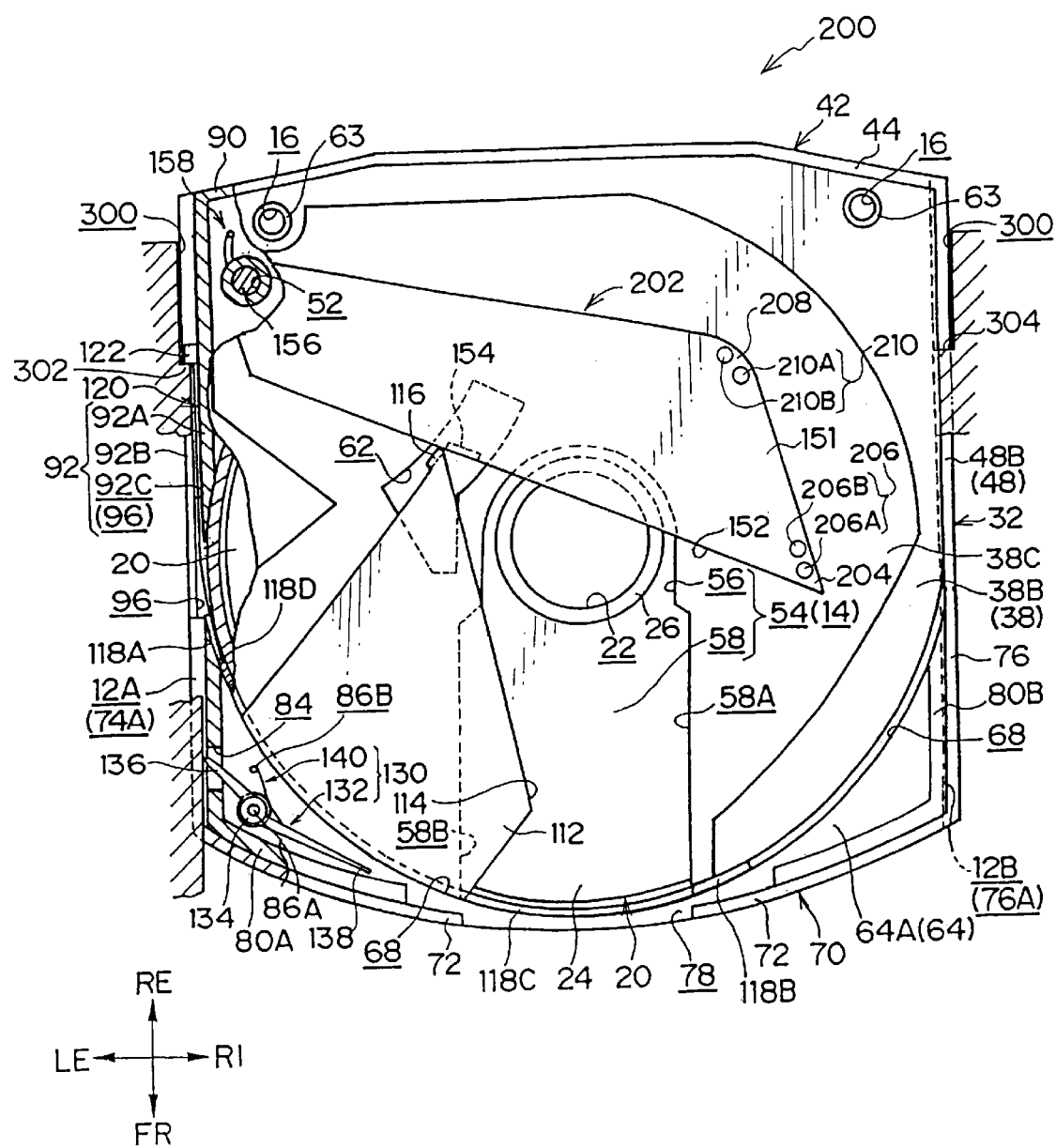
FIG. 25 is a view, corresponding to FIG. 24, showing a process of opening the opening of the disk cartridge relating to the fourth embodiment of the present invention.
Figure 26:
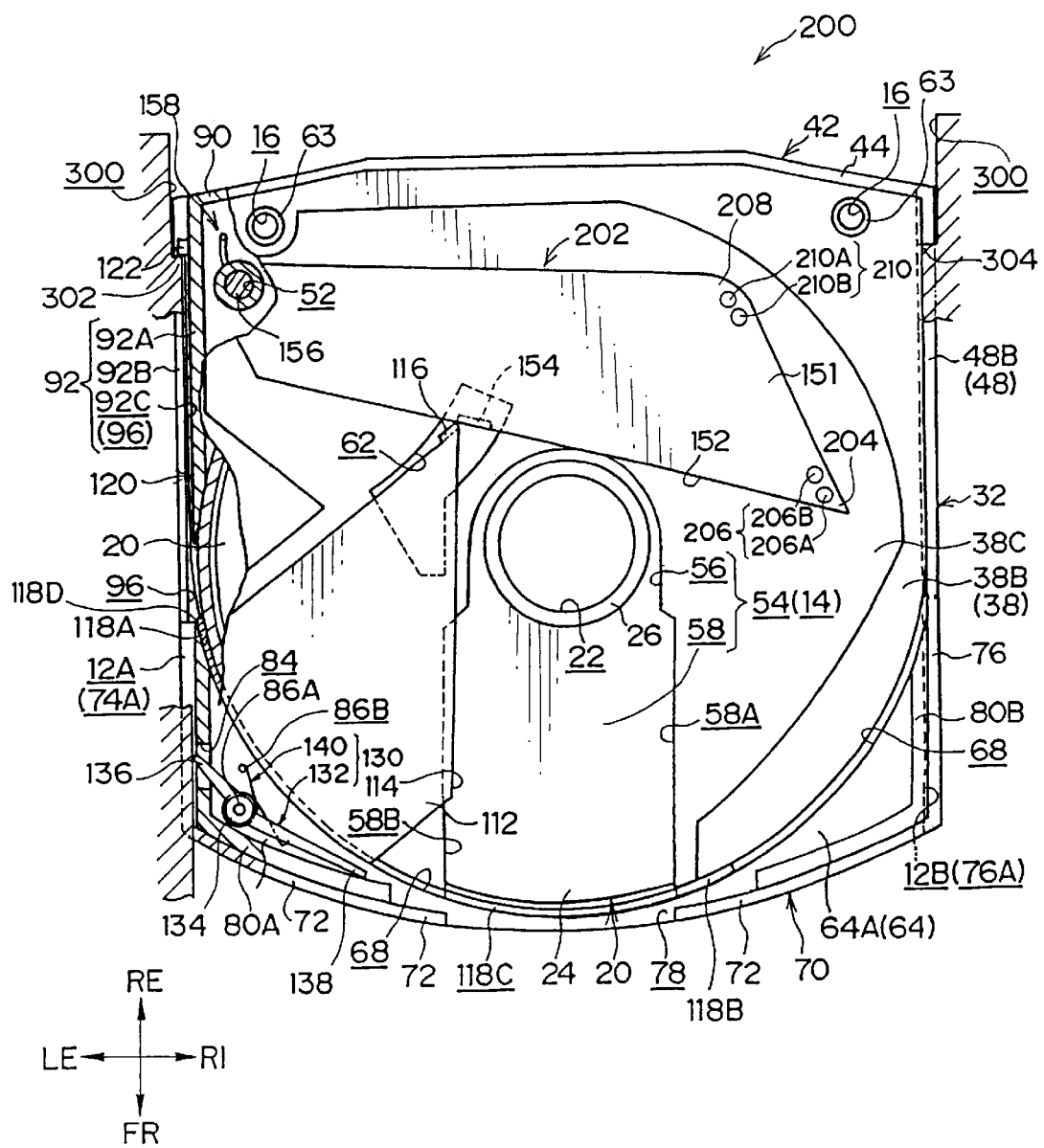
FIG. 26 is a view, corresponding to FIG. 24, showing an open state of the opening of the disk cartridge relating to the fourth embodiment of the present invention.

Further, as shown in FIGS. 24 through 26, each of the sliding projections 206, 210 is disposed at a position which does not pass by the opening 14 (the opening 54 and the opening 100) as the second shutter member 202 rotates at the time of opening and closing the opening 14. As discussed in the above first embodiment, by providing the first corner portion 204 (by forming an acute angle) between the abutting portion 152 and the right side portion at the shutter face plate 151, the rear right portion of the window portion 58 for a recording/playback head (i.e., a portion of the opening 14) is also opened and closed together with the hub hole 56.

Next, as the operation of the disk cartridge 200 relating to the present fourth embodiment, the portions which are different from those of the above-described first embodiment will mainly be described.

In the disk cartridge 200 having the above-described structure, the second shutter member 202 has the same dimensions and configuration as those of the second shutter member 150, except for the point that the sliding projections 206, 210 are provided at the second shutter member 202. Thus, as shown in FIGS. 24 through 26, the opening 14 is opened and closed in the exactly same way as the operations of the disk cartridge 10 shown in FIGS. 4 through 7. Therefore, explanation of these basic operations will be omitted. Here, the sliding projections 206 are provided at the shutter face plate 151 of the second shutter member 202. Thus, due to the rotation of the second shutter member 202 around the rotation shaft 156 which rotation accompanies the opening and closing of the opening 14, the sliding projection 206 smoothly slides on the case 30 (the concave portion 38C of the base plate portion 32) at the spherical upward-facing projection 206A, and smoothly slides on the bottom surface plate portion 36 at the spherical downward-facing projection 206B. Sliding of the (thickness direction edge portion of the) first corner portion 204 on the case 30 or the bottom surface plate portion 36 is prevented.

Accordingly, for example, even if warping arises at the shutter face plate 151 of the second shutter member 202 due to curling of the material, the first corner portion 204 of the second shutter member 202 does not slide on the concave portion 38C (the case 30) and the bottom surface plate portion 36, and abrasion of the case 30 and the bottom surface plate portion 36 is prevented.

In particular, the second shutter member 202 (the shutter face plate 151) is elongated from the rotation shaft 156 to the first corner portion 204, and it is easy for the aforementioned warping to arise and for the amount of warping to be great. However, due to the sliding projections 206, sliding of the first corner portion 204 on the case 30 and the bottom surface plate portion 36, and abrasion accompanying such sliding can be prevented. Thus, the occurrence of so-called drop-out, which is caused by abraded powder generated by abrasion adhering to the disk medium 20, can be prevented.

Moreover, sliding which accompanies abrasion due to the first corner portion 204 can be prevented and the sliding resistance suppressed. In addition, the second shutter member 202 slides on the case 30 or the bottom surface plate portion 36 in a state of point contact at the spherical upward-facing projection 206A and the spherical downward-facing projection 206B. Thus, the surface area of sliding is reduced, and the sliding resistance is suppressed even more. In this way, the second shutter member 202 operates smoothly (the driving force at the time of opening and closing the opening 14 is made small).

In this way, in the disk cartridge 200 relating to the present fourth embodiment, abrasion of the case 30 (the base plate portion 32) and the bottom surface plate portion 36, which abrasion accompanies the sliding of the second shutter member 202, can be prevented.

Here, the sliding projections 206 are formed as a pair of projections which are the upward-facing projection 206A which projects toward the case 30 side and the downward-facing projection 206B which projects toward the bottom surface plate portion 36 side. Thus, there is no need to identify the warping direction at the time of machining the shutter face plate 151, and the machinability improves.

Further, the sliding projections 210 are provided at the second corner portion 208 of the shutter face plate 151. Thus, even if warping or inclining (inclining in a direction of correcting the warping of the shutter face plate 151 due to the sliding projections 206) arises at the shutter face plate 151, due to the sliding projections 210 abutting (sliding on) the case 30 or the bottom surface plate portion 36, sliding of the second corner portion 208 on the case 30 and the bottom surface plate portion 36 is prevented, and sliding abrasion between, on the one hand, the second corner portion 208 and, on the other hand, the case 30 and the bottom surface plate portion 36 is also prevented.

In particular, the projecting height, from the surface of the shutter face plate 151, of the sliding projections 210, which are closer to the rotation shaft 156 than the sliding projections 206, is smaller than the projecting height of the sliding projections 206. Thus, the sliding projections 210 do not impede correction of warping and the sliding between the sliding projections 206 (the sliding projections which are provided at the first corner portion 204 which is the furthest away from the rotation shaft 156 and at which the amount of warping in the free state is the greatest) and the case 30 and the bottom surface plate portion 36. Moreover, due to the correcting of the warping at the longitudinal direction middle portion (the sliding projections 210) of the shutter face plate 151, the sliding projections 206 at the distal end portion are not pushed against the case 30 or the bottom surface plate portion 36 by an excessively large elastic force (no excessively large frictional resistance is generated). The sliding projections 206 reliably and smoothly slide along the case 30 or the bottom surface plate portion 36, and the aforementioned abrasion is reliably prevented.

As shown in FIGS. 24 through 26, the respective sliding projections 206, 210 are provided at portions of the shutter face plate 151 which do not pass by the opening 14. Thus, the sliding projections 206, 210 do not interfere with the edge portion of the opening 14 as the second shutter member 202 rotates. Therefore, the second shutter member 202 operates smoothly throughout the entire processes of opening and closing the opening 14.

As described above, by providing the sliding projections 206 and the like, the warping of the shutter face plate 151 is corrected, and the sliding projections 206 and the like function to improve the rigidity of the shutter face plate 151. Thus, the shutter face plate 151 can be made thinner. In this case, the second shutter member 202 can of course be made lighter-weight, and the driving force at the time of opening and closing the opening 14 can be reduced.

Figure 29:
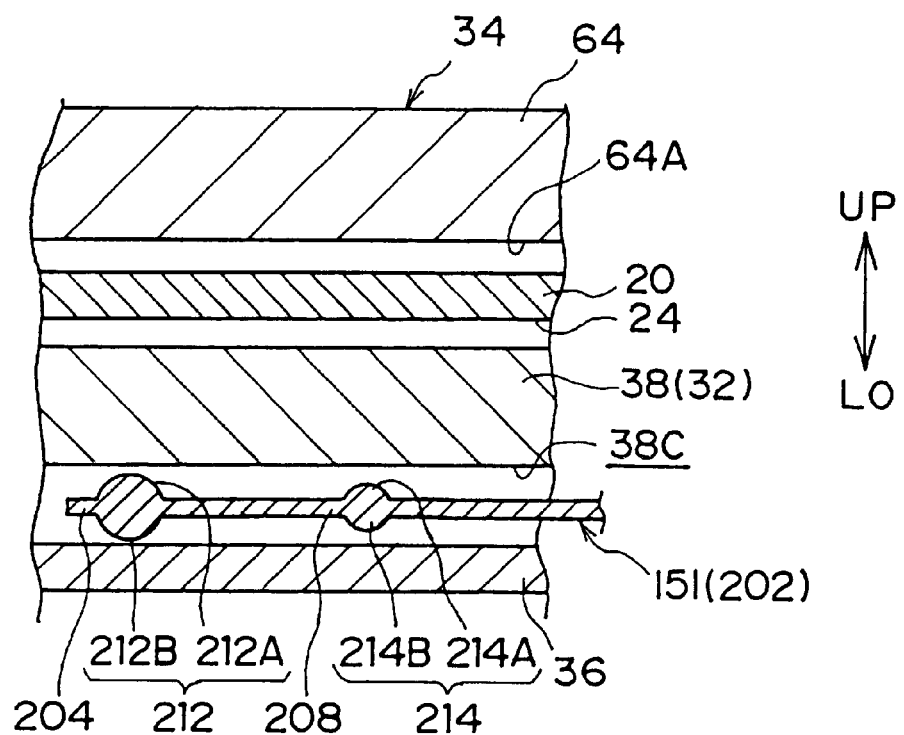
FIG. 29 is a view, corresponding to FIG. 28, showing a variant example of the second shutter member which forms the disk cartridge relating to the fourth embodiment of the present invention.

In the above-described fourth embodiment, the sliding projections 206, 210 are formed by press molding or the like at the shutter face plate 151 which is formed by a thin metal plate. However, the present invention is not limited to the same. For example, the shutter face plate 151 can be formed by a resin material, and as shown in FIG. 29, sliding projections 212, 214 can be provided integrally by injection molding or the like.

At the sliding projections 212, the substantially hemispherical portion thereof which projects upward is an upward-facing projection 212A, and the substantially hemispherical portion thereof which projects downward is a downward-facing projection 212B. Similarly, the sliding projections 214 have a substantially hemispherical upward-facing projection 214A and a substantially hemispherical downward-facing projection 214B. The projecting height of the sliding projections 214 is smaller than that of the sliding projections 212. In accordance with this structure of providing the sliding projections 212, 214, the same effects as those of the above-described fourth embodiment can of course be achieved. Namely, even if warping arises at the shutter face plate 151 due to residual stress at the time of molding, sliding abrasion caused by sliding on the case 30 or the bottom surface plate portion 36 can be prevented. In this structure, abrasion, which may arise at the shutter face plate 151 (the second shutter member 202) which is formed by a resin material, can also be prevented. Further, the shutter face plate 151 may have a two-layer structure formed by a metal layer and a resin layer as is shown in the first embodiment. In this case, the sliding projections may be formed at either of (or both of) the metal plate 160 and the resin layer 162.

Further, in the above-described fourth embodiment and variant example thereof, preferable structures are used in which the sliding projections 206, 210, 212, 214 are formed as pairs of the upward-facing projection 206A and the like and the downward-facing projection 206B and the like. However, the present invention is not limited to the same. For example, it suffices for the sliding projection 206 to be only one of the upward-facing projection 206A or the downward-facing projection 206B. This structure is suited for cases in which the warping direction of the shutter face plate 151 is limited to either the case 30 side or the bottom surface plate portion 36 side. Further, for example, the projecting directions of the sliding projections 206 and the sliding projections 210 may be different (e.g., it is possible for the shutter face plate 151 to be provided with only the upward-facing projection 206A and the downward facing projection 210B).

In the fourth embodiment and variant example thereof, preferable structures are used in which the sliding projections 206 (212), 210 (214) are provided at the first corner portion 204 and the second corner portion 208, respectively, of the shutter face plate 151. However, the present invention is not limited to the same. For example, it is possible to provide sliding projections at only one of the first corner portion 204 and the second corner portion 208. In this case, it is preferable to provide the sliding projections 206 or the like at the first corner portion which is the furthest away from the rotation shaft 156. Further, for example, in place of the sliding projections 206, 210, or together with the sliding projections 206, 210, the shutter face plate 151 may of course have sliding projections at positions other than the first corner portion 204 and the second corner portion 208.

In the above-described fourth embodiment and variant example thereof, the upward-facing projection 206A and the downward-facing projection 206B of the sliding projections 206 or the like usually abut (slide along) the case 30 and the bottom surface plate portion 36. However, the present invention is not limited to the same. For example, a structure is of course possible in which only one of the upward-facing projection 206A and the downward-facing projection 206B of the sliding projections 206 abuts the case 30 or the bottom surface plate portion 36.

Moreover, in the fourth embodiment and variant example which were described above, preferable structures are used in which the projecting heights of the sliding projections 206, 212 are greater than the projecting heights of the sliding projections 210, 214. However, the present invention is not limited to the same, and, for example, the projecting height of the sliding projections 206 may be the same as or less than the projecting height of the sliding projections 210.

Further, in the above-described fourth embodiment and variant example thereof, preferable structures are used in which the sliding projections 206 are provided at positions which do not pass by the opening 14 as the second shutter member 202 rotates. However, the present invention is not limited to the same. The sliding projections 206 may be provided at positions which pass by the opening 14 as the second shutter member 202 rotates (e.g., at portions which close the opening 14).

Although the sliding projections 206 and the like are formed in spherical shapes in the fourth embodiment and variant example, the present invention is not limited to the same. For example, the sliding projections 206 and the like may be formed such that the visible outline thereof in cross-section is oval or a curved plate shape which is a parabola. Further, the distal ends of the sliding projections 206 and the like may be formed as flat surfaces which oppose the case 30 and the bottom surface plate portion 36.

(Fifth Embodiment)

Next, a disk cartridge 220 relating to a fifth embodiment of the present invention will be described. Parts and portions which are basically the same as those of the above-described first embodiment are denoted by the same reference numerals as in the first embodiment, and description thereof is omitted.

Figure 30:
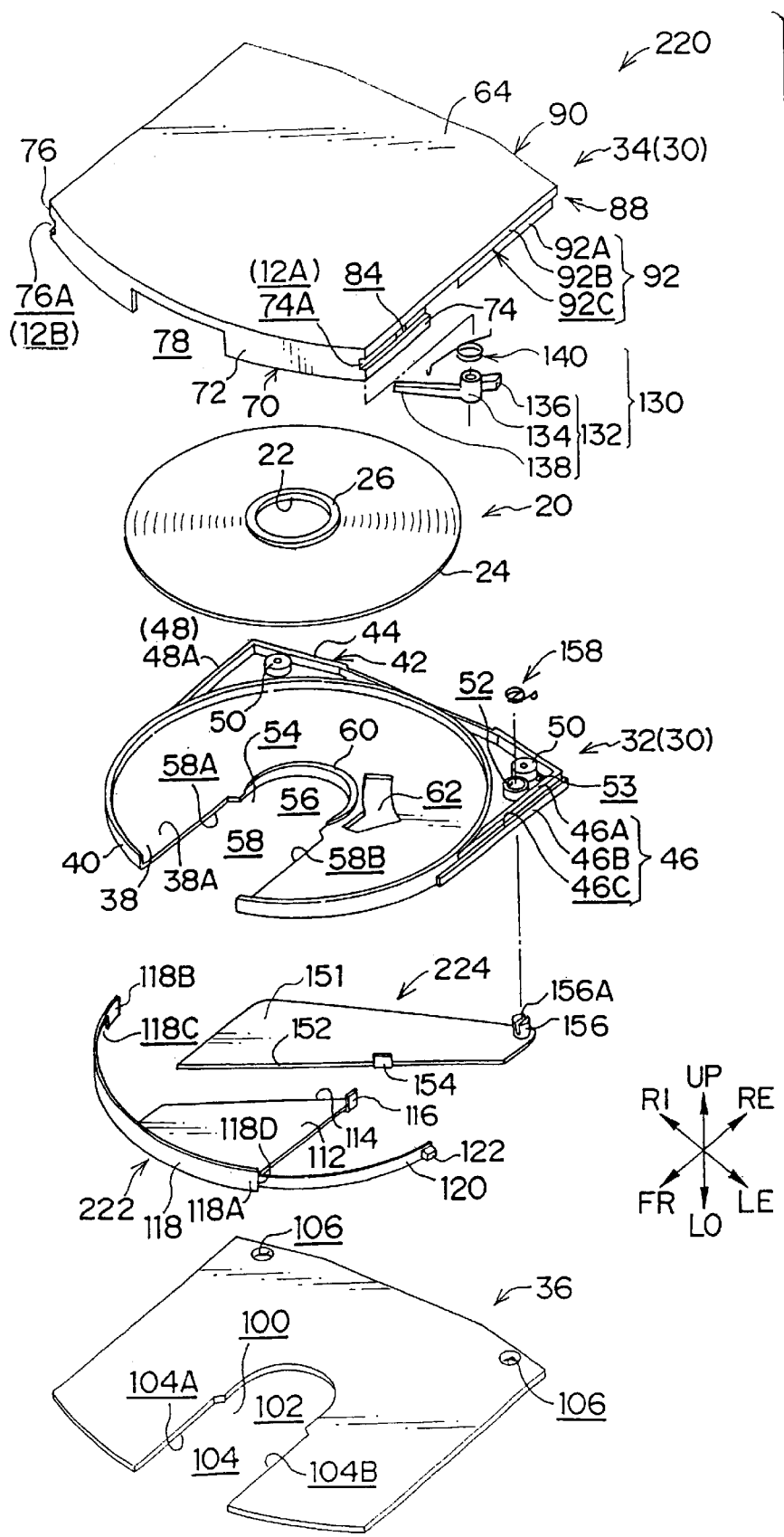
FIG. 30 is an exploded perspective view, as seen from above, of a disk cartridge relating to a fifth embodiment of the present invention.
Figure 31:
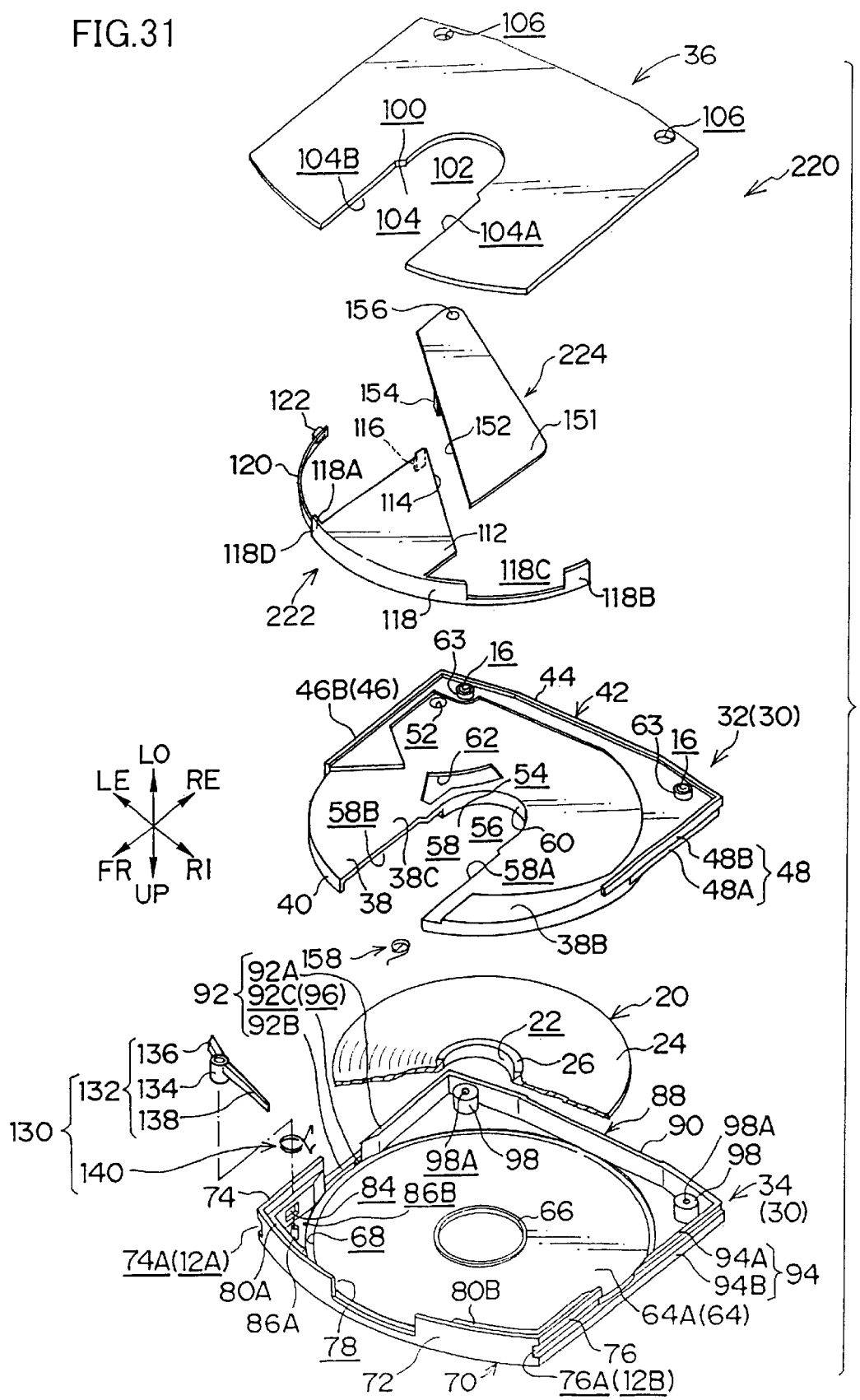
FIG. 31 is an exploded perspective view, as seen from below, of the disk cartridge relating to the fifth embodiment of the present invention.

As shown in FIGS. 30 and 31, the disk cartridge 220 has a first shutter member 222 in place of the first shutter member 110, and has a second shutter member 224 in place of the second shutter member 150. The first shutter member 222 and the second shutter member 224 have the same dimensions and configurations as the first shutter member 110 and the second shutter member 150, but the materials are different than those of the first shutter member 110 and the second shutter member 150.

Hereinafter, the first shutter member 222 and the second shutter member 224 will be explained.

At the first shutter member 222, the shutter main body 112 (including the pushing piece 116) and the circular-arc-shaped guide wall portion 118 are formed integrally by resin molding. The resin material is a material such as POM or the like which has a low coefficient of friction and good abrasion resistance. Further, the shutter pull-out portion 120, which is connected to the circular-arc-shaped guide wall portion 118, is formed from a thin metal plate or the like, and is elastically deformable in the direction of thickness thereof.

On the other hand, the shutter face plate 151 (including the pushed piece 154) of the second shutter member 224 is formed from a metal material such as, for example, stainless steel. Note that the second shutter member 224 may be structured by forming the rotation shaft 156 from a resin material or the like and fixing and holding the rotation shaft 156 to the shutter face plate 151 by fitting-together, adhesion, or the like.

Next, as the operation of the disk cartridge 220 relating to the present fifth embodiment, the portions which are different from those of the above-described first embodiment will mainly be described.

In the disk cartridge 220 having the above-described structure, the first shutter member 222 and the second shutter member 224 have the same dimensions and configurations as the first shutter member 110 and the second shutter member 150, respectively. Thus, the opening 14 is opened and closed in exactly the same way as the operations of the disk cartridge 10 shown in FIGS. 4 through 7. Thus, description and illustration of these basic operations will be omitted.

Accompanying the operations for opening and closing the opening 14, the shutter main body 112 of the first shutter member 222 and the shutter face plate 151 of the second shutter member 224 may slide on one of the case 30 and the bottom surface plate portion 36, or may slide on both the case 30 and the bottom surface plate portion 36.

Here, the shutter main body 112 of the first shutter member 222 is formed from a resin material such as POM (polyoxymethylene) or the like, and the second shutter member 224 is formed from a metal material such as stainless steel or the like. Thus, no abrasion or sound is generated between the pushing piece 116 and the pushed piece 154 which slide as they abut one another as the opening 14 is opened or closed. Thus, abraded powder does not adhere to the bottom surface 24 of the disk medium 20, and drop-out of the recording signal or the playback signal is prevented.

In this way, in the disk cartridge 220 relating to the present fifth embodiment, the occurrence of abrasion and sound between the pushing piece 116 and the pushed piece 154 can be prevented.

Further, because the resin material which forms the first shutter member 222 is a material having a low coefficient of friction, the sliding resistance between the pushing piece 116 and the pushed piece 154 can be reduced, and interlocking of the first shutter member 222 and the second shutter member 224 is smooth.

The first shutter member 222, which has a complex configuration having the shutter main body 112 and the circular-arc-shaped guide wall portion 118, can be easily formed by resin molding. The circular-arc-shaped guide wall portion 118 functions as a reinforcing rib of the shutter main body 112. Thus, the flatness of the shutter main body 112 is ensured. On the other hand, because the second shutter member 224 is formed from a metal material, deformation (e.g., deformation caused by changes in temperature or the like while the disk cartridge is being stored) and warping are mitigated, and the flatness is ensured.

Thus, the respective edge portions of the shutter main body 112 of the first shutter member 222 and the shutter face plate 151 of the second shutter member 224, which are disposed in the flat space between the concave portion 38C of the base plate portion 32 and the bottom surface plate portion 36, are prevented from contacting the concave portion 38C of the base plate portion 32 and the top surface of the bottom surface plate portion 36, or the contact resistance is decreased, and the shutter main body 112 and the shutter face plate 151 operate smoothly.

Because the circular-arc-shaped guide wall portion 118 is formed from a resin material, even if a slight amount of strain is generated at the time of molding, this strain is absorbed by the elastic deformation due to assembly. Unnecessary abrasion of the circular-arc-shaped guide wall portion 118 and the tubular wall 40 of the base plate portion 32 which are sliding along one another (e.g., line contact or point contact of the end portion of the jutting-out portion 118B with the outer peripheral surface of the tubular wall 40) is prevented, and operation of the first shutter member 222 is even more smooth (the driving force at the time of opening and closing the opening 14 is small).

The shutter pull-out portion 120, which connects the circular-arc-shaped guide wall portion 118 and the shutter engaging portion 122, is formed from an elastic material. Thus, the shutter pull-out portion 120 can move from the annular groove 68 to the shutter guiding groove 96 while elastically deforming in the thickness direction (can deform linearly from the circular-arc shape while the position of deformation changes continuously). The shutter pull-out portion 120 smoothly converts the rectilinear direction moving force of the shutter engaging portion 122 into rotating force in the peripheral direction of the circular-arc-shaped guide wall portion 118. Namely, because the shutter pull-out portion 120 is elastic, the operation of the first shutter member 222 is even more smooth.

In the above-described fifth embodiment, a preferable structure is used in which the first shutter member 222 (except for the shutter pull-out portion 120 and the like) is formed from a resin material and the second shutter member 224 is formed from a metal material. However, the present invention is not limited to the same. For example, the first shutter member 222 may be formed from a metal material, and the second shutter member 224 may be formed from a resin material.

Next, a variant example of the above-described fifth embodiment will be described on the basis of FIGS. 32A and 32B. Parts and portions which are basically the same as those of the above-described first and fifth embodiments are denoted by the same reference numerals as in the first and fifth embodiments, and description thereof is omitted.

Figure 32:
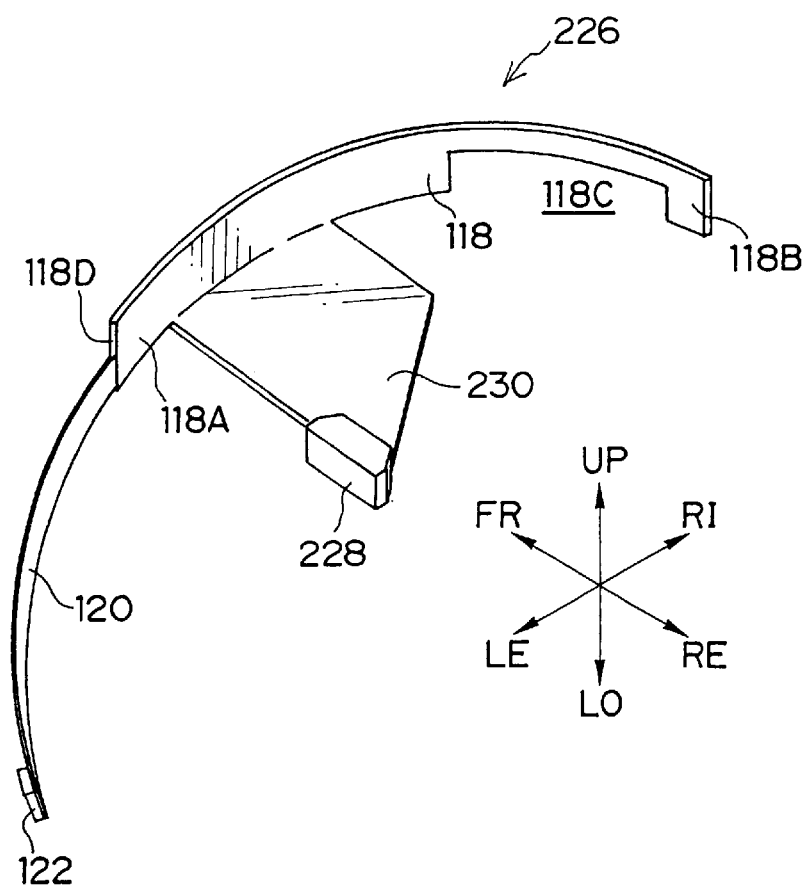
FIG. 32A is a perspective view showing a variant example of a first shutter member which forms the disk cartridge relating to the fifth embodiment of the present invention.
FIG. 32B is a perspective view showing a variant example of a second shutter member which forms the disk cartridge relating to the fifth embodiment of the present invention.
Figure 32:
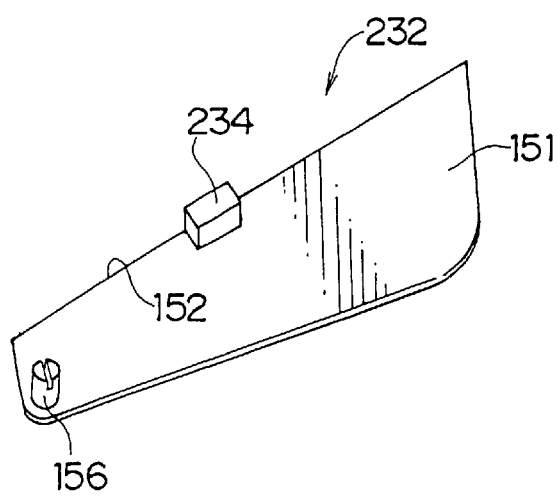

A first shutter member 226 is shown in FIG. 32A. The first shutter member 226 differs from the first shutter member 222 in that the first shutter member 226 has a pusher portion 228 in place of the pusher piece 116. The pusher portion 228 is formed from a resin material which has good abrasion resistance and a low coefficient of friction, such as, for example, POM, PC (polycarbonate), PE (polyethylene), or the like. The pusher portion 228 is formed in the shape of a small block. A shutter main body 230 is formed from a metal material (a thin plate) such as, for example, stainless steel or the like.

The shutter main body 230 and the pushing portion 228 are made integral by an unillustrated fixing projection of the pushing portion 228 being press-fit into an unillustrated fixing hole of the shutter main body 230.

By providing the first shutter member 226 in place of the first shutter member 222, in the same way as in the above-described fifth embodiment, abrasion and sound are not generated between the pushing portion 228 and the pushed portion 154 of the second shutter member 224, and drop-out of the playback signal can be prevented. Further, the interlocking of the first shutter member 226 and the second shutter member 224 is smooth. In the structure relating to the present variant example, because the shutter main body 230 is formed of a metal material, the flatness thereof can be reliably ensured. Further, because the shutter main body 230 and the pushing portion 228 are made integral by press-fitting, the structure and assembly are simple and low cost.

A second shutter member 232 is illustrated in FIG. 32B. The second shutter member 232 differs from the second shutter member 224 in that the second shutter member 232 has a pushed portion 234 in place of the pushed piece 154. The pushed portion 234 is formed from a resin material which has good abrasion resistance and a low coefficient of friction, such as, for example, POM, PC (polycarbonate), PE (polyethylene), or the like. The pushed portion 234 is formed in the shape of a small block. The shutter face plate 151 is formed from a metal material (a thin plate) such as, for example, stainless steel or the like.

The shutter face plate 151 and the pushed portion 234 are made integral by an unillustrated fixing projection of the pushed portion 234 being press-fit into an unillustrated fixing hole of the shutter face plate 151.

The disk cartridge 220 may have the first shutter member 226 in place of the first shutter member 222, and may have the second shutter member 232 in place of the second shutter member 224.

In this structure, the pushing portion 228 and the pushed portion 234 are respectively formed from resin materials having abrasion resistance and a low coefficient of friction such as POM or the like. Thus, substantially no abrasion or sound arises between the pushing portion 228 and the pushed portion 234 which slide while abutting one another as the opening 14 is opened or closed. Namely, in this case, at the pushing portion 228 and the pushed portion 234, the same type of resin materials abut one another, but both have low coefficients of friction and good abrasion resistance. Thus, with the pushing force of the extent that is applied to the pushing portion 228 and the resin pushed portion as the opening 14 is opened and closed, abrasion and noise are not so problematic.

Thus, no abraded powder adheres to the bottom surface 24 of the disk medium 20, and the occurrence of drop-out of the recording signal or the playback signal is prevented. Further, the sliding resistance between the pushing portion 228 and the pushed portion 234 is lowered, and the interlocking of the first shutter member 226 and the second shutter member 232 is smooth.

Because the flat-plate-shaped shutter main body 230 and the flat-plate-shaped shutter face plate 151 are formed from metal materials, the flatness thereof is good. Thus, the respective edge portions of the shutter main body 230 and the shutter face plate 151, which are disposed in the flat space between the concave portion 38C of the base plate portion 32 and the bottom surface plate portion 36, are prevented from contacting the concave portion 38C of the base plate portion 32 and the top surface of the bottom surface plate portion 36, or the contact resistance is decreased, and the shutter main body 230 and the shutter face plate 151 both operate smoothly.

In this way, in the disk cartridge 220 relating to the variant example of the present fifth embodiment, the occurrence of abrasion and sound between the pushing portion 228 and the pushed portion 234 can be prevented. Namely, the occurrence of abrasion due to operation of the shutter members can be prevented.

Further, the shutter main body 230 and the pushing portion 228, and the shutter face plate 151 and the pushed portion 234, are made integral (fixed) by press-fitting which is a simple method of joining. Thus, the structures of the first shutter member 226 and the second shutter member 232 are simple, and can be made less expensive. Further, because the pushing directions of the pushing portion 228 and the pushed portion 234 pushing one another are determined, there is no need to make the shutter main body 230 and the pushing portion 228 strongly integral, or to make the shutter face plate 151 and the pushed portion 234 strongly integral, and a simple method of joining such as press-fitting can be used.

The resin materials which form the pushing portion 228 and the pushed portion 234 are any of POM, PC, and PE. Namely, the pushing portion 228 and the pushed portion 234 are both formed from resin materials having friction resistance and low coefficients of friction, and having excellent processability. Thus, the structures of the first shutter member 226 and the second shutter member 232 can be made even more simple, and the costs thereof can be decreased even more.

It goes without saying that the resin material which forms the pushing portion 228 and the resin material which forms the pushed portion 234 may be different.

In the above-described variant example, the shutter main body 230 and the pushing portion 228, and the shutter face plate 151 and the pushed portion 234, are respectively fixed together by press-fitting. However, the present invention is not limited to the same, and one or both of the aforementioned regions of fixing may be fixed by adhesion, fastening by screws, ultrasonic fixing (welding), or the like.

Further, the second shutter member 232 relating to the above variant example is not limited to being used in combination with the first shutter member 226, and, for example, may be used in combination with the first shutter member 110 which is provided with the metal pushing piece 116. In this case, the effects relating to the preventing of abrasion which accompanies the opening and closing of the opening 14 are the same as those of the above-described fifth embodiment.

Moreover, the resin material in the above-described fifth embodiment and variant example thereof is not limited to POM, PC, and PE, and any of various types of resin materials may be used. However, a material which has a low coefficient of friction and abrasion resistance is preferable. Further, the metal material as well is not limited to stainless steel, and any of various materials may be used.

(Sixth Embodiment)

Next, a disk cartridge 240 relating to a sixth embodiment of the present invention will be described. Parts and portions which are basically the same as those of the above-described first embodiment are denoted by the same reference numerals as in the first embodiment, and description thereof is omitted.

Figure 33:
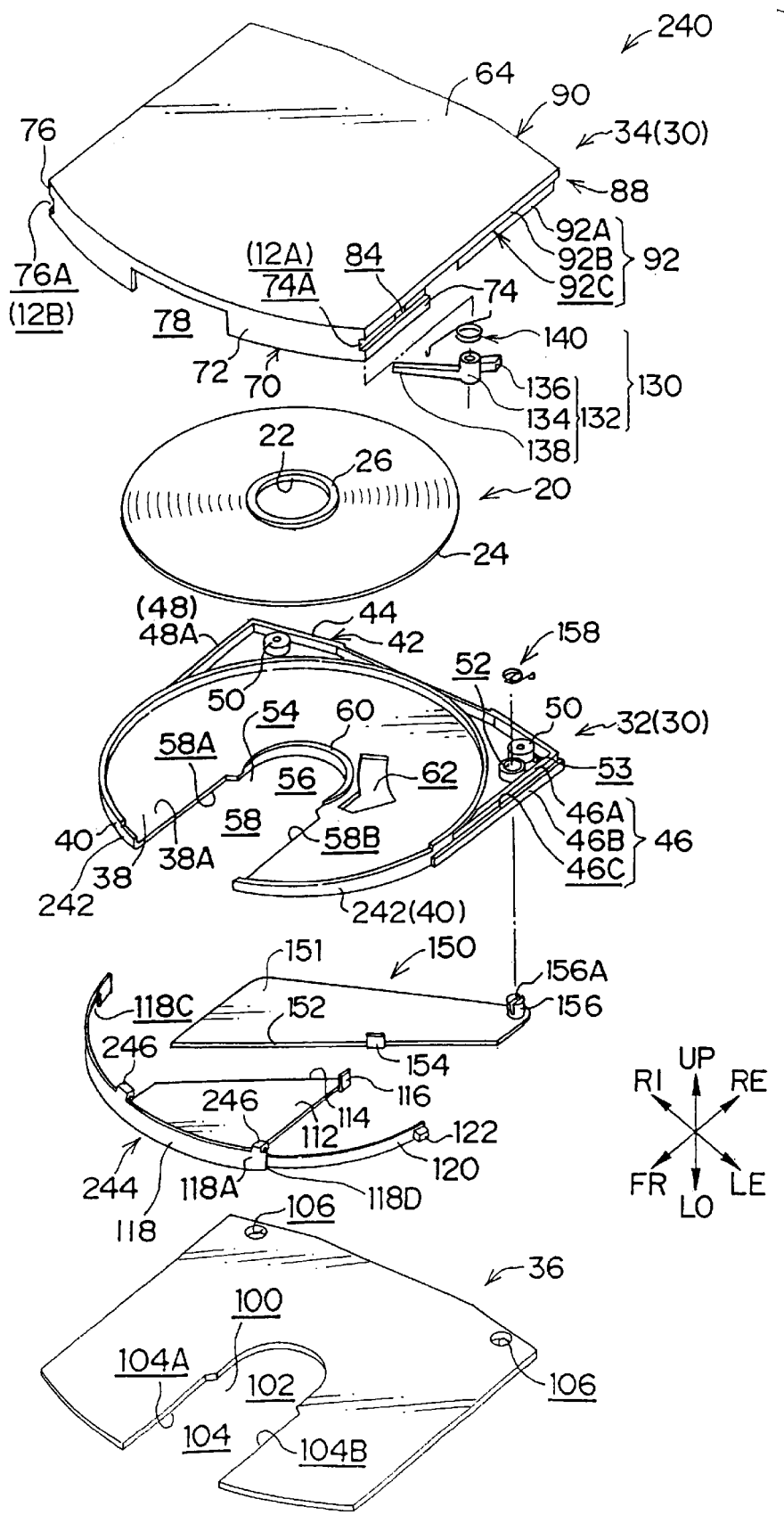
FIG. 33 is an exploded perspective view, as seen from above, of a disk cartridge relating to a sixth embodiment of the present invention.
Figure 34:
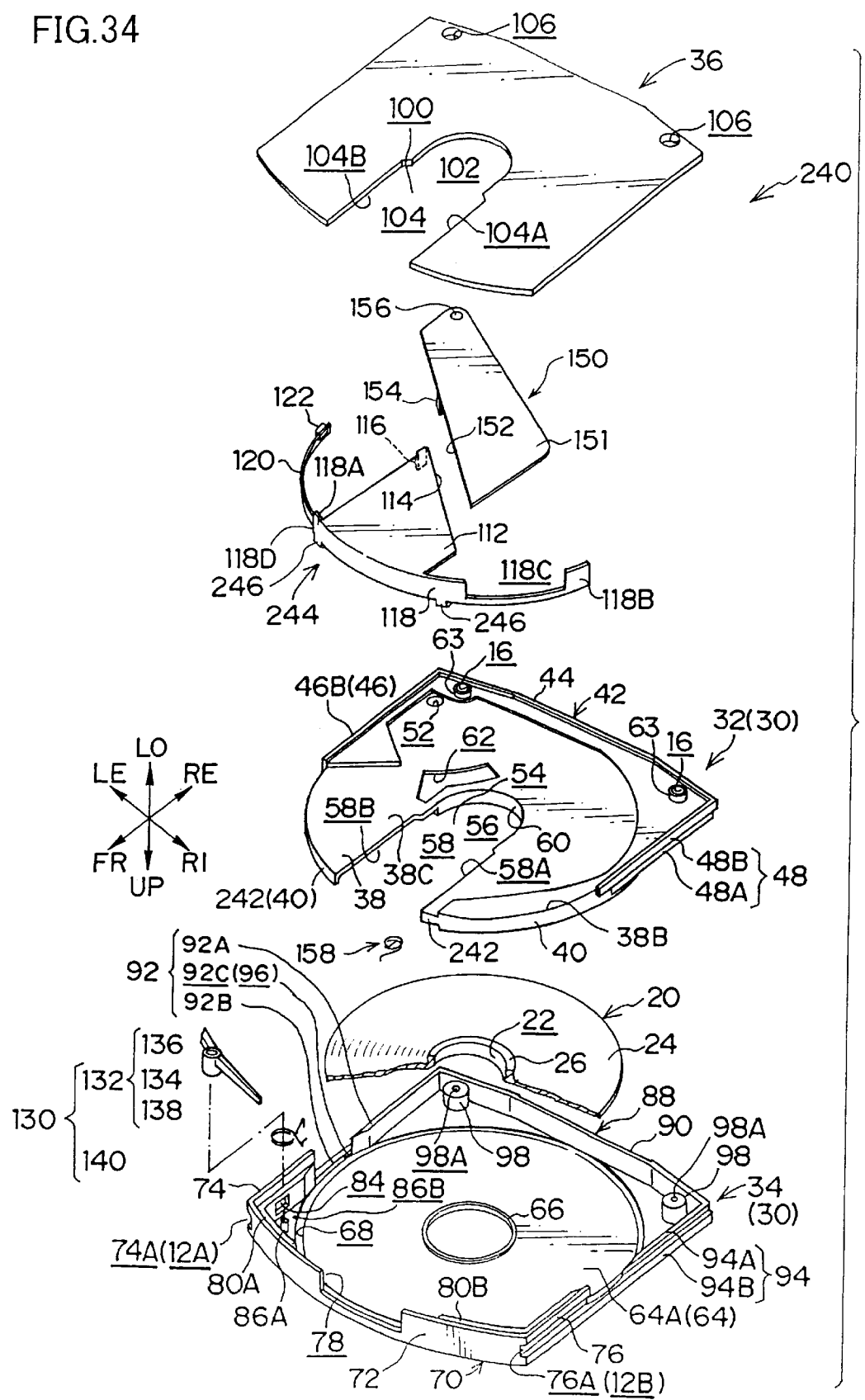
FIG. 34 is an exploded perspective view, as seen from below, of the disk cartridge relating to the sixth embodiment of the present invention.

As shown in FIGS. 33 and 34, at the disk cartridge 240, low wall portions 242 are provided at the tubular wall 40 of the base plate portion 32, and the disk cartridge 240 is provided with a first shutter member 244 in place of the first shutter member 110.

The first shutter member 244 is the same as the first shutter member 110 relating to the first embodiment in that the first shutter member 244 has the shutter main body 112 (the abutting portion 114 and the pushing piece 116), the circular-arc-shaped guide wall portion 118, the shutter pull-out portion 120, and the shutter engaging portion 122.

However, the first shutter member 244 differs from the first shutter member 110 relating to the first embodiment with regard to the point that, at the first shutter member 244, engaging claws 246, which can engage with the low wall portions 242 of the base plate portion 32, are provided at the circular-arc-shaped guide wall portion 118. Note that the materials of the shutter face plate 151 and the shutter main body 112 relating to the present sixth embodiment are not particularly limited, and the shutter face plate 151 and the shutter main body 112 may be formed by, for example, a resin material, a metal material, a combination thereof (including the above-described two-layer structure) or the like.

Hereinafter, the low wall portions 242 of the base plate portion 32 and the engaging claws 246 of the first shutter member 244 will be described.

The low wall portions 242, whose top end portions are at a lower level than the other portions, are formed at the tubular wall 40 at both sides of the window portion 58 for a recording/playback head of the base plate portion 32. The low wall portion 242 is formed to be short at the right side of the window portion 58 for a recording/playback head, and at the left side, is formed up to a vicinity of the front end portion of the left outer wall 46B (see FIG. 33).

Figure 36:
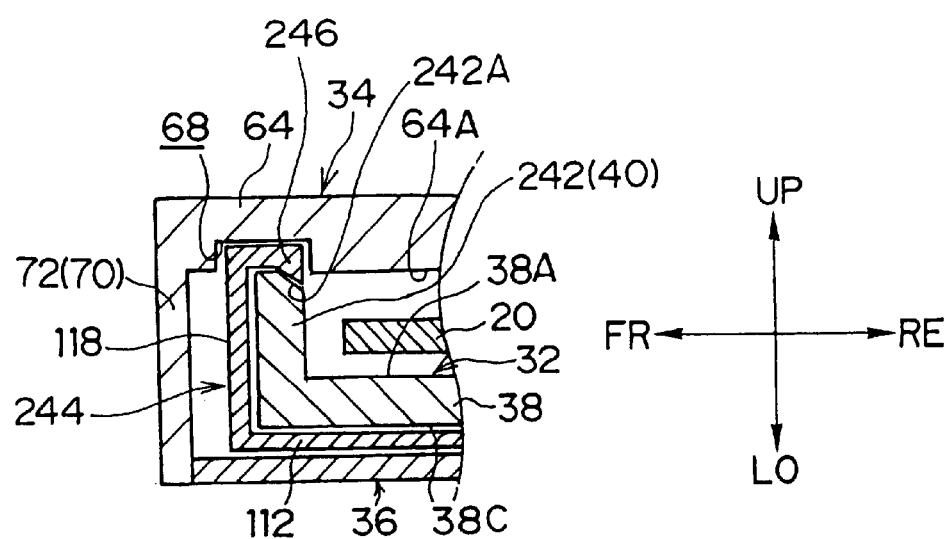
FIG. 36 is a cross-sectional view taken along line 36—36 of FIG. 35.

Further, as shown in FIG. 36, a chamfer portion 242A, which is formed in a taper shape at the inner edge of the top end portion of the low wall portion 242, is provided at the low wall portion 242. The chamfer portion 242A is a region of engaging and sliding of the engaging claw 246 of the first shutter member 244. Further, the tubular wall 40 and the circular-arc-shaped guide wall portion 118 (the engaging claws 246) of the first shutter member 244 can be inserted into the annular groove 68 (wide portion) of the top surface plate portion 34.

Figure 37:
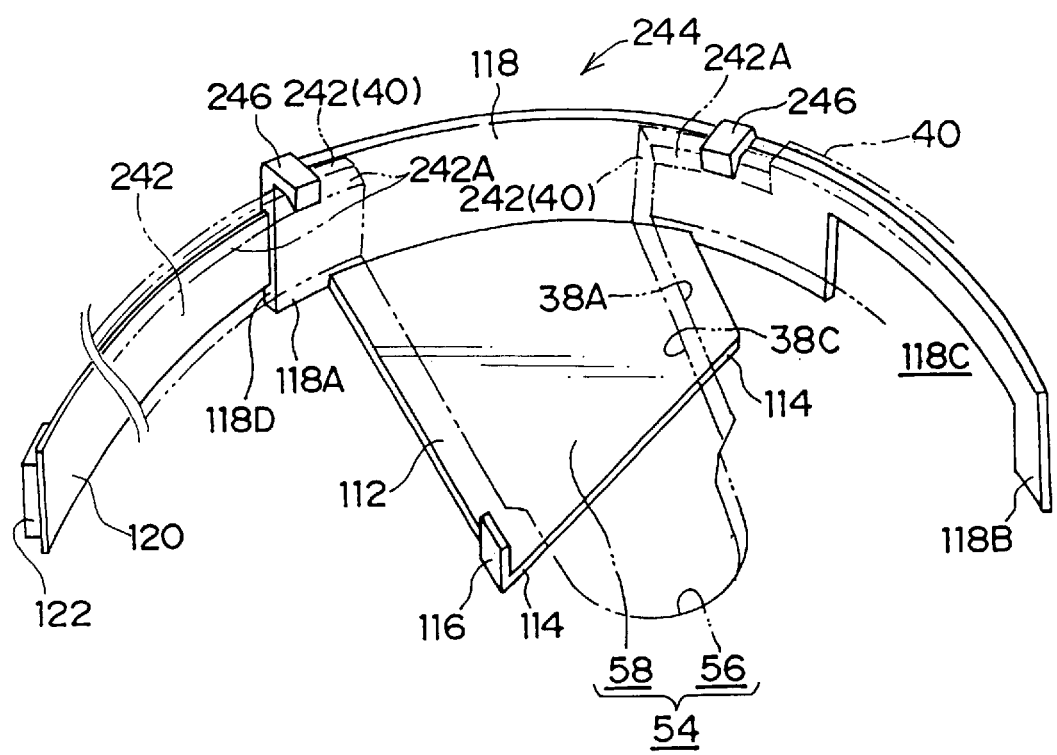
FIG. 37 is a perspective view showing a first shutter member which forms the disk cartridge relating to the sixth embodiment.
Figure 37:
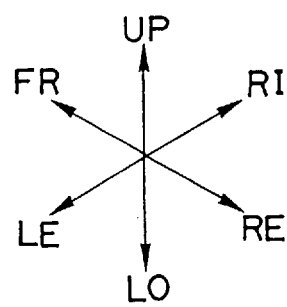

As shown in FIGS. 33 and 37, the circular-arc-shaped guide wall portion 118 of the first shutter member 244 is provided with the pair of engaging claws 246 which serve as engaging portions. The engaging claws 246 project substantially toward the rear from the top end portions of the left and right jutting-out portions 118A, 118B in vicinities of the shutter main body 112. (In the present embodiment, one engaging claw 246 projects from each of the left and right jutting-out portions 118A, 118B.) The distal end portion of each engaging claw 246 is formed so as to correspond to the chamfer portion 242A of the low wall portion 242 (the tubular wall 40) of the base plate portion 32, and can engage with the top end portion of the low wall portion 242 so as to not project out at the radial direction inner side of the tubular wall 40.

As mentioned above, the material of the first shutter member 244 is not limited. However, it is preferable that the shutter main body 112 (including the pushing piece 116) and the circular-arc-shaped guide wall portion 118 (including the engaging claws 246) are formed integrally by a resin material having a low coefficient of friction and good abrasion resistance such as POM or the like. On the other hand, the shutter pull-out portion 120 which is connected to the circular-arc-shaped guide wall portion 118 is formed from a thin metal plate or the like, and is elastically deformable in the direction of thickness thereof.

Figure 35:
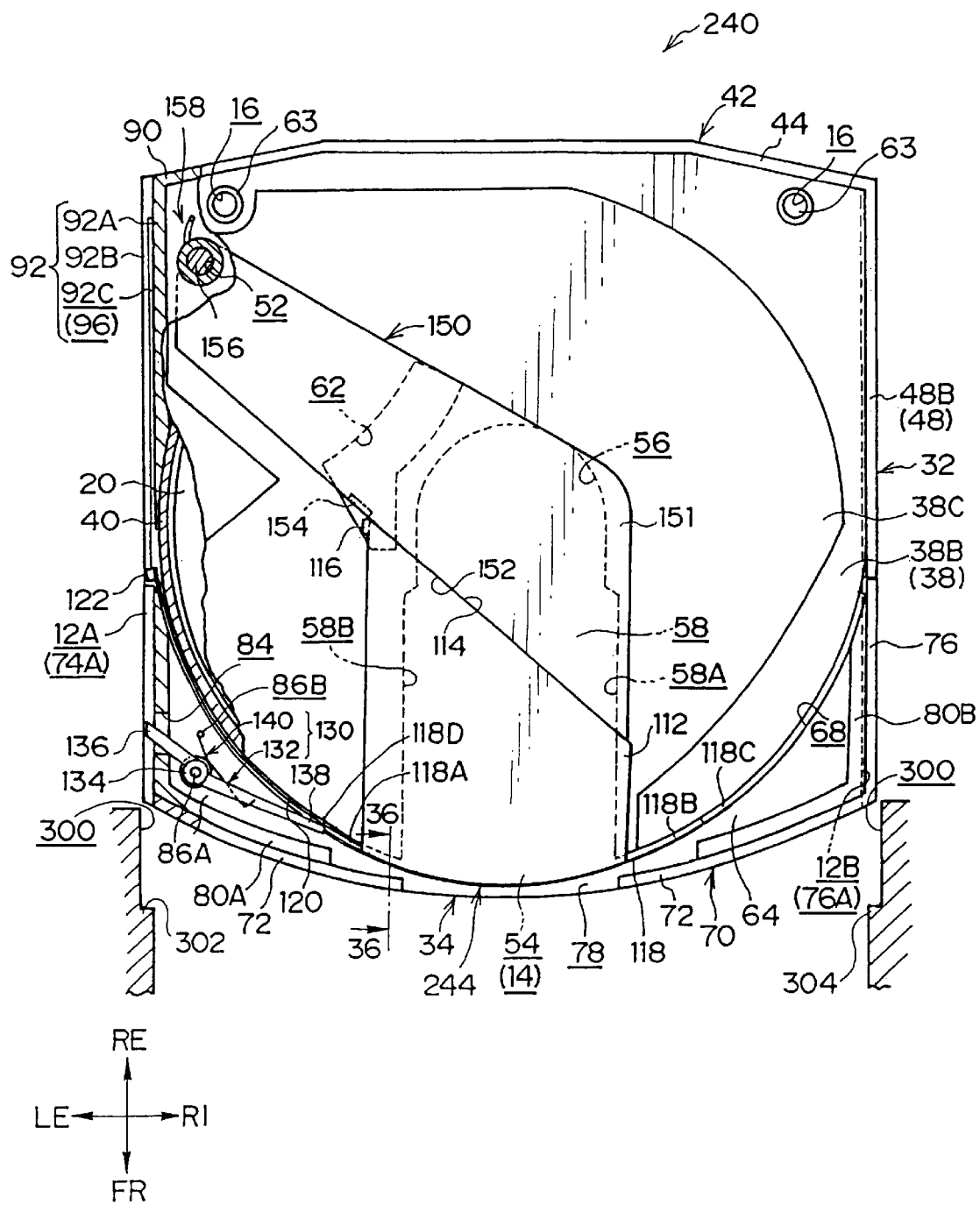
FIG. 35 is a bottom view, in which a bottom surface plate portion is removed and a portion is cut-out, showing the entire structure, in a state in which an opening is closed, of the disk cartridge relating to the sixth embodiment of the present invention.

At the first shutter member 244, as shown in FIG. 36, in a state in which the engaging claws 246 are caught on the top end portions of the low wall portions 242 of the tubular wall 40 of the base plate portion 32 (i.e., in a state in which the engaging claws 246 are slidably engaged), as shown in FIGS. 35 and 36, the circular-arc-shaped guide wall portion 118, together with the engaging claws 246 and the tubular wall 40 (the low wall portions 242), is inserted into the annular groove 68 of the top surface plate portion 34, and the circular-arc-shaped guide wall portion 118 is disposed so as to be able to slide along the outer peripheral portion of the tubular wall 40. In this state, the shutter main body 112 is disposed between the concave portion 38C of the base plate portion 32 and the top surface of the bottom surface plate portion 36, and usually closes a portion of the opening 14 (mainly, the window portion 58 for a recording/playback head).

Note that the dimensions of the engaging claw 246 are determined such that the engaging claw 246 does not project further than the top end portion of the tubular wall 40 in the state in which the engaging claw 246 is caught on (engaged with) the top end portion of the low wall portion 242. Further, the peripheral direction lengthwise dimension of the low wall portion 242 on which the engaging claw 246 catches is determined in accordance with the range of sliding of the circular-arc-shaped guide wall portion 118 along the outer peripheral surface of the tubular wall 40.

Next, as the operation of the disk cartridge 240 relating to the present sixth embodiment, the portions which are different from those of the above-described first embodiment will mainly be described.

In the disk cartridge 240 having the above-described structure, the first shutter member 244 has the same dimensions and configuration as those of the first shutter member 110, except for the point that the engaging claws 246 are provided at the first shutter member 244. Thus, the opening 14 is opened and closed in exactly the same way as the operations of the disk cartridge 10 shown in FIGS. 4 through 7. Thus, explanation and illustration of these basic operations will be omitted.

As the opening 14 opens and closes, the engaging claws 246 of the first shutter member 244 slide smoothly on the low wall portions 242 of the tubular wall 40, and do not impede the opening and closing of the opening 14 by the first shutter member 244. Further, accompanying the operations of opening and closing the opening 14, the first shutter member 244 and the second shutter member 150 may slide on one of the case 30 and the bottom surface plate portion 36, or may slide on both the case 30 and the bottom surface plate portion 36.

When assembling the disk cartridge 240, first, the first shutter member 244 and the second shutter member 150 are assembled to the base plate portion 32. Specifically, the rotation shaft 156 of the second shutter member 150 is inserted through the shutter shaft hole 52 of the base plate portion 32 from beneath. One end portion of the torsion spring 158 is anchored on the slit 156A of the rotation shaft 156, and the other end portion of the torsion spring 158 is anchored on the spring holding portion 53 of the base plate portion 32. Further, the engaging claws 246 of the first shutter member 244 are made to catch on (are slidably engaged with) the top end portions of the low wall portions 242 of the tubular wall 40 of the base plate portion 32. The circular-arc-shaped guide wall portion 118 is made to run along the outer peripheral surface of the tubular wall 40, and the shutter main body 112 is disposed beneath the concave portion 38C (within the concave portion 38C) (see FIG. 37).

The disk medium 20 is disposed at the inner side of the tubular wall 40 in the state in which the opening 54 of the base plate portion 32 is closed by the first shutter member 244 and the second shutter member 150. Namely, the disk medium 20 is set on the rib 60 in a state in which the center core portion 26 of the disk medium 20 is inserted into the hub hole 56.

Next, the top portion of the base plate portion 32 which accommodates the disk medium 20 is covered by the top surface plate portion 34. Specifically, the peripheral wall 42 (the rear wall 44, the left inner wall 46A, the right inner wall 48A) of the base plate portion 32 and the peripheral wall 88 (the rear wall 90, the left inner wall 92A, the right inner wall 94A) of the top surface plate portion 34 are made to abut one another. The tubular projections 50 of the base plate portion 32 and the positioning convex portions 98 of the top surface plate portion 34 are made to abut one another. In this state, the respective top end portions (i.e., including the engaging claws 246) of the tubular wall 40 and the circular-arc-shaped guide wall portion 118 of the first shutter member 244 are inserted into the annular groove 68 of the top surface plate portion 34 (see FIG. 36).

The base plate portion 32 and the top surface plate portion 34 are inverted (the bottom surface 38B of the base plate portion 32 is directed upward) while maintaining this state.

Screws inserted from the tubular projections 63 of the base plate portion 32 are screwed together with the screw holes 98A of the positioning convex portions 98 of the top surface plate portion 34 while engaging with the conical portions at the interiors of the tubular projections 50 of the base plate portion 32. The top surface plate portion 34 is thereby fixed to the base plate portion 32. Namely, the base plate portion 32 and the top surface plate portion 34 are joined, and the case 30 is formed.

Next, the locking means 130 is assembled. Specifically, the supporting shaft 86A of the top surface plate portion 34 is inserted into the tubular shaft 134 of the lock lever 132 which is in a state of being inserted through the intermediate portion of the torsion spring 140. The lock releasing lever 136 is made to project from the lock releasing lever hole 84 of the top surface plate portion 34 into the first guide groove 12A. Further, one end portion of the torsion spring 140 is anchored on the lock lever 132, whereas the other end portion is inserted into the holding hole 86B of the top surface plate portion 34. In this state, the lock claw 138 is engaged with the lock engaging portion 118D of the first shutter member.

Finally, the bottom surface plate portion 36 is mounted to the case 30. Namely, while the top surface of the bottom surface plate portion 36 is made to abut on the bottom surface 38B of the base plate portion 32 and the respective bottom end surfaces of the inner walls 80A, 80B of the top surface plate portion 34, the peripheral edge portion of the bottom surface plate portion 36 is fit together with the inner peripheral surface of the peripheral wall 42 (the rear wall 44, the left outer wall 46B, and the right outer wall 48B) of the base plate portion 32 and the inner peripheral surface of the bottom end portion of the outer wall 70 of the top surface plate portion 34.

The disk cartridge 240 is thereby assembled.

Here, the engaging claws 246, which slidably engage with the low wall portions 242 (the tubular wall 40) of the base plate portion 32 and prevent the first shutter member 244 from falling out from the base plate portion 32 (the case 30), are provided at the circular-arc-shaped guide wall portion 118 of the first shutter member 244. Thus, at the time of assembling the disk cartridge 240 (before the mounting of the bottom surface plate portion 36 which is the final process in the assembly), the first shutter member 244, which was assembled in the initial stages of assembly, does not fall out from the case 30. Therefore, in assembling the disk cartridge 240, there is no need for complex and careful work to keep the first shutter member 244 from falling out. The assembly workability of the disk cartridge 240 is improved, and the assembly time is shortened.

In this way, in the disk cartridge 240 relating to the present sixth embodiment, the assembly work is easy and low cost. Further, the processes for assembling the disk cartridge 240 are made stable, and the assembly reliability (i.e., the reliability of the manufactured product) is improved.

Further, here, the engaging claws 246 merely catch on the top end portions of the low wall portions 242 (the tubular wall 40). Thus, there is no need to provide, at the tubular wall 40, engaging holes or convex portions for the engaging claws 246 to engage with. The structure is simple, and the assembly work is even easier.

The low wall portions 242 of the tubular wall 40 have the chamfer portions 242A at which the top end inner peripheral edges of the low wall portions 242 are chamfered in taper shapes. The engaging claws 246, whose distal end portions correspond to the chamfer portions 242A, catch on the top end portions of the low wall portions 242. Thus, the first shutter member 244 is reliably held at the base plate portion 32 (the case 30). Namely, the first shutter member 244 is prevented from falling out from the base plate portion 32 not only in the vertical direction, but also in directions orthogonal thereto (the front-back direction and the left-right direction).

The distal end portions of the engaging claws 246 correspond to the taper-shaped chamfer portions 242A. Thus, the engaging claws 246 do not project at the inner side of the tubular wall 40, or the projection thereof can be kept to a minimum (see FIG. 36). Thus, interference between the engaging claws 246 and the disk medium 20 accommodated at the inner side of the tubular wall 40 can be prevented with moderate dimensional accuracy (accuracy of machining and accuracy of assembling the respective portions).

The circular-arc-shaped guide wall portion 118 has the jutting-out portions 118A, 118B which extend toward the widthwise direction outer sides of the shutter main body 112. The engaging claws 246 are provided each at one place of the top end portions of the left and right jutting-out portions 118A, 118B, such that the shutter main body 112 is located between the engaging claws 246. Namely, the shutter main body 112 and the engaging claws 246 are provided so as to not face one another, and so as to be offset from one another. Thus, assembly of the first shutter member 244 into the base plate portion 32 is easy.

Because the first shutter member 244 is caught on (engaged with) the low wall portions 242 (the tubular wall 40) of the base plate portion 32 by the engaging claws 246 which are provided at two places, the first shutter member 244 can be reliably prevented from falling out from the base plate portion 32 (the case 30).

Because the engaging claws 246 are provided such that the shutter main body 112 is located therebetween, as in the present sixth embodiment, even if the opening 54 of the base plate portion 32 is formed such that also a portion of the tubular wall 40 is cut-out (along the entire height), the engaging claws 246 can be engaged with the tubular wall 40 in the state in which the first shutter member 244 closes the opening 54.

The first shutter member 244 is held at the base plate portion 32 (the low wall portions 242 of the tubular wall 40) via the engaging claws 246. Thus, the region at which the shutter main body 112 slides can be set to be either of the concave portion 38C of the base plate portion 32 or the bottom surface plate portion 36.

In the above-described sixth embodiment, there is the preferable structure in which the engaging claws 246 are caught on the top end portions of the low wall portions 242 (the tubular wall 40). However, the present invention is not limited to the same. For example, the engaging claws 246 may engage with slits or engaging grooves which are provided in the heightwise direction intermediate portion of the tubular wall 40 along the peripheral direction thereof.

Moreover, in the sixth embodiment, a preferable structure is used in which the low wall portions 242 of the tubular wall 40 have the chamfer portions 242A, and the engaging claws 246 are formed so as to correspond to the chamfer portions 242A. However, the present invention is not limited to the same, and, for example, the configurations of the engaging claws 246, such as planar or hook-shaped or the like, may be appropriately selected. Further, the engaging claws 246 are not limited to being formed integrally with the first shutter member 244. The engaging claws 246 may be formed as separate parts (including cases in which the engaging claws 246 are formed of a different material), and mounted by adhesion or the like.

In the above-described sixth embodiment, the engaging claws 246 are provided at two places such that the shutter main body 112 is located therebetween as seen in plan view. However, the present invention is not limited to the same, and the engaging claws 246 may be disposed so as to oppose the shutter main body 112. This structure is suitable to cases in which the opening 54 does not reach the tubular wall 40 (or the top end portion thereof). The engaging claws 246 are preferably elastically deformable in the thickness direction. Further, the engaging claw 246 may of course be provided at one place or at three or more places.

(Seventh Embodiment)

Next, a disk cartridge 250 relating to a seventh embodiment of the present invention will be described. Parts and portions which are basically the same as those of the above-described first embodiment are denoted by the same reference numerals as in the first embodiment, and description thereof is omitted.

Figure 38:
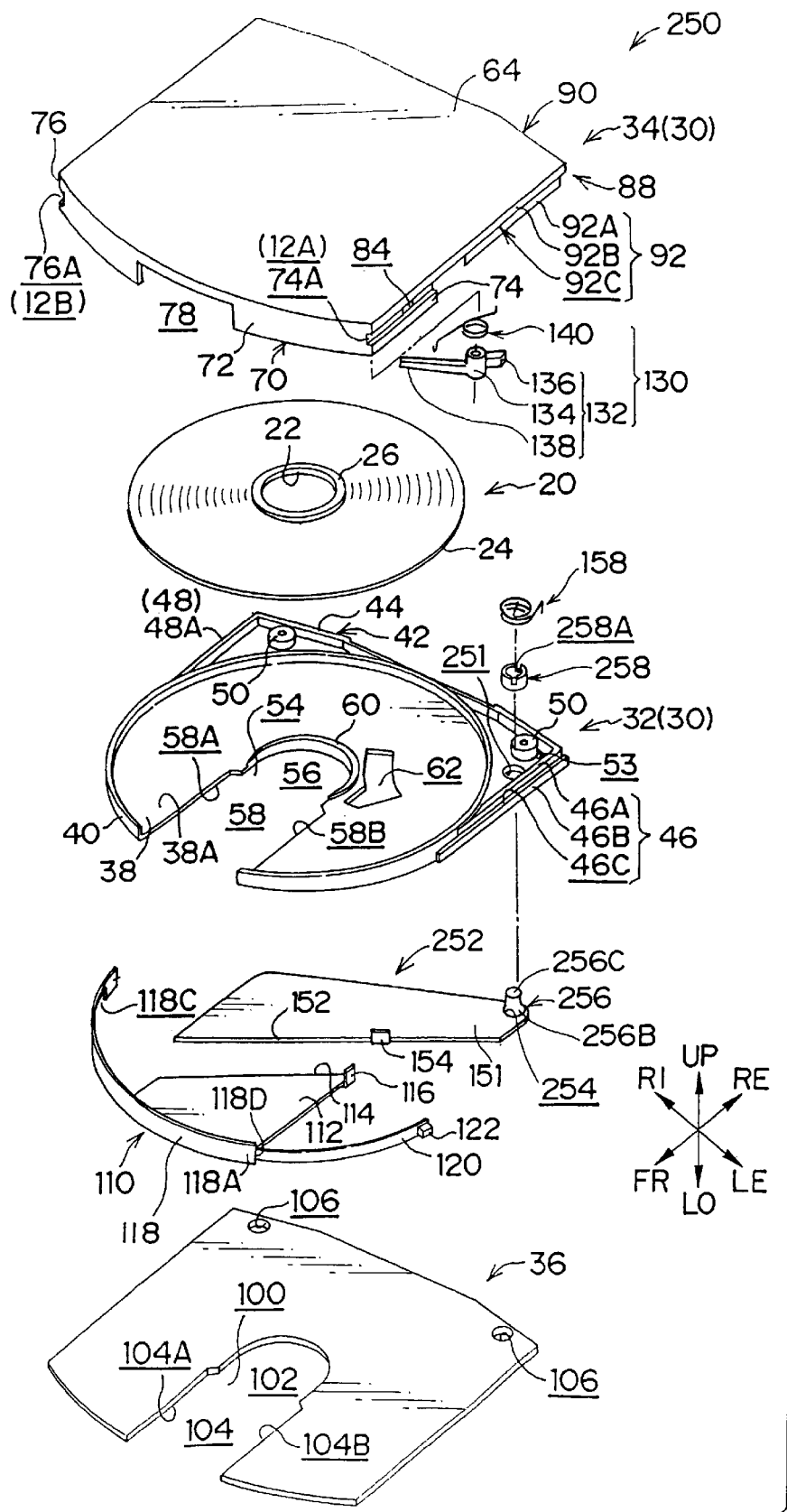
FIG. 38 is an exploded perspective view, as seen from above, of a disk cartridge relating to a seventh embodiment of the present invention.
Figure 39:
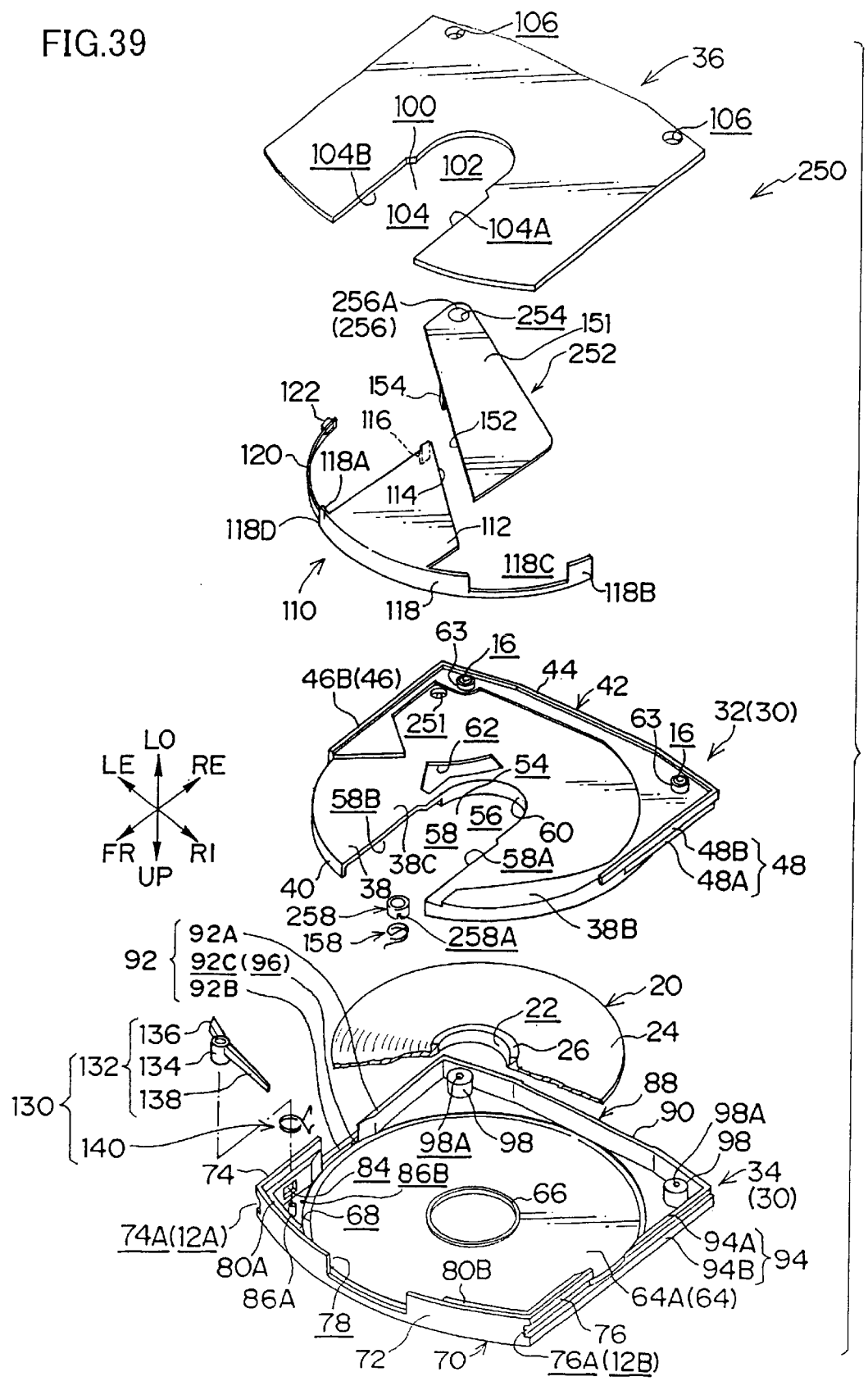
FIG. 39 is an exploded perspective view, as seen from below, of the disk cartridge relating to the seventh embodiment of the present invention.

As shown in FIGS. 38 and 39, in the disk cartridge 250, a shutter shaft hole 251 is provided at the base plate portion 32 in place of the shutter shaft hole 52, and a second shutter member 252 is provided in place of the second shutter member 150.

The second shutter member 252 is the same as the second shutter member 150 relating to the first embodiment in that the second shutter member 252 has the shutter face plate 151 (the abutting portion 152) and the pushed piece 154.

However, the second shutter member 252 differs from the second shutter member 110 in that the second shutter member 252 has a rotation shaft 256 in place of the rotation shaft 156 which is merely formed in a cylindrical shape. Note that the materials of the shutter face plate 151 and the shutter main body 112 relating to the present seventh embodiment are not particularly limited, and the shutter face plate 151 and the shutter main body 112 may be formed by, for example, a resin material, a metal material, a combination thereof (including the above-described two-layer structure) or the like.

Hereinafter, the shutter shaft hole 251 of the base plate portion 32 and the rotation shaft 256 of the second shutter member 252 will be described.

Figure 41:
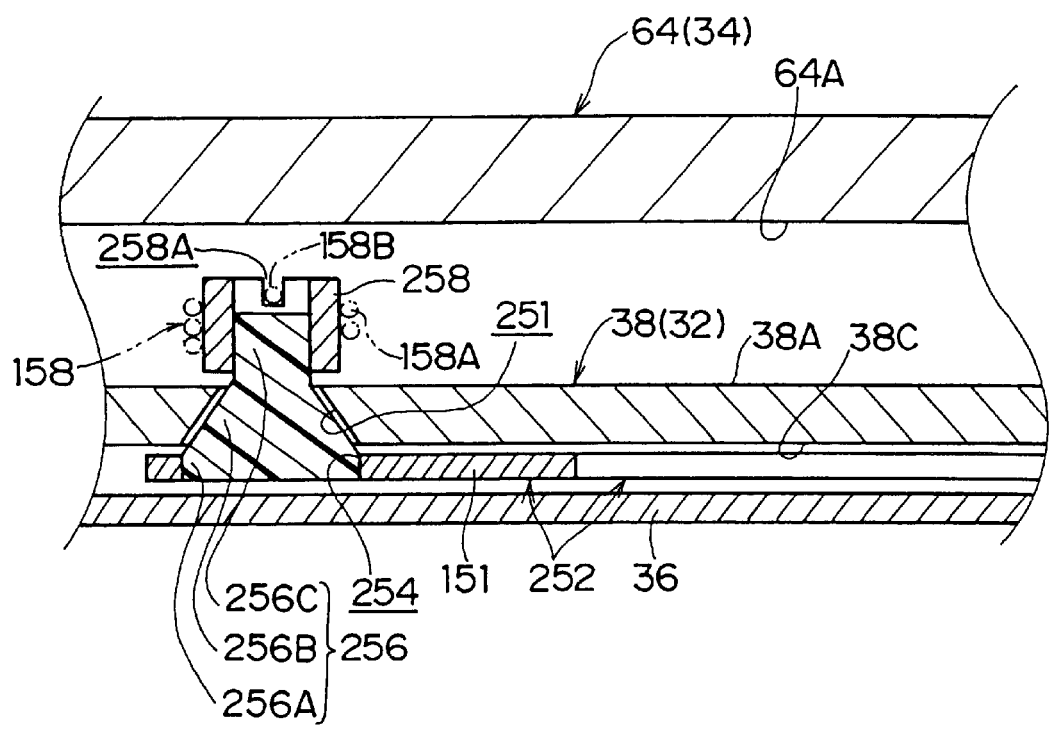
FIG. 41 is a cross-sectional view taken along line 41—41 of FIG. 40.
Figure 41:
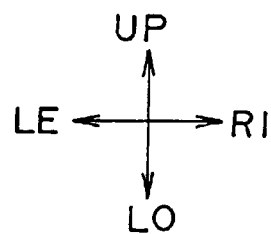

The shutter shaft hole 251, which serves as a shaft hole, is provided in a vicinity of the left side tubular projection 50 of the base plate portion 32, and is for rotatably supporting the second shutter member 252. The axially central position of the shutter shaft hole 251 is the same as the axially central position of the shutter shaft hole 52. As shown in FIG. 41, the hole wall of the shutter shaft hole 251 is a tapered wall whose upper portion has a small diameter and whose lower portion has a large diameter, and corresponds to a taper portion 256B of the rotation shaft 256.

Figure 42:
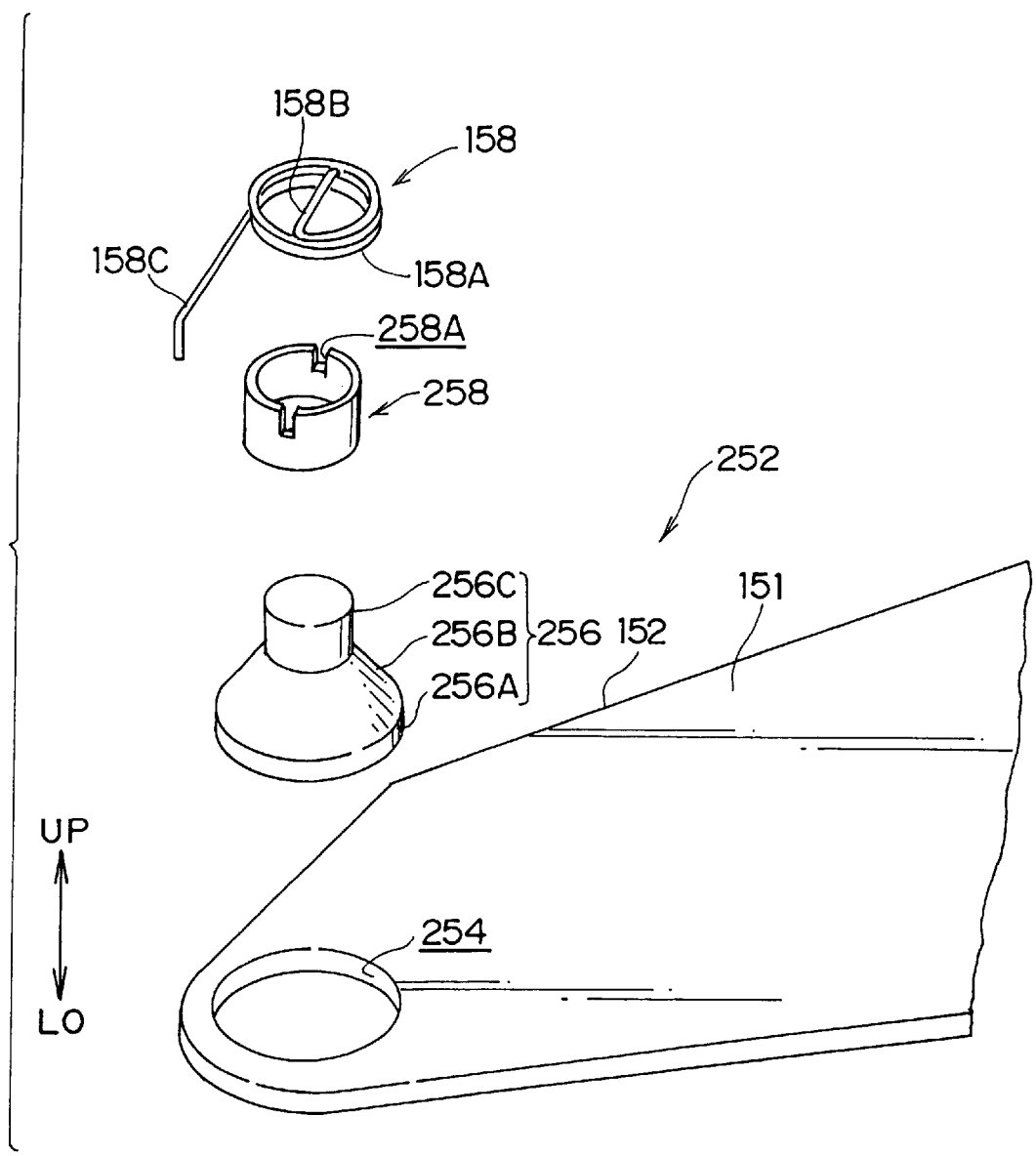
FIG. 42 is a perspective view showing a rotation shaft, a sleeve, and a torsion spring which form the disk cartridge relating to the seventh embodiment of the present invention.

As shown in FIG. 42, a rotation shaft hole 254, which has a larger diameter than that of the shutter shaft hole 251, is provided in the left corner portion of the shutter face plate 151 of the second shutter member 252. The axially central position of the rotation shaft hole 254 is the same as the axially central position of the rotation shaft 156.

The second shutter member 252 is provided with the rotation shaft 256 which is formed from a resin material having a low coefficient of friction such as, for example, POM or the like. The lower portion of the rotation shaft 256 is a fit-together portion 256A which is formed as a short cylinder and which corresponds to the rotation shaft hole 254 of the shutter face plate 151. The taper portion 256B is formed above the fit-together portion 256A of the rotation shaft 256. The outer surface of the taper portion 256B is a taper surface whose diameter decreases upwardly, coaxially with the fit-together portion 256A. A small diameter portion 256C, which is coaxial with and has the same diameter as the upper end portion of the taper portion 256B, is formed above the taper portion 256B. The upper end portion of the small diameter portion 256C is the upper end portion (distal end portion) of the rotation shaft 256. In this way, the root portion (the taper portion 256B) of the rotation shaft 256 has a greater diameter than that of the distal end side (the small diameter portion 256C) thereof.

The fit-together portion 256A of the rotation shaft 256 is fit with and fixed in the rotation shaft hole 254 of the shutter face plate 151, and the rotation shaft 256 usually rotates integrally with the shutter face plate 151. Further, the taper portion 256B of the rotation shaft 256 corresponds to the taper wall (hole wall) of the shutter shaft hole 251 of the base plate portion 32. The rotation shaft 256 is supported so as to be freely rotatable by the shutter shaft hole 251 (taper wall) which faces the outer surface (the taper surface) of the taper portion 256B.

Figure 40:
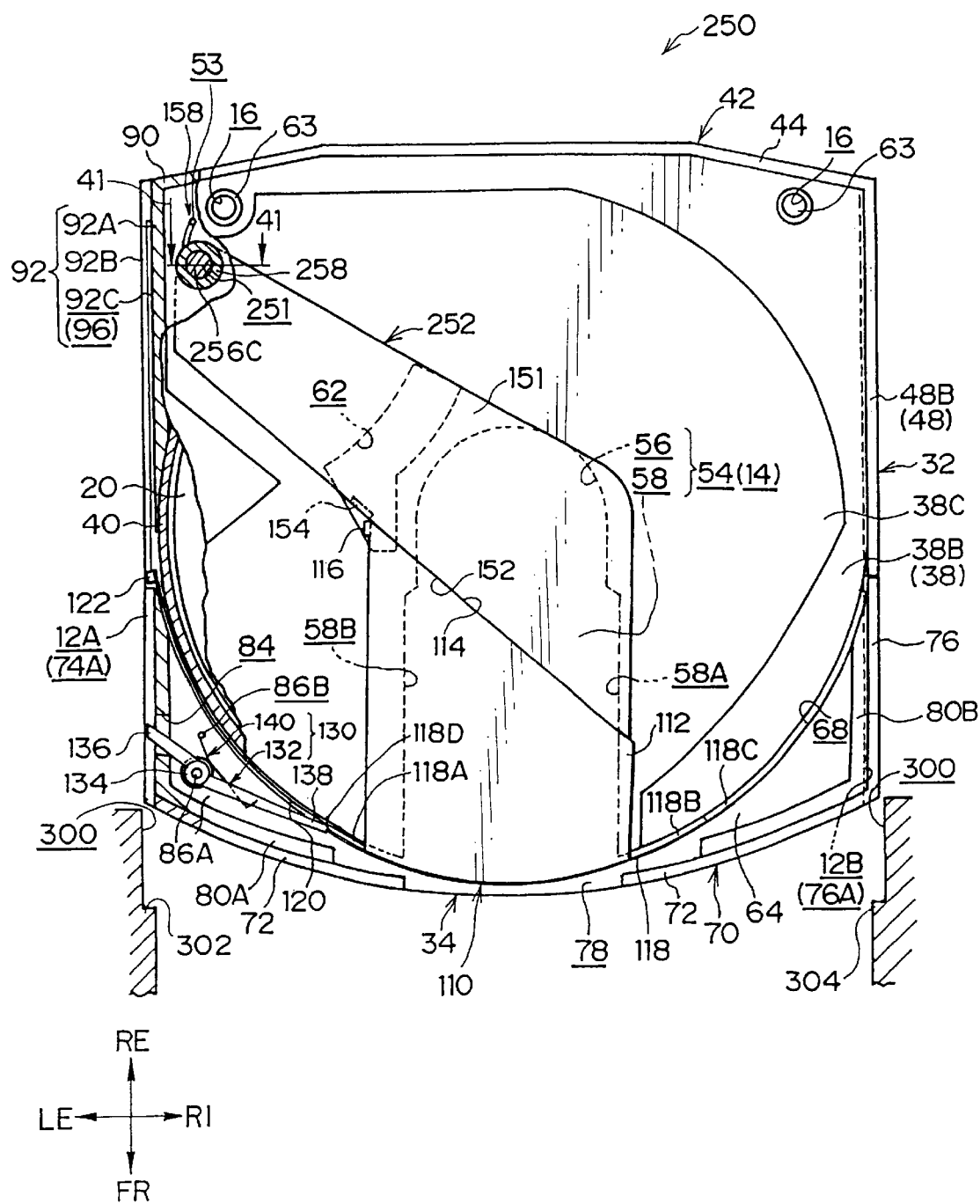
FIG. 40 is a bottom view, in which a bottom surface plate portion is removed and a portion is cut-out, showing the entire structure, in a state in which an opening is closed, of the disk cartridge relating to the seventh embodiment of the present invention.

As shown in FIGS. 40 and 41, the second shutter member 252 is disposed between the concave portion 38C of the base plate portion 32 and the top surface of the bottom surface plate portion 36, in the state in which the rotation shaft 256 is inserted through the shutter shaft hole 251 of the base plate portion 32 and the pushed piece 154 is inserted in the shutter guiding hole 62.

A sleeve 258, which serves as an anchor member and a sleeve member, is mounted to the small diameter portion 256C of the rotation shaft 256. The sleeve 258 is formed in a substantially tubular shape whose outer diameter is greater than the smallest diameter of the taper-shaped shutter shaft hole 251 of the base plate portion 32, and whose inner diameter corresponds to the small diameter portion 256C of the rotation shaft 256. The sleeve 258 is mounted by being fit-together with the small diameter portion 256C of the rotation shaft 256 which has passed through the shutter shaft hole 251. Further, a slit 258A, which serves as a concave portion (holding portion), is formed in the top end surface of the sleeve 258 along the direction of the diameter (i.e., the radial direction of the rotation shaft 256).

Further, as described above, the shutter mechanism is provided with the torsion spring 158 which serves as an urging means. The torsion spring 158 is formed from a wire made of steel. As shown in FIG. 42, the intermediate portion of the torsion spring 158 is formed by an annular portion 158A which is wound in an annular shape. One end portion of the torsion spring 158 is formed by a shutter side engaging portion 158B which is disposed at the top portion of the annular portion 158A along the direction of the diameter thereof. The other end portion of the torsion spring 158 is formed by a case side engaging portion 158C which extends in a direction substantially tangential to the annular portion 158A.

At the torsion spring 158, in a state in which the sleeve 258 (the rotation shaft 256) is inserted through the annular portion 158A, the shutter side engaging portion 158B engages with the slit 258A of the sleeve 258, and the case side engaging portion 158C anchors on the spring holding portion 53 of the base plate portion 32.

In this way, in the same way as the second shutter member 150, the second shutter member 252 is usually urged in a direction of abutting the first shutter member 110. The abutting portion 152 is usually in a state of abutting with the abutting portion 114 of the first shutter member 110. Next, as the operation of the disk cartridge 250 relating to the present seventh embodiment, the portions which are different from those of the above-described first embodiment will mainly be described.

In the disk cartridge 250 having the above-described structure, the dimensions, the configuration, and the range of operation (rotation) of the second shutter member 252 are the same as those of the second shutter member 150, except for the point that the second shutter member 252 is supported at the rotation shaft 256 by the shutter shaft hole 251 of the base plate portion 32. Therefore, the opening 14 is opened and closed in exactly the same way as the operations of the disk cartridge 10 shown in FIGS. 4 through 7. Thus, description and illustration of these basic operations will be omitted.

Accompanying the operations of opening and closing the opening 14, the first shutter member 110 and the second shutter member 252 may slide along one of the case 30 and the bottom surface plate portion 36, or may slide along both the case 30 and the bottom surface plate portion 36.

When assembling the disk cartridge 250, first, the first shutter member 110 and the second shutter member 252 are assembled to the base plate portion 32. Specifically, the rotation shaft 256 of the second shutter member 252 is inserted through the shutter shaft hole 251 of the base plate portion 32 from beneath, and the shutter face plate 151 is disposed beneath the concave portion 38C (within the concave portion 38C). In this state, the sleeve 258 is fit-together with and fixed to the small diameter potion 256C of the rotation shaft 256 which has passed through the shutter shaft hole 251 (see FIG. 41). Further, while the sleeve 258 is inserted through the annular portion 158A of the torsion spring 158, the shutter side engaging portion 158B of the torsion spring 158 is engaged with (inserted in) the slit 258A of the sleeve 258, and the case side engaging portion 158C is anchored on the spring holding portion 53 of the base plate portion 32.

Next, the circular-arc-shaped guide wall portion 118 of the first shutter member 110 is made to run along the outer peripheral surface of the tubular wall 40, and the shutter main body 112 is disposed beneath the concave portion 38C (within the concave portion 38C).

The disk medium 20 is disposed at the inner side of the tubular wall 40, in the state in which the opening 54 of the base plate portion 32 is closed by the first shutter member 110 and the second shutter member 252 and the closed state of the opening 54 is maintained by the urging force of the torsion spring 158. Namely, the disk medium 20 is set on the rib 60 in a state in which the center core portion 26 of the disk medium 20 is inserted in the hub hole 56.

Next, the top portion of the base plate portion 32 which accommodates the disk medium 20 is covered by the top surface plate portion 34. Specifically, the peripheral wall 42 (the rear wall 44, the left inner wall 46A, the right inner wall 48A) of the base plate portion 32 and the peripheral wall 88 (the rear wall 90, the left inner wall 92A, the right inner wall 94A) of the top surface plate portion 34 are made to abut one another. The tubular projections 50 of the base plate portion 32 and the positioning convex portions 98 of the top surface plate portion 34 are made to abut one another. In this state, the respective top end portions of the tubular wall 40 and the circular-arc-shaped guide wall portion 118 of the first shutter member 110 are inserted into the annular groove 68 of the top surface plate portion 34 (a state similar to that shown in FIG. 8A).

The base plate portion 32 and the top surface plate portion 34 are inverted (the bottom surface 38B of the base plate portion 32 is directed upward) while maintaining this state. Screws inserted from the tubular projections 63 (the holes 16 for position regulation) of the base plate portion 32 are screwed together with the screw holes 98A of the positioning convex portions 98 of the top surface plate portion 34 while engaging with the conical portions at the interiors of the tubular projections 50 of the base plate portion 32. The top surface plate portion 34 is thereby fixed to the base plate portion 32. Namely, the base plate portion 32 and the top surface plate portion 34 are joined, and the case 30 is formed.

Next, the locking means 130 is assembled. Specifically, the supporting shaft 86A of the top surface plate portion 34 is inserted into the tubular shaft 134 of the lock lever 132 which is in a state of being inserted through the intermediate portion of the torsion spring 140. The lock releasing lever 136 is made to project from the lock releasing lever hole 84 of the top surface plate portion 34 into the first guide groove 12A. Further, one end portion of the torsion spring 140 is anchored on the lock lever 132, whereas the other end portion is inserted into the holding hole 86B of the top surface plate portion 34. In this state, the lock claw 138 is engaged with the lock engaging portion 118D of the first shutter member.

Finally, the bottom surface plate portion 36 is mounted to the case 30. Namely, while the top surface of the bottom surface plate portion 36 is made to abut on the bottom surface 38B of the base plate portion 32 and the respective bottom end surfaces of the inner walls 80A, 80B of the top surface plate portion 34, the peripheral edge portion of the bottom surface plate portion 36 is fit together with the inner peripheral surface of the peripheral wall 42 (the rear wall 44, the left outer wall 46B, and the right outer wall 48B) of the base plate portion 32 and the inner peripheral surface of the bottom end portion of the outer wall 70 of the top surface plate portion 34.

Assembly of the disk cartridge 250 is thereby completed.

Here, in the initial stages of the assembly processes of the disk cartridge 250, the sleeve 258, whose outer diameter is larger than the minimum diameter of the shutter shaft hole 251 of the base plate portion 32 (i.e., which cannot pass through the shutter shaft hole 251), is fit together with and fixed to the rotation shaft 256 of the second shutter member 252 which has passed through the shutter shaft hole 251. Thus, at the time of assembling the disk cartridge 250 (before the bottom surface plate portion 36 is mounted), the second shutter member 252 does not fall out from the base plate portion 32 (the case 30).

Thus, in assembling the disk cartridge 250, there is no need for complex and careful work to keep the second shutter member 252 from falling down. The assembly workability is improved, and the assembly time is shortened. Further, the sleeve 258 is formed in a substantially tubular shape, and is merely fit together with the small diameter portion 256C positioned at the distal end side of the rotation shaft 256. Thus, assembly of the disk cartridge 250 is even more easy.

In this way, in the disk cartridge 250 relating to the present seventh embodiment, the assembly work is easy and inexpensive. Further, the assembly processes of the disk cartridge 250 are made stable, and the assembly reliability (i.e., the reliability of the manufactured product) is improved.

The second shutter member 252 can be urged in the direction of abutting the first shutter member 110, merely by providing the slit 258A in the sleeve 258 and by the shutter side engaging portion 158B of the torsion spring 158 engaging with (being inserted into) the slit 258A (i.e., without strong fitting or fastening by a fastening means such as a presser bolt or the like). Thus, the assembly of the disk cartridge 250 is facilitated even more.

Further, the second shutter member 252 is urged in a state in which the sleeve 258 is inserted through the annular portion 158A of the torsion spring 158. Therefore, the torsion spring 158 can be suitably accommodated within the limited space of the disk cartridge 250 (the case 30).

Because the second shutter member 252 is held at the base plate portion 32 by the sleeve 258, the region at which the shutter face plate 151 slides can be set at either one of the concave portion 38C of the base plate portion 32 or the bottom surface plate portion 36.

The taper portion 256B, which is the root portion of the rotation shaft 256 (the portion of the rotation shaft 256 in a vicinity of the region where the rotation shaft 256 is fixed to the shutter face plate 151), has a greater diameter than that of the small diameter portion 256C at the distal end. Thus, the strength at this root portion is increased. As a result, for example, if the disk cartridge 250 is dropped by accident, the stress applied to the root portion of the rotation shaft (in particular, the border portion between the fit-together portion 256A and the taper portion 256B) is mitigated, and breaking of the rotation shaft 256 is prevented.

In this way, in the disk cartridge 250 relating to the present seventh embodiment, breakage of the rotation shaft 256 of the second shutter member 252 is prevented, and the reliability is improved.

Further, the rotation shaft 256 is supported so as to be freely rotatable in the shutter shaft hole 251 which is formed as a tapered wall which faces the outer surface (the taper surface) of the taper portion 256B of the rotation shaft 256. Thus, for example, a portion of the force which is applied in the radial direction (falling direction) of the rotation shaft 256 at the time when the disk cartridge 250 is dropped, is converted into force in the axial direction of the rotation shaft 256 in accordance with the taper angle of the taper portion 256B. Namely, the force applied to the rotation shaft 256 is dispersed, and breakage of the rotation shaft 256 is reliably prevented. Similarly, the force which is applied around the shutter shaft hole 251 is also dispersed in the surface directions (the front-back and left-right directions) and the plate thickness direction (top-bottom direction) of the base plate portion 32. Thus, breakage of the base plate portion 32 also is prevented.

Moreover, the diameter of the rotation shaft 256 varies continuously due to the taper portion 256B which is positioned between the large diameter fit-together portion 256A and the small diameter portion 256C. Thus, the factor of stress concentration is small, and the applied stress is mitigated even more.

In the above-described seventh embodiment, the sleeve 258, in which is formed the slit 258A which engages with and holds the shutter side engaging portion 158B of the torsion spring 158, is provided. However, the present invention is not limited to the same, and for example, the structure relating to the variant example shown in FIG. 43 may be used.

Figure 43:
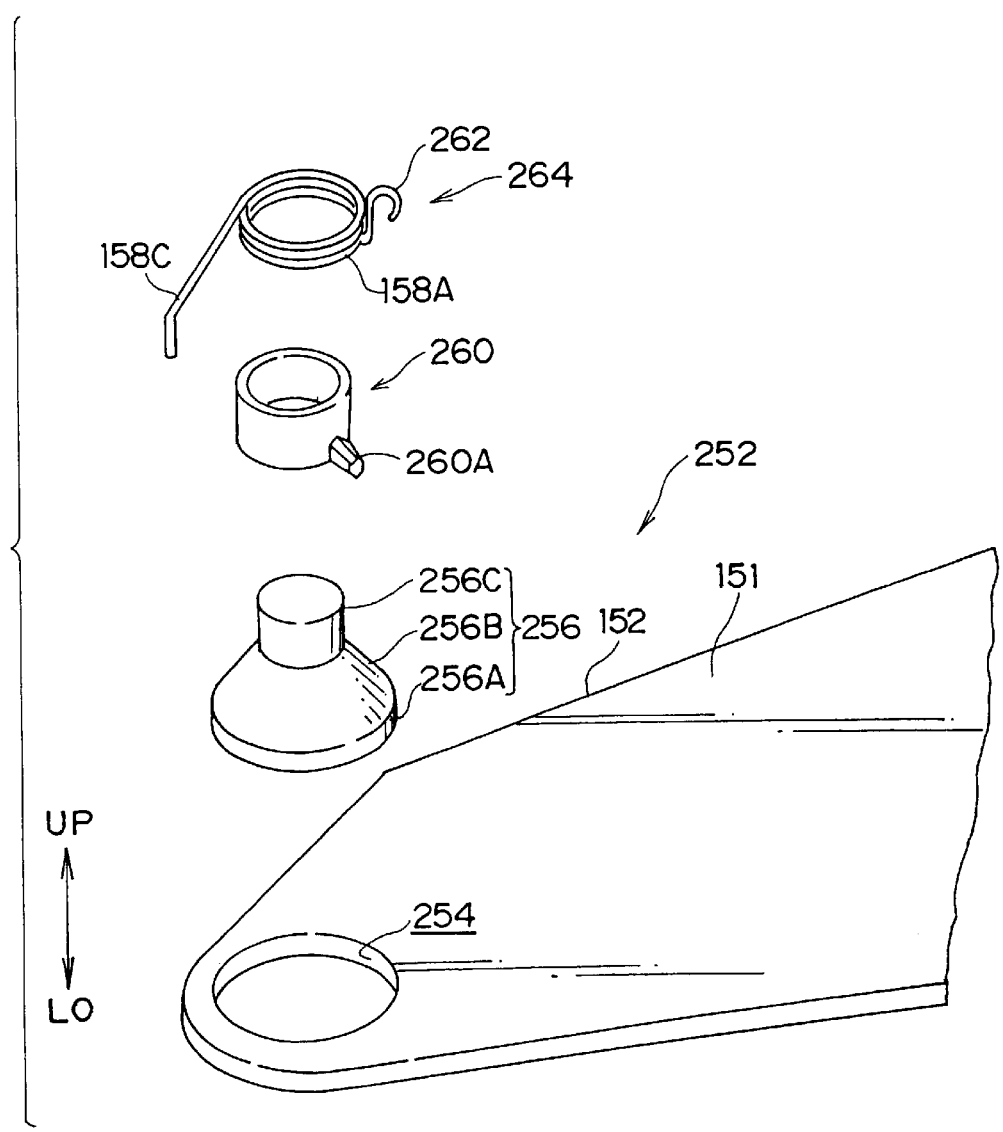
FIG. 43 is a perspective view showing a variant example of a sleeve and a torsion spring which form the disk cartridge relating to the seventh embodiment of the present invention.
Figure 44:
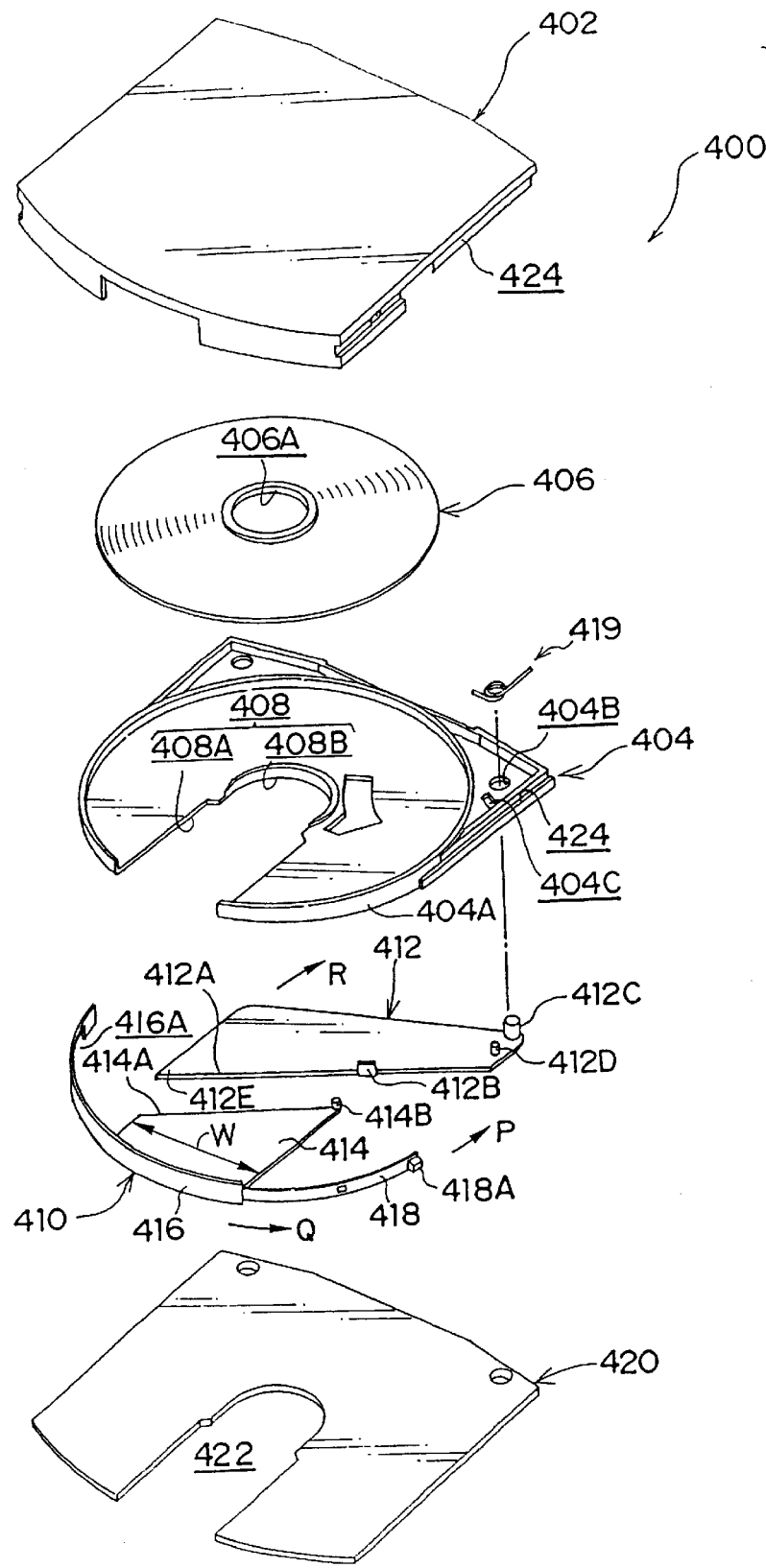
FIG. 44 is an exploded perspective view showing a conventional disk cartridge.

A sleeve 260 is shown in FIG. 43. The sleeve 260 is formed in a substantially tubular shape having the same inner and outer diameters as those of the sleeve 258, and has an engaging projection 260A which serves as a convex portion (holding portion) which projects in the radial direction (i.e., the radial direction of the rotation shaft 256). Further, a torsion spring 264 is shown in FIG. 43. The torsion spring 264 is formed by the annular portion 158A at the intermediate portion thereof, the case side engaging portion 158C at the other end portion thereof, and, at the one end portion thereof, a ring-shaped shutter side engaging portion 262 through which the engaging projection 260A can be inserted.

The torsion spring 264 is engaged in a state in which the sleeve 260 is inserted through the annular portion 158A and in a state in which the engaging projection 260A is inserted through the shutter side engaging portion 262. The case side engaging portion 158C is anchored on the spring holding portion 53 of the base plate portion 32, and the shutter member 252 is urged in the direction of closing the hub hole 56 (the direction of abutting the first shutter member 110).

In accordance with this structure as well, the same effects as those of the above-described seventh embodiment can be obtained. Namely, the second shutter member 252 is prevented from falling out of the base plate portion 32 (the case 30) by the sleeve 260. Moreover, the assembly of the torsion spring 264 is easy, and the assembly of the disk cartridge 250 is easy. Further, breakage of the rotation shaft 256 of the second shutter member 252 can be prevented, and the reliability is improved.

Further, in the above-described seventh embodiment and variant example thereof, preferable structures are used in which the anchor members are the substantially tubular sleeves 258, 260. However, the present invention is not limited to the same. The anchor member may be any configuration provided that it cannot pass through the shutter shaft hole 251 in the state of being connected to the rotation shaft 256. Accordingly, for example, in place of the sleeve 258 or the like, an anchor member can be used which is formed in a polygonal configuration such as a rectangular shape, or in an oval shape or the like as seen in plan view. Or, a rod-shaped anchor member may be used. Further, the anchor members, including the sleeve 258, are not limited to being fit together with the rotation shaft 256, and may be connected to the rotation shaft by, for example, a fastening means such as adhesion or a screw, an elastically deformable hook member or claw member, or the like.

Moreover, in the seventh embodiment and variant example thereof, there are preferable structures in which the rotation shaft 256 is fit and fixed with the shutter face plate 151 of the second shutter member 252. However, the present invention is not limited to the same, and for example, the rotation shaft 256 may be provided at the shutter face plate 151 by adhesion or by being integrally molded therewith.

Although the above-described embodiment is a preferable structure in which the rotation shaft 256 has the taper portion 256B, the present invention is not limited to the same. For example, in place of the taper portion 256B, the rotation shaft 256 may be formed in a stepped configuration having a short cylindrical intermediate portion (which may have the same diameter as that of the fit-together portion 256A). In this case, the step which is the border with the small diameter portion 256C is preferably positioned within the shutter shaft hole 251 which has a stepped configuration in the same way as the rotation shaft 256. Further, the shutter shaft hole 251 preferably supports the rotation shaft 256 at the small diameter portion 256C.

As described above, in the present seventh embodiment and variant example thereof, preferable structures are used in which the assembly of the disk cartridge 250 is facilitated and the drop strength thereof is improved. However, the present invention is not limited to the same. In a case in which only the assembly of the disk cartridge 250 is to be facilitated, there is no need to make the root portion of the rotation shaft 256 have a larger diameter than that of the distal end (e.g., the rotation shaft 256 can be formed merely as a cylinder). Or, in a case in which only the drop strength of the rotation shaft 256 (the disk cartridge 250) is to be improved, the torsion spring 158 may be directly anchored on the rotation shaft 256 and there is no need for the anchor member such as the sleeve 258 or the like.

In the above-described respective embodiments, the disk cartridges 10, 170, 180, 200, 220, 240, 250 were described.

However, the present invention is not limited to the same, and portions or all of the characterizing structural elements of the disk cartridges in the respective embodiments and variant examples may be appropriately combined.

In particular, in order to open and close the opening 14 with a moderate driving force, it is suitable to combine the first shutter member 172 and the second shutter member 182. The shutter main body 174 of the first shutter member 172 and the shutter face plate 151 of the second shutter member 182 may each be the two-layer structure formed from the metal plate 160 and the resin layer 162.

In order to prevent abrasion accompanying the opening and closing of the opening 14, it is suitable to provide the sliding projections 206, 210 (212, 214) at the shutter face plate 151 of the second shutter member 224, in the combination of the first shutter member 222 (226) and the second shutter member 224 in the fifth embodiment, or in the combination of the first shutter member 226 and the second shutter member 232.

In order to facilitate assembly of the disk cartridge, the combination of the first shutter member 244 (the low wall portions 242 of the tubular wall 40) and the second shutter member 252 (the sleeve 258) is suitable.

In a best embodiment of the present invention, the first shutter member 172 and the second shutter member 182 are combined. Each of the shutter main body 174 of the first shutter member 172 and the shutter face plate 151 of the second shutter member 182 are formed by the two-layer structure formed from the metal plate 160 and the resin layer 162. The first shutter member 172 has, in place of the pushing piece 116, the pushing portion 228, and has, at the circular-arc-shaped guide wall portion 118, the engaging claws 246 which engage with the low wall portions 242 of the case 30. The second shutter member 182, which is provided with the pushed piece 154 of a different material than the pushing portion 228 or with the pushed portion 234 of the same type of material as the pushing portion 228, has the sliding projections 206, 210 at the shutter face plate 151, and has the rotation shaft 256 which is held by the sleeve 258 in a state of being inserted through the shutter shaft hole 251 of the case 30.

A case in which the sliding projections 206, 210 (212, 214) are provided at the shutter face plate 151 is a best embodiment of the present invention even if the shutter face plate 151 does not have the two-layer structure of the metal plate 160 and the resin layer 162.

Further, in each of the above-described embodiments, in order to make the entire shutter mechanism more compact (in order to decrease the range of rotation), a portion of the rear right portion of the window portion 58 for a recording/playback head is opened and closed by the shutter face plate 151 of the second shutter member 150, 182, 202, 224, 252. However, the present invention is not limited to the same, and structures are of course possible in which the shutter main bodies 112, 174, 230 of the first shutter members 110, 172, 222, 226, 244 open and close the entire window portion 58 for a recording/playback head.

In the above-described respective embodiments and variant examples, the second shutter members 150, 182, 202, 224, 232, 252, which rotate around the rotation shafts 156, 256, open and close mainly the hub hole 56. However, the present invention is not limited to the same. For example, the second shutter member 150 or the like may open and close another portion of the opening 14, instead of the hub hole 56 or as well as the hub hole 56. Namely, the disk cartridges 10, 170, 180, 200, 220, 240, 250 are not limited to the structures in which the rotation shafts 156, 256 and the shutter shaft holes 52, 251 are disposed at the radial direction outer side of the disk medium 20. The rotation shaft 256 and the shutter shaft hole 251 may be provided at portions facing the disk medium 20. Accordingly, for example, the second shutter member 150 or the like may open and close the window portion 58 for a recording/playback head by rotating around the rotation shaft 156 which is provided at a position opposing the disk medium 20.

The above embodiments and variant examples have preferable structures in which the rotation shafts 156, 256 are provided at the shutter face plates 151 of the second shutter members 150, 182, 202, 224, 232, 252. However, the present invention is not limited to the same. For example, the rotation shaft 256 or the like may be provided at the bottom surface 38B or the concave portion 38C of the base plate portion 32, and may be freely rotatably inserted into the rotation shaft hole 254 (which may be formed to have a taper wall in the same way as the shutter shaft hole 251) of the shutter face plate 151.

Moreover, the second shutter members 150, 182, 202, 224, 232, 252 are not limited to structures which are pushed by (interlocked with) the first shutter member 110 at the time of opening the hub hole 56, and may of course be driven independently. Further, the second shutter members 150 and the like may alone open and close a predetermined opening which is for accessing the disk medium 20.

In the respective embodiments and variant examples which are described above, the disk medium 20 is a single-side recording type, and the opening 14 is provided at the lower side (including the front side). However, the present invention is not limited to the same, and the disk medium 20 may, for example, be a both-sides recording type in which the opening 14 is provided at the top side as well, and shutter members for opening and closing the top and bottom openings are respectively provided. Further, the opening 14 is not limited to the structure in which the hub hole 56 and the window portion 58 for a recording/playback head are connected, and the hub hole 56 and the window portion 58 for a recording/playback head may of course be formed separately.

As described above, the shutter for a disk cartridge relating to the present invention has the excellent effects that it has good slidability, is light-weight, and warping in the plate thickness direction is suppressed.

Further, the disk cartridge relating to the present invention has the excellent effects that an opening can be opened and closed by driving shutter members by moderate driving forces.

What is claimed is:

1. A shutter built-in in a disk cartridge, the disk cartridge comprising:
    a medium;
    a case having an access opening for access to the medium, and housing the medium; and
    a cover member having an opening which corresponds to the access opening, the cover member being mounted to an outer surface of the case,
    wherein the shutter is for opening and closing the opening and the access opening, and
    wherein the shutter is slidably provided between the outer surface of the case and the cover member, and is basically formed from a thin plate having a two layer structure formed from a metal layer and a resin layer,
    wherein the metal layer has a surface, to which the resin layer is joined, the surface formed by subjecting the metal layer to an electrochemical surface treatment to produce a high affinity to resin.

2. The shutter of claim 1, wherein the shutter is substantially formed by two shutter members, and closing and opening operations of the shutter correspond to movements of the shutter members in directions of relatively approaching one another and in directions of relatively moving away from one another.

3. The shutter of claim 1, wherein the resin layer contains a solid lubricant.

4. The shutter of claim 3, wherein the solid lubricant comprises molybdenum in a powder form, and wherein the molybdenum is mixed into the resin layer in an amount of 0.1% by mass or more.

5. The shutter of claim 1, wherein the metal layer is formed of stainless steel, and a surface of the metal layer, which surface borders on the resin layer, is roughened.

6. The shutter of claim 5, wherein the surface of the metal surface is roughened to Ra 0.2 or more.

7. The shutter of claim 1, wherein a surface of the metal layer is subjected to a treatment for improving slidability.

8. The shutter of claim 1, wherein a thickness of the metal layer is substantially 0.1 mm.

9. The shutter of claim 1, wherein a thickness of the resin layer is substantially 0.4 mm.

10. The shutter of claim 1, further comprising a matrix of self-lubricating particulates provided on the metal layer, such that the metal layer is sandwiched between the matrix and the resin layer, wherein the matrix of self-lubricating particulates comprises molybdenum disulfide.

11. The shutter of claim 1, wherein the metal layer is formed of stainless steel.

12. The shutter of claim 11, wherein the electrochemical surface treatment comprises immersing the stainless steel as an anode in an electrodeposition solution.

\* \* \* \* \*